(12) United States Patent
Zhang et al.

(10) Patent No.: US 9,948,939 B2
(45) Date of Patent: Apr. 17, 2018

(54) ADVANCED RESIDUAL PREDICTION IN SCALABLE AND MULTI-VIEW VIDEO CODING

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 14/098,344

(22) Filed: Dec. 5, 2013

(65) Prior Publication Data

US 2014/0161188 A1 Jun. 12, 2014

Related U.S. Application Data

(60) Provisional application No. 61/734,874, filed on Dec. 7, 2012.

(51) Int. Cl.
*H04N 7/12* (2006.01)
*H04N 19/31* (2014.01)
(Continued)

(52) U.S. Cl.
CPC .......... *H04N 19/31* (2014.11); *H04N 19/103* (2014.11); *H04N 19/105* (2014.11);
(Continued)

(58) Field of Classification Search
CPC ............. H04N 19/0043; H04N 19/103; H04N 19/105; H04N 19/107; H04N 19/136;
(Continued)

(56) References Cited

U.S. PATENT DOCUMENTS 7,778,474 B2 8/2010 Bandou et al.
9,451,197 B1 * 9/2016 Krause ............... H04N 21/4221
(Continued)

FOREIGN PATENT DOCUMENTS

CN 101166282 A 4/2008
CN 101415115 A 4/2009
(Continued)

OTHER PUBLICATIONS

An et al., "CE4.h related: Mode dependent advanced inter-view residual prediction," MediaTek Inc., Joint Collaborative Team on 3D Video Coding Extension Development of ITU-T SG 16 WP 3 and ISO/IEC JTC 1/SC 29/WG 11, JCT3V-C0139, 3rd Meeting: Geneva, CH, Jan. 17-23, 2013, 3 pp.

(Continued)

*Primary Examiner* — Nhon Diep
(74) *Attorney, Agent, or Firm* — Shumaker & Sieffert, P.A.

(57) ABSTRACT

In an example, a method of coding video data includes determining a location of a temporal reference block indicated by a temporal motion vector to a current block of video data, where the current block and the temporal reference block are located in a first layer of video data. The method also includes interpolating, with a first type of interpolation, a location of a disparity reference block indicated by a disparity vector of the current block, where the disparity reference block is located in a second, different layer, and where the first type of interpolation comprises a bi-linear filter. The method also includes determining a temporal-disparity reference block of the disparity reference block indicated by a combination of the temporal motion vector and the disparity vector, and coding the current block based on the temporal reference block, the disparity reference block, and the temporal-disparity reference block.

26 Claims, 20 Drawing Sheets

(51) Int. Cl.

| | |
|---|---|
| H04N 19/597 | (2014.01) |
| H04N 19/105 | (2014.01) |
| H04N 19/176 | (2014.01) |
| H04N 19/70 | (2014.01) |
| H04N 19/30 | (2014.01) |
| H04N 19/61 | (2014.01) |
| H04N 19/103 | (2014.01) |
| H04N 19/107 | (2014.01) |
| H04N 19/136 | (2014.01) |
| H04N 19/187 | (2014.01) |
| H04N 19/577 | (2014.01) |

(52) U.S. Cl.
CPC ......... *H04N 19/107* (2014.11); *H04N 19/136* (2014.11); *H04N 19/176* (2014.11); *H04N 19/187* (2014.11); *H04N 19/30* (2014.11); *H04N 19/577* (2014.11); *H04N 19/597* (2014.11); *H04N 19/61* (2014.11); *H04N 19/70* (2014.11)

(58) Field of Classification Search
CPC .... H04N 19/176; H04N 19/187; H04N 19/30; H04N 19/577; H04N 19/597; H04N 19/61; H04N 19/70
See application file for complete search history.

(56) References Cited

U.S. PATENT DOCUMENTS

| | | |
|---|---|---|
| 2005/0100229 A1 | 5/2005 | Becker et al. |
| 2006/0153297 A1 | 7/2006 | Boyce et al. |
| 2007/0014348 A1 | 1/2007 | Bao et al. |
| 2007/0041443 A1 | 2/2007 | Ha et al. |
| 2007/0291852 A1 | 12/2007 | Mori |
| 2010/0034258 A1 | 2/2010 | Pandit et al. |
| 2010/0091845 A1 | 4/2010 | Jeon et al. |
| 2010/0118939 A1 | 5/2010 | Shimizu et al. |
| 2010/0220791 A1 | 9/2010 | Lin et al. |
| 2012/0300840 A1 | 11/2012 | Ueda |
| 2013/0194386 A1 | 8/2013 | Leontaris et al. |
| 2013/0229485 A1* | 9/2013 | Rusanovskyy .... H04N 13/0048 348/43 |
| 2013/0258052 A1 | 10/2013 | Li et al. |
| 2014/0022343 A1 | 1/2014 | Chen |
| 2014/0050270 A1 | 2/2014 | Lim et al. |
| 2014/0098883 A1 | 4/2014 | Hannuksela et al. |
| 2014/0161175 A1 | 6/2014 | Zhang et al. |
| 2014/0161187 A1 | 6/2014 | Zhang et al. |
| 2014/0161189 A1 | 6/2014 | Zhang et al. |
| 2014/0168362 A1* | 6/2014 | Hannuksela ....... H04N 13/0048 348/43 |
| 2014/0341289 A1* | 11/2014 | Schwarz ............. H04N 19/597 375/240.16 |
| 2015/0288985 A1* | 10/2015 | Chen ................... H04N 19/597 375/240.26 |
| 2015/0341663 A1* | 11/2015 | Zhang ................. H04N 19/597 375/240.16 |

FOREIGN PATENT DOCUMENTS

| | | |
|---|---|---|
| CN | 101473655 A | 7/2009 |
| CN | 101529913 A | 9/2009 |
| CN | 101690231 A | 3/2010 |
| CN | 102006480 A | 4/2011 |
| CN | 102055967 A | 5/2011 |
| CN | 102640496 A | 8/2012 |
| JP | 2007158770 A | 6/2007 |
| JP | 2007336275 A | 12/2007 |
| TW | I289998 B | 11/2007 |
| WO | 2007114612 A1 | 10/2007 |
| WO | 2009005626 A3 | 1/2009 |
| WO | 2012007038 A1 | 1/2012 |
| WO | 2012012582 A1 | 1/2012 |
| WO | 2012145670 A1 | 10/2012 |
| WO | 2012148139 A2 | 11/2012 |
| WO | 2013138631 | 9/2013 |

OTHER PUBLICATIONS

Bartnik et al., "HEVC Extension for Multiview Video Coding and Multi view Video Plus Depth Coding," VCEG Meeting; MPEG Meeting; Torino; (Video Coding Experts Group of ITU-T SG.16), No. VCEG-AR13, Feb. 3-10, 2012, 42 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen et al., "AHG10: Hooks related to motion for the 3DV extension of HEVC," JCT-VC Meeting; MPEG Meeting; Stockholm; (Joint Collaborative Team on Video Coding of ISO/IEC JTC1/SC29/WG11 and ITU-T SG.16); URL: http://wftp3.itu.int/av-arch/jctvc-site/,,No. JCTVC-J0122, Jul. 11-20, 2012, 20 pp.
Chen et al., "AHG10: Motion related hooks for HEVC multiview/ 3DV extension based on long-term reference pictures," JCT-VC Meeting; MPEG Meeting; Stockholm; (Joint Collaborative Team on Video Coding of ISO/IEC JTC1/SC291WG11 and ITU-T SG.16 ); URL: http://wftp3.itu.int/av-arch/jctvc-site/,, No. JCTVC-J0121, Jul. 11-20, 2012, 8 pp.
Chen et al., "Single loop decode and motion skip in JMVM," JVT Meeting; MPEG Meeting; Shenzhen CN; (Joint Video Team of ISO/IEC JTC1/SC29/WG11 and ITU-T SG.16 ) No. JVT-Y053, Oct. 21-26, 2007, 12 pp.
Ellinas et al., "Stereo video coding based on quad-tree decomposition of B-P frames by motion and disparity interpolation," IEE Proceedings: Vision, Image and Signal Processing, Institution of Electrical Engineers, Oct. 2005, 9 pp.
Hannuksela et al., "3D-AVC draft text 4," JCT-3V Meeting; MPEG Meeting; Shanghai; (The Joint Collaborative Team on 3D Video Coding Extension Development of ISO/IEC JTC1/SC29/WG11 and ITU-T SG.16 ); URL:http://phenix.int-evry.fr/jct2/ No. JCT3V-B1002, Oct. 13-19, 2012, 70 pp.
International Preliminary Report on Patentability—PCT/US2013/ 073611—The International Bureau of WIPO Geneva, Switzerland, Mar. 19, 2015, 11 pp.
International Search Report and Written Opinion—PCT/US2013/ 073611—ISA/EPO—Mar. 28, 2014, 13 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jung et al., "Results on Weighted prediction in 3D Video Coding," JCT-3V Meeting; MPEG Meeting; Shanghai; (The Joint Collaborative Team on 3D Video Coding Extension Development of ISO/IEC JTC1/SC29/WG11 and ITU-T SG.16); URL: http://phenix.int-evry. fr/jct2/,, No. JCT3V-B0134, Oct. 13-19, 2012, 4 pp.

(56) References Cited

OTHER PUBLICATIONS

Schwarz et al., "Test Model under Consideration for HEVC based 3D video coding v3.0," MPEG Meeting; Geneva; (Motion Picture Expert Group or ISO/IEC JTC1/SC29/WG11), No. N12744, Apr. 2012, 46 pp.

Sullivan et al., "Standardized Extensions of High Efficiency Video Coding (HEVC)," Manuscript ID J-STSP-VCHB-00130-2013, Oct. 8, 2013, 17 pp.

Tech et al., "3D-HEVC Test Model 1," JCT-3V Meeting; MPEG Meeting; Stockholm; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-A1005_d0, Jul. 16-20, 2012, 83 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Zhang et al., "3D-CE4: Advanced residual prediction for multiview coding," Joint Collaborative Team on 3D Video Coding Extension Development of ITU-T SG 16 WP 3 and ISO/IEC JTC 1/SC 291WG 11, JCT3V-O0049, 3rd Meeting: Geneva, CH, Jan. 17-23, 2013, 5 pp.

Zhang et al., "3D-CE5.h related: Advanced residual prediction for multiview coding," Qualcomm Incorporated, Joint Collaborative Team on 3D Video Coding Extension Development of ITU-T SG 16 WP 3 and ISO/IEC JTC 1/SC 291WG 11, JCT3V-B0051, 2nd Meeting: Shanghai, CN, Oct. 13-19, 2012, 4 pp.

Han et al., "Improved Video Compression Efficiency Through Flexible Unit Representation and Corresponding Extension of Coding Tools," IEEE Transactions on Circuits and Systems for Video Technology, vol. 20, No. 12, Dec. 2010, 12 pp.

Hong et al., "Scalability Support in HEVC," Joint Collaborative Team on Video Coding (JCT-VC) of ITU-T SG16 WP3 and ISO/IEC JTC1/SC29/WG11, JCTVC-F290, Jul. 14-22, 2011, 15 pp.

Bross et al., "High efficiency video coding (HEVC) text specification draft 9," 11th Meeting: Shanghai, CN, Oct. 10-19, 2012, JCTVC-K1003_v10, 306 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

Second Written Opinion of International Application No. PCT/US2013/073611, dated Jan. 29, 2015, 9 pp.

Response to Written Opinion dated Mar. 28, 2014, from International Application No. PCT/US2013/073611, dated Oct. 6, 2014, 19 pp.

Response to Second Written Opinion dated Jan. 29, 2015, from International Application No. PCT/US2013/073611, dated Feb. 27, 2015, 6 pp.

U.S. Appl. No. 61/670,075, by Xiang Li, filed Jul. 10, 2012.

U.S. Appl. No. 61/706,692, by Xiang Li, filed Sep. 27, 2012.

Tech, et al., "3D-HEVC Test Model 2," Joint Collaborative Team on 3D Video Coding Extension Development of ITU-SG 16 WP 3 and ISO/IEC JTC 1/SC 29/WG 11, Document: JCT3V-B1005_d0, 2nd Meeting: Shanghai, CN, XP030130414, Oct. 13-19, 2012, 118 pp.

Office Action, and translation thereof, counterpart Taiwan Application No. 102144965, dated Oct. 19, 2015, 23 pp.

Non-Final Office Action from U.S. Appl. No. 14/098,333 dated Dec. 15, 2015 (9 pages).

Office Action, and translation thereof, Taiwan Application No. 1102144966, dated Apr. 15, 2015, 34 pp.

Office Action, and translation thereof, Taiwan Application No. 102144964, dated Apr. 15, 2015, 14 pp.

Non-Final Office Action from U.S. Appl. No. 14/098,357 dated Oct. 8, 2015 (22 pages).

Response to Office Action dated Oct. 8, 2015, from U.S. Appl. No. 14/098,357, filed Jan. 8 2016, (16 pages).

Office Action, and translation thereof, from counterpart Taiwan Application No. 102144969, dated Dec. 7, 2015, 13 pp.

Non Final Office Action from U.S. Appl. No. 14/098,369, dated Mar. 10, 2016, 12 pp.

Response to Office Action dated Dec. 15, 2015 from U.S. Appl. No. 14/098,333, filed Mar. 15, 2016, 12 pp.

Notice of Allowance from U.S. Appl. No. 14/098,333, dated Apr. 7, 2016, 8 pp.

Amendment in Response to Office Action dated Mar. 10, 2016 from U.S. Appl. No. 14/098,369 filed Jun. 10, 2016 (13 pages).

Final Office Action from U.S. Appl. No. 14/098,369 dated Sep. 23, 2016 (10 pages).

Response to Final Office Action from U.S. Appl. No. 14/098,369 dated Sep. 23, 2016, filed Nov. 15, 2016 (6 pages).

Advisory Action from U.S. Appl. No. 14/098,369 dated Dec. 16, 2016 (3 pages).

Notice of Appeal and Pre-Appeal Brief Request for Review in response to Advisory Action from U.S. Appl. No. 14/098,369 dated Dec. 16, 2016, filed Jan. 19, 2017, (6 pages).

Kang, et al., "Simplified Adaptive Luminance Compensation in 3D-AVC," JCT-3V Meeting; Apr. 20-26, 2013; Incheon; (The Joint Collaborative Team on 3d Video Coding Extension Development of ISO/IEC JTC1/SC29/WG11 and ITU-T SG.16 ); URL: http://phenix.int-evry.fr/jct2/,, No. JCT3V-D0188, Apr. 13, 2013, XP030130852, 4 pp.

Final Office Action from U.S. Appl. No. 14/098,357, dated Apr. 29, 2016, 19 pp.

Response to Final Office Action dated Apr. 29, 2016, from U.S. Appl. No. 14/098,357, filed Jun. 27, 2016, 15 pp.

Advisory Action from U.S. Appl. No. 14/098,357, dated Jul. 29, 2016, 6 pp.

Pre-Appeal Brief Request for Review of the Final Office Action and Advisory Action from U.S. Appl. No. 14/098,357, filed Aug. 29, 2016, 5 pp.

Tech, et al., "3D-HEVC Test Model 2," Oct. 13-19, 2012, (Joint Collaborative Team on 3D Video Coding Extension Development of ITU-T SG 16 WP 3 and ISO/IEC JTC 1/SC 29/WG 11), No. JCT3V-B1005_d0, Dec. 23, 2012; 118 pp.

Final Office Action from U.S. Appl. No. 14/098,369, dated Sep. 23, 2016, 10 pp.

Examiner's Answer for U.S. Appl. No. 14/098,357 dated May 1, 2017 (9 pages).

An J., et al., "Removal of the parsing dependency of inter-view residual prediction", 102. MPEG Meeting; Oct. 15, 2012-Oct. 19, 2012; Shanghai; (Motion Picture Expert Group or ISO/IEC JTC1/SC29/WG11), No. m26833, JCT3V-B0093, Oct. 9, 2012 (Oct. 9, 2012), pp. 1-5, XP030055163.

Bici O., et al., "Description of Scalable Video Coding Technology Propasal by Nokia (encoder configuration 1)", 11.JCT-VC Meeting; 102. MPEG Meeting Oct. 10, 2012-Oct. 19, 2012; Shanghai; (Joint Collaborative Team on Video coding of ISO/IEC JTC1/SC291WG11 and ITU-T SG.16); URL: http://wftp3.itu.int/av-arch/jctvc-site/no.jvtcv-k0040, Oct. 1, 2012 (Oct. 1, 2012), XP030112972, pp. 1-13.

"HEVC 3DVC extension text specification draft 1 based on High efficiency video coding (HEVC) text specification draft 7", Joint Collaborative Team on 3D Video Coding Extension Development of ITU-T SG 16 WP3 and ISO/IEC JTC1/SC29/WG11 1st Meeting: Stockholm, SE, Jul. 16-20, 2012, URL:http://phenix.it-sudparis.eu/jct2/doc_end/user/documents/1_Stockholm/wg11/JCT3V-A0012 v1.zip, Jul. 11, 2012, JCT3V-A0012-v1, 86,87,114,300 (7 pages).

Takeuchi K., et al., "An approach to embedded system implementation of multi-view video decoding," IEICE Technical Report, Japan, The Institute of Electronica, Information and Communication Engineers, 2012, vol. 112, No. 78, pp. 71-76. Translation of Abstract only.

(56) References Cited

OTHER PUBLICATIONS

Reply Brief from U.S. Appl. No. 14/098,357, filed Jun. 22, 2017 (9 pages).
Examiner's Answer from U.S. Appl. No. 14/098,369 dated Sep. 21, 2017 (18 pages).
Bross, B., et al., "High Efficiency Video Coding (HEVC) Text Specification Draft 9", JCTVC_K1003_v1, Joint Collaborative Team on Video Coding(JCT-VC) 11th Meeting, Shanghai, CN, Oct. 10-19, 2012, pp. 281.
Reply Brief from U.S. Appl. No. 14/098,369, filed Nov. 21, 2017 (9 pp.).

\* cited by examiner

FIG. 11

ADVANCED RESIDUAL PREDICTION IN SCALABLE AND MULTI-VIEW VIDEO CODING

This application claims the benefit of U.S. Provisional Application No. 61/734,874, filed Dec. 7, 2012, the entire content of which is incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure relates to inter-view residual prediction for multi-layer encoder-decoders (codecs) and three-dimensional video (3DV) codecs based on two-dimensional codecs, such as High Efficiency Video Coding (HEVC). The techniques of this disclosure, in some instances, may be used to refine an advanced inter-residual prediction (ARP) process. For example, aspects of this disclosure may relate to enabling/disabling ARP, interpolation in ARP, and weighting factors in ARP.

In one example, a method of coding multi-layer video data includes determining, for a first block of video data at a first temporal location, whether one or more reference picture lists for coding the first block contain at least one reference picture at a second, different temporal location, and coding the first block of video data relative to at least one reference block of video data of a reference picture in the one or more reference picture lists, wherein coding includes disabling an inter-view residual prediction process when the one or more reference picture lists do not include at least one reference picture at the second temporal location.

In another example, an apparatus for coding multi-layer video data includes one or more processors configured to determine, for a first block of video data at a first temporal location, whether one or more reference picture lists for coding the first block contain at least one reference picture at a second, different temporal location, and code the first block of video data relative to at least one reference block of video data of a reference picture in the one or more reference picture lists, wherein coding includes disabling an inter-view residual prediction process when the one or more reference picture lists do not include at least one reference picture at the second temporal location.

In another example, an apparatus for coding multi-layer video data includes means for determining, for a first block of video data at a first temporal location, whether one or more reference picture lists for coding the first block contain at least one reference picture at a second, different temporal location, and means for coding the first block of video data relative to at least one reference block of video data of a reference picture in the one or more reference picture lists, wherein coding includes disabling an inter-view residual prediction process when the one or more reference picture lists do not include at least one reference picture at the second temporal location.

In another example, a non-transitory computer-readable medium has instructions stored thereon that, when executed, cause one or more processors to determine, for a first block of video data at a first temporal location, whether one or more reference picture lists for coding the first block contain at least one reference picture at a second, different temporal location, and code the first block of video data relative to at least one reference block of video data of a reference picture in the one or more reference picture lists, wherein coding includes disabling an inter-view residual prediction process when the one or more reference picture lists do not include at least one reference picture at the second temporal location.

In another example, a method of coding video data includes determining a location of a temporal reference block indicated by a temporal motion vector to a current block of video data, wherein the current block and the temporal reference block are located in a first layer of video data, interpolating, with a first type of interpolation, a location of a disparity reference block indicated by a disparity vector of the current block, wherein the disparity reference block is located in a second, different layer, and wherein the first type of interpolation comprises a bi-linear filter, determining a temporal-disparity reference block of the disparity reference block indicated by a combination of the temporal motion vector and the disparity vector, and coding the current block based on the temporal reference block, the disparity reference block, and the temporal-disparity reference block.

In another example, an apparatus for coding video data includes one or more processors configured to determine a location of a temporal reference block indicated by a temporal motion vector to a current block of video data, wherein the current block and the temporal reference block are located in a first layer of video data, interpolate, with a first type of interpolation, a location of a disparity reference block indicated by a disparity vector of the current block, wherein the disparity reference block is located in a second, different layer, and wherein the first type of interpolation comprises a bi-linear filter, determine a temporal-disparity reference block of the disparity reference block indicated by a combination of the temporal motion vector and the disparity vector, and code the current block based on the temporal reference block, the disparity reference block, and the temporal-disparity reference block.

In another example, an apparatus for coding video data includes means for determining a location of a temporal reference block indicated by a temporal motion vector to a current block of video data, wherein the current block and the temporal reference block are located in a first layer of video data, means for interpolating, with a first type of interpolation, a location of a disparity reference block indicated by a disparity vector of the current block, wherein the disparity reference block is located in a second, different layer, and wherein the first type of interpolation comprises a bi-linear filter, means for determining a temporal-disparity reference block of the disparity reference block indicated by a combination of the temporal motion vector and the disparity vector, and means for coding the current block based on the temporal reference block, the disparity reference block, and the temporal-disparity reference block.

In another example, a non-transitory computer-readable medium has instructions store thereon that, when executed, cause one or more processors to determine a location of a temporal reference block indicated by a temporal motion vector to a current block of video data, wherein the current block and the temporal reference block are located in a first layer of video data, interpolate, with a first type of interpolation, a location of a disparity reference block indicated by a disparity vector of the current block, wherein the disparity reference block is located in a second, different layer, and wherein the first type of interpolation comprises a bi-linear filter, determine a temporal-disparity reference block of the disparity reference block indicated by a combination of the temporal motion vector and the disparity vector, and code the current block based on the temporal reference block, the disparity reference block, and the temporal-disparity reference block.

In another example, a method of coding video data includes determining a partition mode for coding a block of video data, wherein the partition mode indicates a division of the block of video data for predictive coding, determining whether to code a weighting factor for an inter-view residual prediction process based on the partition mode, wherein, when the weighting factor is not coded, the inter-view residual prediction process is not applied to predict a residual for the current block, and coding the block of video data with the determined partition mode.

In another example, an apparatus for coding video data includes one or more processors configured to determine a partition mode for coding a block of video data, wherein the partition mode indicates a division of the block of video data for predictive coding, determine whether to code a weighting factor for an inter-view residual prediction process based on the partition mode, wherein, when the weighting factor is not coded, the inter-view residual prediction process is not applied to predict a residual for the current block, and code the block of video data with the determined partition mode.

In another example, an apparatus for coding video data includes means for determining a partition mode for coding a block of video data, wherein the partition mode indicates a division of the block of video data for predictive coding, means for determining whether to code a weighting factor for an inter-view residual prediction process based on the partition mode, wherein, when the weighting factor is not coded, the inter-view residual prediction process is not applied to predict a residual for the current block, and means for coding the block of video data with the determined partition mode.

In another example, a non-transitory computer-readable medium has instructions stored thereon that, when executed, cause one or more processors to determine a partition mode for coding a block of video data, wherein the partition mode indicates a division of the block of video data for predictive coding, determine whether to code a weighting factor for an inter-view residual prediction process based on the partition mode, wherein, when the weighting factor is not coded, the inter-view residual prediction process is not applied to predict a residual for the current block, and code the block of video data with the determined partition mode.

In another example, a method of coding video data includes determining, for a first block of video data in a first layer of video data, a temporal motion vector and associated temporal reference picture for predicting the first block, wherein the temporal reference picture has a picture order count value, determining a disparity reference block in a disparity reference picture indicated by a disparity vector associated with the first block, wherein the disparity reference picture is included in an access unit that includes a picture containing the first block an a second, different view that the first block, determining whether a decoded picture buffer contains a temporal-disparity reference picture in the second view and having the picture order count value of the temporal reference picture, wherein the temporal-disparity reference picture is located based on a combination of the temporal motion vector and the disparity vector, when the decoded picture buffer does not contain a temporal-disparity reference picture in the second view and having the picture order count value of the temporal reference picture, modifying an inter-view residual prediction process for predicting residual data of the first block, and coding the residual for the first block of video data with one of the inter-view residual prediction process and the modified inter-view residual prediction process.

In another example, an apparatus for coding video data includes one or more processors configured to determine, for a first block of video data in a first layer of video data, a temporal motion vector and associated temporal reference picture for predicting the first block, wherein the temporal reference picture has a picture order count value, determine a disparity reference block in a disparity reference picture indicated by a disparity vector associated with the first block, wherein the disparity reference picture is included in an access unit that includes a picture containing the first block an a second, different view that the first block, determine whether a decoded picture buffer contains a temporal-disparity reference picture in the second view and having the picture order count value of the temporal reference picture, wherein the temporal-disparity reference picture is located based on a combination of the temporal motion vector and the disparity vector, when the decoded picture buffer does not contain a temporal-disparity reference picture in the second view and having the picture order count value of the temporal reference picture, modify an inter-view residual prediction process for predicting residual data of the first block, and code the residual for the first block of video data with one of the inter-view residual prediction process and the modified inter-view residual prediction process.

In another example, an apparatus for coding video data includes means for determining, for a first block of video data in a first layer of video data, a temporal motion vector and associated temporal reference picture for predicting the first block, wherein the temporal reference picture has a picture order count value, means for determining a disparity reference block in a disparity reference picture indicated by a disparity vector associated with the first block, wherein the disparity reference picture is included in an access unit that includes a picture containing the first block an a second, different view that the first block, means for determining whether a decoded picture buffer contains a temporal-disparity reference picture in the second view and having the picture order count value of the temporal reference picture, wherein the temporal-disparity reference picture is located based on a combination of the temporal motion vector and the disparity vector, when the decoded picture buffer does not contain a temporal-disparity reference picture in the second view and having the picture order count value of the temporal reference picture, means for modifying an inter-view residual prediction process for predicting residual data of the first block, and means for coding the residual for the first block of video data with one of the inter-view residual prediction process and the modified inter-view residual prediction process.

In another example, a non-transitory computer-readable medium has instructions stored thereon that, when executed, cause one or more processors to determine, for a first block of video data in a first layer of video data, a temporal motion vector and associated temporal reference picture for predicting the first block, wherein the temporal reference picture has a picture order count value, determine a disparity reference block in a disparity reference picture indicated by a disparity vector associated with the first block, wherein the disparity reference picture is included in an access unit that includes a picture containing the first block an a second, different view that the first block, determine whether a decoded picture buffer contains a temporal-disparity reference picture in the second view and having the picture order count value of the temporal reference picture, wherein the temporal-disparity reference picture is located based on a combination of the temporal motion vector and the disparity vector, when the decoded picture buffer does not contain a temporal-disparity reference picture in the second view and having the picture order count value of the temporal reference picture, modify an inter-view residual prediction process for predicting residual data of the first block, and code the residual for the first block of video data with one of the inter-view residual prediction process and the modified inter-view residual prediction process.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 11 is a conceptual diagram illustrating integer samples and fractional sample positions for quarter sample luma interpolation.

DETAILED DESCRIPTION

Figure 1:
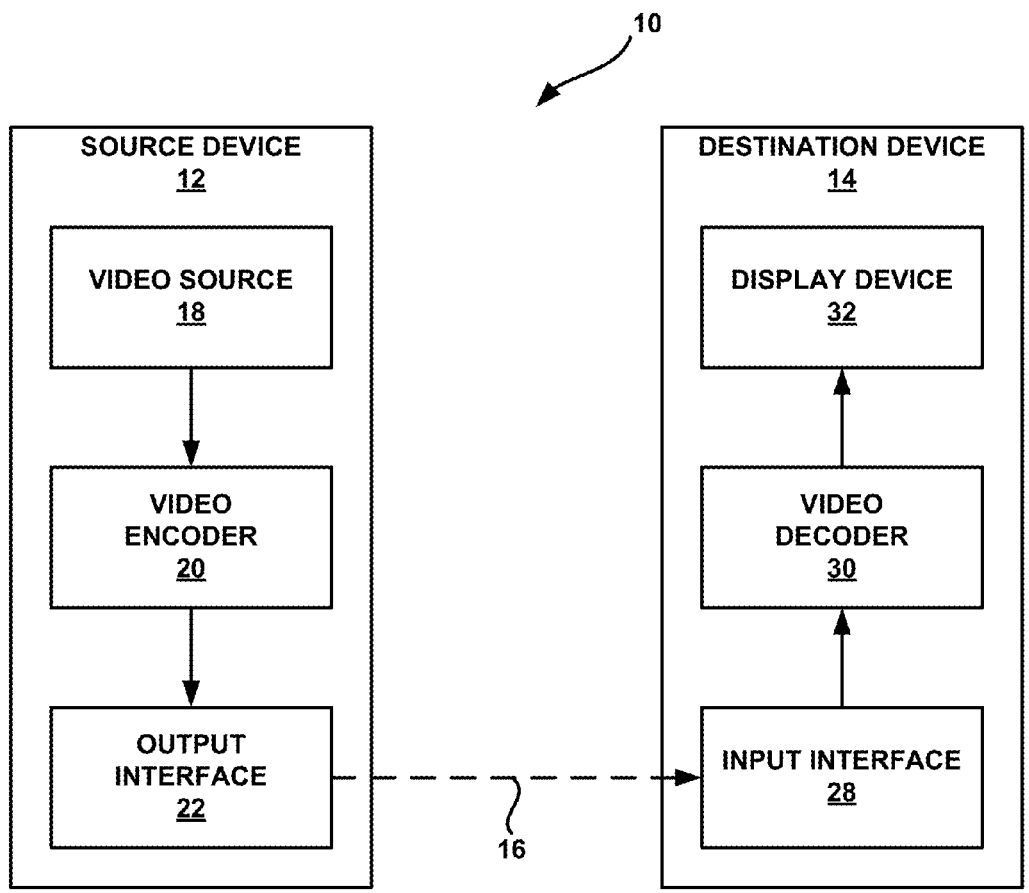
FIG. 1 is a block diagram illustrating an example video encoding and decoding system that may utilize the techniques described in this disclosure.

The techniques of this disclosure generally relate to various techniques to further improve coding efficiency of advanced residual prediction (ARP) for multiview, 3DV (e.g., multi-view plus depth), or scalable codecs based on advanced two dimensional (2D) codecs. For example, a High Efficiency Video Coding (HEVC) standard is being developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 9" (also referred to herein as WD9) is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting, Shanghai, China, October 2012 and is available from http://phenix.int-evry.fr/jct/doc_en-d_user/documents/11_Shanghai/wg11/JCTVC-K1003-v10.zip.

One usage of HEVC may be in the area of high and ultra-high definition (UHD) video. Many high definition (HD) displays are already capable of rendering stereo video, and the increased resolution and display size of UHD displays may make such displays even more suitable for stereo video. Beyond that, the improved compression capability of HEVC (e.g., an expected half bit rate with same quality compared to H.264/AVC High profile) may make HEVC a good candidate for coding stereo video. For example, using mechanisms that exploit the redundancy between views, a video coder (e.g., a video encoder or video decoder) may be able to use HEVC to code full resolution stereo video at even lower rates than a single view (monoscopic) video of the same quality and resolution coded using the H.264/AVC standard.

Similarly to AVC-based projects, a Joint Collaboration Team on 3D Video Coding (JCT-3V) of VCEG and MPEG is conducting study of two 3DV solutions that are using the HEVC coding technology. The first is multi-view extension of HEVC, referred to as MV-HEVC and another is depth enhanced HEVC-based full 3DV codec, 3D-HEVC. Part of the standardization efforts includes the standardization of multi-view/3D Video coding based on HEVC. The latest software 3D-HTM version 5.0 is electronically available at https://hevc.hhi.fraunhofer.de/svn/svn_3DVCSoftware/tags/HTM-5.0/. The techniques described below may be implemented in conjunction with the two proposed 3DV solutions above.

In some instances, the techniques may also (or alternatively) be implemented with a scalable extension to HEVC. In scalable video coding, multiple layers of video data may be coded. In some instances, each layer may correspond to a particular view. Here, the application of view scalability and spatial scalability are considered highly beneficial in the evolution of 3D services, as they allow for backward-compatible extensions for more views, and/or enhancing the resolution of views in a way that decoding by legacy devices is possible.

In two-dimensional video coding, video data (that is, a sequence of pictures) is coded picture by picture, not necessarily in display order. Video coding devices divide each picture into blocks, and code each block individually. Block-based prediction modes include spatial prediction, also referred to as intra-prediction, and temporal prediction, also referred to as inter-prediction.

For three-dimensional video data, such as multiview or scalable coded data, blocks may also be inter-view and/or inter-layer predicted. As described herein, a video "layer" may generally refer to a sequence of pictures having at least one common characteristic, such as a view, a frame rate, a resolution, or the like. For example, a layer may include video data associated with a particular view (e.g., perspective) of multiview video data. As another example, a layer may include video data associated with a particular layer of scalable video data.

Thus, this disclosure may interchangeably refer to a layer and a view of video data. That is, a view of video data may be referred to as a layer of video data, and vice versa. Moreover, the terms inter-view prediction and inter-layer prediction may interchangeably refer to prediction between multiple layers and/or views of video data. In addition, multi-layer codec (or multi-layer video coder) may jointly refer to a multiview codec or a scalable codec.

In multiview or scalable video coding, blocks may be predicted from a picture of another view or layer of video data. In this manner, inter-view prediction based on reconstructed view components from different views may be enabled. This disclosure uses the term "view component" to refer to an encoded picture of a particular view or layer. That is, a view component may comprise an encoded picture for a particular view at a particular time (in terms of display order, or output order). A view component (or slices of a view component) may have a picture order count (POC) value, which generally indicates the display order (or output order) of the view component.

Typically, the same or corresponding objects of two views are not co-located. The term "disparity vector" may be used to refer to a vector that indicates displacement of an object in a picture of a view relative to the corresponding object in a different view. Such a vector may also be referred to as a "displacement vector." A disparity vector may also be applicable to a pixel or a block of video data of a picture. For example, a pixel in a picture of a first view may be displaced with respect to a corresponding pixel in a picture of a second view by a particular disparity vector related to differing camera locations from which the first view and second view are captured. In some examples, disparity vector can be used to predict the motion information (motion vector(s) with or without reference picture index(es)) from one view to another view.

Thus, to further improve the coding efficiency, a video coder may also apply inter-view motion prediction and/or inter-view residual prediction. With respect to inter-view motion prediction, a video coder may code a motion vector associated with a block of one view relative to a motion vector associated with a block of a second different view. Likewise, as described in greater detail below, in inter-view residual prediction, a video coder may code residual data of one view relative to residual of a second, different view. In some instances, inter-view residual prediction may be referred to as advanced residual prediction (ARP), particularly in the context of 3D-HEVC.

In ARP, a video coder determines a predictive block for predicting a current block. The predictive block for the current block may be based on samples of a temporal reference picture that are associated with a location indicated by a motion vector of the current block. The temporal reference picture is associated with the same view as the current picture but is associated with a different time instance than the current picture. In some instances, when samples of a block are based on samples of a particular picture, the samples may be based on actual or interpolated samples of the particular picture.

In addition, in ARP, the video coder determines a disparity reference block based on samples of a disparity reference picture that are at a location indicated by a disparity vector of the current block. The disparity reference picture is associated with a different view (i.e., a reference view) than the current picture, but is associated with the same time instance as the current picture.

The video coder also determines a temporal-disparity reference block for the current block. The temporal-reference block is based on samples of a temporal-disparity reference picture that are associated with a location indicated by the motion vector of the current block and the disparity vector. For example, the temporal-disparity reference block may be located by applying the temporal motion vector (e.g., reusing the temporal motion vector) to the disparity reference block. Hence, the temporal-disparity reference picture is associated with the same view as the disparity reference picture and is associated with the same access unit as the temporal reference picture of the current block.

While the temporal-disparity reference block is described herein as being located by applying the temporal motion vector to the disparity reference block for purposes of illustration, in some instances, the temporal motion vector may not actually be directly applied to the disparity reference picture. Rather, the temporal motion vector may be combined with the disparity vector to locate the temporal-disparity reference block, e.g., relative to the current block. For example, assume for purposes of illustration that disparity vectors are denoted as DV[0] and DV[1] and temporal motion vectors are denoted as TMV[0] and TMV[1]. In this example, a video coder (such as a video encoder or video decoder) may determine the location of the temporal-disparity blocks in the temporal-disparity reference pictures relative to the current block by combining the disparity vectors and temporal motion vectors, e.g., DV[0]+TMV[0], DV[1]+TMV[1]. Hence, references herein to "applying a temporal motion vector to a disparity reference block" do not necessarily require that the temporal motion vector is directly applied to the location of the disparity reference block.

The video coder then determines a residual predictor for predicting residual associated with the current block, e.g., the difference between the current block and the temporal reference block. Each sample of the residual predictor for the current block indicates a difference between a sample of the disparity reference block and a corresponding sample of the temporal-disparity reference block. In some instances, the video coder may apply a weighting factor (e.g., 0, 0.5, 1, or the like) to the residual predictor to increase the accuracy of the residual predictor.

In instances which the video coder is a video encoder, the video encoder may determine a final residual block for the current block. The final residual block comprises samples that indicate differences between samples of the current block, samples in the temporal predictive block, and samples in the residual predictor. The video encoder may include, in a bitstream, data that represents the final residual block. In instances where the video coder is a video decoder, the video decoder may reconstruct the current block based on the final residual block, the residual predictor, and the temporal predictive block.

While ARP may improve the coding efficiency of inter-view (or inter-layer) residual prediction, further refinements are possible. For example, certain techniques of this disclosure relate to the ARP weighting factor. As noted above, a video coder may apply a weighting factor to the residual predictor. In general, the weighting factor is always signaled in the bitstream, regardless of whether there is a temporal reference picture in the reference picture lists for coding the current block. However, signaling the weighting factor when there is no temporal reference picture may needlessly increase complexity and decrease efficiency, because if there are no temporal reference pictures, there is no temporal prediction and associated residual for applying ARP.

One instance in which there may be no temporal reference pictures in the reference picture lists (e.g., neither list 0 nor list 1) is when coding random access pictures. As described in greater detail below, random access pictures are not temporally predicted. Random access pictures are typically only intra-predicted or inter-view predicted (only inter-view reference pictures are included in a reference picture list). Thus, as noted above, the signaling of weighting factors is unnecessary and inefficient, because there is no residual for which to determine a predictor.

According to aspects of this disclosure, a video coder (such as a video encoder or a video decoder) may enable or disable ARP (including coding residual of one layer relative to residual of a second, different layer) based on the reference pictures in the reference picture lists for the block currently being coded. In an example, the video coder may enable or disable ARP based on whether the reference picture lists (e.g., list 0 or list 1) for the block currently being coded include any temporal reference pictures. According to aspects of this disclosure, if the reference picture lists for an inter-predicted slice includes only inter-view reference pictures, the video coder may disable ARP when coding the blocks of the slice. In such an example, when the video coder comprises a video encoder, the video encoder may not signal a weighting factor for all blocks (e.g., coding units or prediction units in the context of High Efficiency Video Coding (HEVC), as described in greater detail below) within the slice in the bitstream (skip the signaling of a weighting factor). Likewise, when the video coder comprises a video decoder, the video decoder may likewise skip the decoding of a weighting factor and automatically determine (i.e., infer) that the weighting factor is equal to zero.

The techniques described above may be applied in the context of random access pictures. For example, according to aspects of this disclosure, a video coder may enable or disable ARP based on whether the view component currently being coded is a random access view component. As noted above, random access view components do not have temporal reference pictures, as random access pictures are intra-predicted or inter-view predicted. Hence, the video coder may disable ARP for each block of a random access view component. Again, video encoder may not signal a weighting factor in the bitstream (skip the signaling of a weighting factor). Likewise, when the video coder comprises a video decoder, the video decoder may likewise skip the decoding of a weighting factor and infer that the weighting factor is equal to zero.

In another example, according to aspects of this disclosure, a video coder may enable ARP if at least one reference picture is from the same view as the block currently being coded. Additionally or alternatively, the video coder may enable ARP only when both reference pictures (corresponding to a reference picture in RefPicList0 and a reference picture in RefPicList1), if available, are of the same view as the block currently being coded. Additionally or alternatively, the video coder may disable ARP for a block if the block is inter-view coded with an inter-view reference picture. As noted above, when ARP is disabled, the weighting factor is not signaled.

Techniques of this disclosure also relate to interpolation in ARP. For example, when performing ARP (e.g., the weighting factor is not zero) both a video encoder and a video decoder may use an additional motion compensation process during the residual predictor generation process. Therefore, if a motion vector indicates a fractional-pixel (fractional-pel) location, the video coder performs two fractional-pel interpolation processes, e.g., one interpolation process to locate the temporal reference block and another interpolation process to locate the disparity-temporal reference block. In addition, the video coder may apply yet another fractional-pel interpolation process when determining a disparity reference block. In HEVC, an 8-tap filter is specified for luma components, while a 4-tap filter is specified for chroma components. Such interpolation processes may increase the computational complexity associated with ARP.

According to aspects of this disclosure, the motion compensation process of ARP may be simplified, particularly with respect to sub-pixel (sub-pel) interpolation of reference blocks. For example, a video coder may determine the disparity reference block in a way similar to or the same as the process used to generate the prediction signal during motion compensation (e.g., the process used to determine the temporal reference block). That is, the video coder may determine the disparity reference block using the reconstructed reference view picture with a disparity vector of the current block.

In some instances, according to aspects of this disclosure, the video coder may use one or more types of interpolations for determining the locations of reference blocks in ARP. For example, the video coder may use a low pass filter, such as a bi-linear filter, to interpolate the location of the disparity reference block. Additionally or alternatively, the video coder may use the low pass filter to interpolate the location of the temporal-disparity reference block. In still another example, the video coder may use the low pass filter to interpolate the location of the temporal reference block. Accordingly, according to aspects of this disclosure, the video coder may use a bi-linear filter to interpolate the location of one or more reference blocks in ARP, which may be more computationally efficient than applying the higher tap filters specified by HEVC. While references are made herein to bi-linear filters, it should be understood that one or more other low pass filters may also or alternatively be used. According to aspects of this disclosure, the video coder may apply the low pass filters described above to any combination of luma components, chroma components, or both luma and chroma components.

Techniques of this disclosure also relate to signaling an ARP weighting factor for particular coding modes and/or partition modes. For example, in general, a weighting factor may be signaled for all partition modes (as described in greater detail, for example, with respect to the example shown in FIG. 12) including PART_2N×2N, PART_2N×N, PART_N×2N, or the like, and all inter-coded modes including skip, merge, advanced motion vector prediction (AMVP). Signaling the weighting factor for all partition modes and inter-modes may needlessly increase complexity and decrease efficiency, because ARP may not be efficiently applied with certain partition modes or inter-modes.

According to aspects of this disclosure, ARP may be enabled or disabled based on a partition mode and/or coding mode of the block currently being coded. For example, weighting factors may only be signaled for only certain partition modes and/or certain coding modes. If a weighting factor is not included in a bitstream, a video decoder may skip the decoding of the weighting factor and infer that the weighting factor is zero valued (thereby disabling ARP). According to aspects of this disclosure, in some examples, the weighting factor for any inter-coded block with partition mode unequal to PART_2N×2N may not be signaled. In another example, the weighting factor for an inter-coded block with a partition mode other than PART_2N×2N, PART_2N×N and PART_N×2N may not be signaled. In still another example, additionally or alternatively, the weighting factor for any inter-coded block with coding mode unequal to skip mode and/or merge mode may not be signaled.

Techniques of this disclosure also relate to refining the manner in which weighting factors are signaled in the bitstream. For example, in general, a video coder may select a weighting factor from a fixed set of three fixed weighting factors (e.g., 0, 0.5 and 1). However, in some instances, three static weighting factors may not provide enough flexibility to achieve sufficient prediction efficiency, due to quality differences between a current view and its reference view. Quality differences between the current view and the reference view may be dynamic, particular with respect to scalable video coding. Conversely, three weighting factors may exceed the needs of some slices or pictures. That is, some slices or pictures may not need to select from three weighting factors to achieve an optimal balance between the complexity and coding efficiency improvement.

According to aspects of this disclosure, a more flexible approach to weighting factors may be implemented. For example, the number of available weighting factors may be altered at the sequence level (e.g., in a parameter set, such as a sequence parameter set (SPS)). In an example for purposes of illustration, an indicator may be signaled in an SPS to disable one or more weighting factors, e.g., 0.5 and/or 1. In another example, such an indicator may be signaled in a video parameter set (VPS) and applicable for all non-base views. In still another example, such an indicator may be signaled in a VPS extension for each non-base view. In another example, such an indicator may be provided in a picture parameter set (PPS), a slice header or a view parameter set to disable one or more weighting factors. When a weighting factor has been disabled, fewer bits may be used to represent that remaining weighting factors, thereby providing a bit savings.

According to other aspects, an indicator may be provided to modify and/or replace one or more weighting factors. In an example, the video coder may replace the 0.5 weighting factor with a 0.75 weighting factor. This indicator may be signaled in a slice header, an SPS, a picture parameter set (PPS), or a VPS.

Techniques of this disclosure also relate to determining whether to enable or disable an ARP process based on the reference pictures of a decoded picture buffer (which may also be interchangeably referred to as a reference picture memory, as described in greater detail with respect to FIGS. 2 and 3 below) and/or reference picture lists. For example, as noted above, a temporal-disparity reference block for determining the residual predictor is typically located by applying the temporal motion vector to the disparity reference block. However, in some instances, the decoded picture buffer may not contain the picture indicated by applying the temporal motion vector to the disparity reference block. That is, the decoded picture buffer may not contain a picture in the same view as the disparity reference block that also has the same picture order count (POC) value as the temporal reference picture of current block.

In some examples, even if the picture is included in the decoded picture buffer, the reference picture list or reference picture lists of the slice containing the disparity reference block may not contain the picture indicated by applying the temporal motion vector to the disparity reference block, e.g., the potential temporal-disparity reference picture. In such instances, locating the temporal-disparity reference block may introduce an error and/or delay into the coding process.

According to aspects of this disclosure, a video coder may enable or disable ARP based on the pictures of a decoded picture buffer and/or reference picture lists. For example, when the decoded picture buffer for coding a current block does not include a picture in the same view as the disparity reference picture having the same POC as the temporal reference picture of the current block, a video coder may modify the ARP process.

In another example, additionally or alternatively, when the reference picture list(s) of the disparity reference block does not include a picture in the same view as the disparity reference picture having the same POC as the temporal reference picture of the current block, a video coder may modify the ARP process. That is, given the current reference picture list index X (with X being 0 or 1), in one example, if the reference picture list with a list index equal to X of the disparity reference block does not include a reference picture in the same view as the disparity reference picture and having the same POC as the temporal reference picture of the current block, the video coder may modify the ARP process. In another example, if neither of the reference picture lists (e.g., neither list 0 nor list 1) of the disparity reference block include a reference picture in the same view as the disparity reference picture and having the same POC as the temporal reference picture of the current block, the video coder may modify the ARP process.

In some examples, the video coder may modify the ARP process by disabling the ARP process, such that the current block is not coded using ARP. That is, the residual predictor is not generated or always set to 0. In other examples, the video coder may modify the ARP process by scaling the temporal motion vector to identify another temporal-disparity reference picture. For example, the video coder may scale the temporal motion vector such that, when applied to the disparity reference picture, the scaled motion vector identifies a temporal-disparity reference picture that is included in the reference picture list and is in a location temporally nearest to the disparity reference picture. The techniques described above may prevent the video coder from attempting to locate the disparity reference block in a picture that is not included in the reference picture list(s).

FIG. 1 is a block diagram illustrating an example video encoding and decoding system 10 that may utilize the techniques of this disclosure for advanced residual prediction (ARP). As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multi-view coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for advanced residual prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

In some instances, video encoder 20 and video decoder 30 may operate according to proprietary or industry standards, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT).

Video encoder 20 and video decoder 30 may additionally or alternatively operate according to another video coding standard, such as the High Efficiency Video Coding (HEVC) standard. A draft of the HEVC standard, referred to as "HEVC Working Draft 9" is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, $11^{th}$ Meeting, Shanghai, China, October 2012.

Furthermore, as noted above, there are ongoing efforts to produce scalable video coding, multiview coding, and 3DV extensions for HEVC. Accordingly, in some instances, video encoder 20 and video decoder 30 may perform multiview video coding. For example, video encoder 20 and video decoder 30 may implement a multi-view extension of HEVC (referred to as MV-HEVC), a depth enhanced HEVC-based full 3DV codec (referred to as 3D-HEVC), or a scalable video coding extension of HEVC (referred to as SHEVC (scalable HEVC) or HSVC (high efficiency scalable video coding).

The techniques described below may be implemented in conjunction with one or more of the HEVC extensions noted above. For 3D-HEVC, new coding tools, including those in the coding unit/prediction unit level, for both texture and depth views may be included and supported. As of Nov. 21, 2013, software for 3D-HEVC (i.e., 3D-HTM version 5.0) can be downloaded from the following link: https://hevc.h-hi.fraunhofer.de/svn/svn_3DVCSoftware/tags/HTM-5.0/.

In general, the motion compensation loop of HEVC is the same as that in H.264/AVC. For example, the reconstruction of a current frame Î in the motion compensation loop may equal de-quantized coefficients r plus temporal prediction P:

$\hat{I}=r+P.$

In the formula above, P indicates uni-predictive inter prediction for P frames or bi-predictive inter prediction for B frames.

However, the unit of motion compensation in HEVC is different from that in previous video coding standards. For example, the concept of a macroblock in previous video coding standards does not exist in HEVC. Rather, macroblocks are replaced by a flexible hierarchical structure based on a generic quadtree scheme. Within this scheme, three types of blocks, i.e., coding units (CUs), prediction units (PUs), and transform units (TUs), are defined. A CU is a basic unit of region splitting. The concept of a CU is analogous to the concept of macroblock, but a CU is not restricted to a maximum size and a CU allows recursive splitting into four equally-sized CUs to improve the content adaptivity. A PU is a basic unit of inter/intra prediction. In some examples, a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. This separation of the block structure into three different concepts may allow each to be optimized according to its role, which may result in improved coding efficiency.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks of macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU. Hence, in this disclosure, a CU may be said to be partitioned into one or more PUs. For ease of explanation, this disclosure may refer to the size of a prediction block of a PU as simply the size of the PU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on samples of the picture associated with the PU. In this disclosure, the phrase "based on" may indicate "based at least in part on."

If video encoder 20 uses inter prediction to generate the predictive blocks of a PU, video encoder 20 may generate the predictive blocks of the PU based on decoded samples of one or more pictures other than the picture associated with the PU. When inter prediction is used to generate the predictive blocks of a block (e.g., a PU), this disclosure may refer to the block as "inter-coded" or "inter predicted." Inter prediction may be uni-predictive (i.e., uni-prediction) or bi-predictive (i.e., bi-prediction). To perform uni-prediction or bi-prediction, video encoder 20 may generate a first reference picture list (RefPicList0) and a second reference picture list (RefPicList1) for a current picture. Each of the reference picture lists may include one or more reference pictures.

After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. The motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

If video encoder 20 uses inter prediction to generate the predictive blocks of a PU, video encoder 20 may generate the predictive blocks of the PU based on samples of one or more pictures other than the picture associated with the PU. For instance, video encoder 20 may perform uni-predictive inter prediction (i.e., uni-prediction) or bi-predictive inter prediction (i.e., bi-prediction) on a PU.

In instances where video encoder 20 performs uni-prediction on a PU, video encoder 20 may determine, based on a motion vector of the PU, a reference location in a reference picture. Video encoder 20 may then determine a predictive block for the PU. Each sample in the predictive block for the PU may be associated with the reference location. In some examples, a sample in a predictive block for a PU may be associated with a reference location when the sample is within a block of samples having the same size as the PU and whose top-left corner is the reference location. Each sample in the predictive block may be an actual or interpolated sample of the reference picture.

In instances where luma samples of the predictive block are based on interpolated luma samples of the reference picture, video encoder 20 may generate the interpolated luma samples by applying an 8-tap interpolation filter to actual luma samples of the reference picture. In instances where chroma samples of the predictive block are based on interpolated chroma samples of the reference picture, video encoder 20 may generate the interpolated chroma samples by applying a 4-tap interpolation filter to actual chroma samples of the reference picture. In general, the number of taps of a filter indicates the number of coefficients required to represent the filter mathematically. A filter with a higher tap number is generally more complex than a filter having a lower tap number.

In instances where video encoder 20 performs bi-prediction on a PU, the PU has two motion vectors. Video encoder 20 may determine, based on the motion vectors of the PU, two reference locations in two reference pictures. Video encoder 20 may then determine, in the manner described above, reference blocks associated with the two reference locations. Video encoder 20 may then determine a prediction block for the PU. Each sample in the prediction block may be a weighted average of corresponding samples in the reference blocks. The weighting of the samples may be based on temporal distances of the reference pictures from the picture containing the PU.

Video encoder 20 may partition a CU into one or more PUs according to various partitioning modes. For instance, if intra prediction is used to generate predictive blocks for the PUs of a CU, the CU may be partitioned according to a PART_2N×2N mode or a PART_N×N mode. In the PART_2N×2N mode, the CU only has one PU. In the PART_N×N mode, the CU has four equally-sized PUs having rectangular prediction blocks. If inter prediction is used to generate predictive blocks for the PUs of a CU, the CU may be partitioned according to the PART_2N×2N mode, the PART_N×N mode, a PART_2N×N mode, a PART_N×2N mode, a PART_2N×nU mode, a PART_2N×nD mode, a PART_nL×2N mode, or a PART_nR×2N mode. In the PART_2N×N mode and the PART_N×2N mode, the CU is partitioned into two equally-sized PUs having rectangular prediction blocks. In each of the PART_2N×nU mode, the PART_2N×nD mode, the PART_nL×2N mode, and the PART_nR×2N mode, the CU is partitioned into two unequally-sized PUs having rectangular prediction blocks.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. Video encoder 20 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. In some examples, the QP value associated with the CU may be associated with the current picture or slice as a whole. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of video data (i.e., coded pictures and associated data). The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL units may encapsulate different RBSPs for video parameter sets (VPSs), sequence parameter sets (SPSs), picture parameter sets (PPSs), coded slices, SEI, and so on. NAL units that encapsulate RBSPs for video coding data (as opposed to RBSPs for parameter sets and SEI messages) may be referred to as video coding layer (VCL) NAL units.

In HEVC, SPSs may contain information that applies to all slices of a coded video sequence (CVS). In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A VPS is a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion information of a PU using merge mode or advanced motion vector prediction (AMVP) mode. In other words, in HEVC, there are two modes for the prediction of motion parameters, one being the merge/skip mode and the other being AMVP. Motion prediction may comprise the determination of motion information of a video unit (e.g., a PU) based on motion information of one or more other video units. The motion information (i.e., the motion parameters) of a PU may include motion vector(s) of the PU, reference index(es) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index (i.e., a merging candidate index) that indicates a position within the candidate list of the selected merge candidate.

Video decoder 30 may obtain, from the bitstream, the index into the candidate list (i.e., the merging candidate index). In addition, video decoder 30 may generate the same merge candidate list and may determine, based on the merging candidate index, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion information (e.g., the motion vector) for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a prediction block for the PU based on a reference block indicated by the motion information of a selected candidate in the merge candidate list. Because skip mode has the same motion vector derivation process as merge mode, techniques described in this document may apply to both merge and skip modes.

AMVP mode is similar to merge mode in that video encoder 20 may generate a candidate list and may select a candidate from the candidate list. However, when video encoder 20 signals the RefPicListX (where X is 0 or 1) motion information of a current PU using AMVP mode, video encoder 20 may signal a RefPicListX motion vector difference (MVD) for the current PU and a RefPicListX reference index for the current PU in addition to signaling a RefPicListX motion vector predictor (MVP) flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP flag, a RefPicListX reference index value, and a RefPicListX MVD. In other words, the data in the bitstream representing the motion vector for the current PU may include data representing a reference index, an index to a candidate list, and an MVD. Thus, the chosen motion vectors may be signaled by transmitting an index into the candidate list. In addition, the reference index values and motion vector differences may also be signaled.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU.

Video decoder 30 may then use the recovered motion vector or motion vectors of the current PU to generate predictive blocks for the current PU.

When a video coder generates an AMVP candidate list for a current PU, the video coder may derive one or more AMVP candidates based on the motion information of PUs that cover locations that spatially neighbor the current PU (i.e., spatially-neighboring PUs) and one or more AMVP candidates based on motion information of PUs that temporally neighbor the current PU (i.e., temporally-neighboring PUs). In AMVP, a candidate list of motion vector predictors for each motion hypothesis may be derived based on a coded reference index. In this disclosure, a PU (or other type of video unit) may be said to "cover" a location if a prediction block associated with the PU (or other type of sample block associated with the video unit) includes the location. The candidate list includes motion vectors of neighboring blocks that are associated with the same reference index as well as a temporal motion vector predictor which is derived based on the motion parameters (i.e., motion information) of the neighboring block of the co-located block in a temporal reference picture.

To further improve the coding efficiency, a video coder may also apply inter-view motion prediction and/or inter-view residual prediction. With respect to inter-view motion prediction, a video coder may code a motion vector associated with a block of one view relative to a motion vector associated with a block of a second different view, e.g., using the merge/skip modes or AMVP mode described above. Likewise, as in inter-view residual prediction, a video coder may code residual data of one view relative to residual of a second, different view. In some instances, inter-view residual prediction may be achieved by applying an advanced residual prediction (ARP) process, as described in greater detail below.

In inter-view residual prediction, video encoder 20 and/or video decoder 30 may determine a predictive block for predicting a current block. The predictive block for the current block may be based on samples of a temporal reference picture that are associated with a location indicated by a motion vector of the current block. The temporal reference picture is associated with the same view as the current picture but is associated with a different time instance than the current picture. In some instances, when samples of a block are based on samples of a particular picture, the samples may be based on actual or interpolated samples of the particular picture.

Video encoder 20 and/or video decoder 30 also determine a disparity reference block based on samples of a disparity reference picture that are at a location indicated by a disparity vector of the current block. The disparity reference picture is associated with a different view (i.e., a reference view) than the current picture, but is associated with the same time instance as the current picture.

Video encoder 20 and/or video decoder 30 also determine a temporal-disparity reference block for the current block. The temporal-reference block is based on samples of a temporal-disparity reference picture that are associated with a location indicated by the motion vector of the current block and the disparity vector (e.g., by the combination of the motion vector and the disparity vector). That is, video encoder 20 and/or video decoder 30 may combine the motion vector and the disparity vector and apply the combined vector to the current block to locate the temporal-disparity reference block in the temporal-disparity reference picture Hence, the temporal-disparity reference picture is associated with the same view as the disparity reference picture and is associated with the same access unit as the temporal reference picture.

Video encoder 20 and/or video decoder 30 then determine a residual predictor for predicting residual associated with the current block, e.g., the difference between the current block and the temporal reference block. Each sample of the residual predictor for the current block indicates a difference between a sample of the disparity reference block and a corresponding sample of the temporal-disparity reference block. In some instances, video encoder 20 and/or video decoder 30 may apply a weighting factor (e.g., 0, 0.5, 1, or the like) to the residual predictor to increase the accuracy of the residual predictor.

Video encoder 20 may determine a final residual block for the current block. The final residual block comprises samples that indicate differences between samples of the current block, samples in the temporal predictive block, and samples in the residual predictor. Video encoder 20 may include, in a bitstream, data that represents the final residual block. Video decoder, the video decoder may reconstruct the current block based on the final residual block (as obtained, for example, from an encoded bitstream), the residual predictor, and the temporal predictive block.

While ARP may improve the coding efficiency of inter-view (or inter-layer) residual prediction, further refinements are possible. For example, certain techniques of this disclosure relate to the ARP weighting factor. As noted above, a video coder may apply a weighting factor to the residual predictor. In general, the weighting factor is always signaled in the bitstream, regardless of whether there is a temporal reference picture in reference picture lists for coding the current block. However, signaling the weighting factor when there is no temporal reference picture may needlessly increase complexity and decrease efficiency, because if there are no temporal reference pictures, there is no temporal prediction and associated residual for applying ARP.

According to aspects of this disclosure, video encoder 20 and/or video decoder 30 may determine, for a first block of video data at a first temporal location, whether reference picture lists (e.g., RefPicList0 and RefPicList1) for coding the first block contains at least one reference picture at a second, different temporal location. Video encoder 20 and/or video decoder 30 may also code the first block of video data relative to at least one reference block of video data of a reference picture in the reference picture lists. However, video encoder 20 and/or video decoder 30 may disable an inter-view residual prediction process when the reference picture lists do not include at least one reference picture at the second temporal location.

Video encoder 20 may not signal a weighting factor in the bitstream (skip the signaling of a weighting factor), thereby indicating inter-view residual prediction is not used. In such instances, video encoder 20 may code residual without predicting the residual. Likewise, when inter-view prediction is disabled, video decoder 30 may automatically determine (i.e., infer) that a weighting factor is equal to zero and skip the decoding of the weighting factor. In this way, video encoder 20 and/or video decoder 30 may enable or disable inter-view residual prediction (e.g., ARP) based on the reference pictures in reference picture lists for the block currently being coded.

The techniques described above may be applied in the context of random access pictures. For example, according to aspects of this disclosure, video encoder 20 and/or video decoder 30 may enable or disable inter-view residual prediction based on whether the view component currently being coded is a random access view component. That is, for example, video encoder 20 and/or video decoder 30 may disable inter-view residual prediction when for all blocks of a random access picture, which do not have associated temporal reference pictures.

Techniques of this disclosure also relate to interpolation in inter-view residual prediction. For example, when performing inter-view residual prediction, both video encoder 20 and video decoder 30 may use an additional motion compensation process during coding. Therefore, if a motion vector indicates a fractional-pel location, the video coder performs two fractional-pel interpolation processes, e.g., one interpolation process to locate the temporal reference block and another interpolation process to locate the disparity-temporal reference block. In addition, video encoder 20 and/or video decoder 30 may apply yet another fractional-pel interpolation process when determining a disparity reference block. In HEVC, as an example, an 8-tap filter is specified for luma components, while a 4-tap filter is specified for chroma components. Such interpolation processes may increase the computational complexity associated with inter-view residual prediction.

According to aspects of this disclosure, the motion compensation process of inter-view residual prediction may be simplified, particularly with respect to sub-pel interpolation of reference blocks. For example, video encoder 20 and/or video decoder 30 may interpolate, with a first type of interpolation, a location of a temporal reference block indicated by a temporal motion vector to a current block of video data, where the current block and the temporal reference block are located in a first layer of video data. In addition, video encoder 20 and/or video decoder 30 may interpolate, with a second type of interpolation, a location of a disparity reference block indicated by a disparity vector of the current block, where the disparity reference block is located in a second, different layer, and where the second type of interpolation comprises a bi-linear filter. Video encoder 20 and/or video decoder 30 may also determine a temporal-disparity reference block of the disparity reference block indicated by applying the temporal motion vector to the disparity reference block, and code the current block based on the temporal reference block, the disparity reference block, and the temporal-disparity reference block (e.g., code the residual of the current block using inter-view residual prediction).

According to some examples, the first type of interpolation may also comprise a low pass filter, such as a bi-linear filter. In another example, a bi-linear filter may be used to interpolate the location of the temporal-disparity reference block. Accordingly, according to aspects of this disclosure, video encoder 20 and/or video decoder 30 may use a low pass filter, such as a bi-linear filter to interoloate the location of one or more reference blocks in inter-view residual prediction. Again, while reference is made to bi-linear filters, in other examples, video encoder 20 and/or video decoder 30 may apply a number of other low pass filters that are more computationally efficient than applying the higher tap filters specified by HEVC (in particular, the filters specified in WD9). According to aspects of this disclosure, video encoder 20 and/or video decoder 30 may apply the low pass filters described above to any combination of luma components, chroma components, or both luma and chroma components.

Techniques of this disclosure also relate to signaling an ARP weighting factor for particular coding modes and/or partition modes. For example, in general, a weighting factor may be signaled for all partition modes (as described in greater detail, for example, with respect to the example shown in FIG. 12) including PART_2N×2N, PART_2N×N, PART_N×2N, or the like, and all inter-coded modes including skip, merge, advanced motion vector prediction (AMVP). Signaling the weighting factor for all partition modes and inter-modes may needlessly increase complexity and decrease efficiency, because ARP may not be efficiently applied with certain partition modes or inter-modes.

According to aspects of this disclosure, inter-view residual prediction may be enabled or disabled based on a partition mode and/or coding mode of the block currently being coded. For example, video encoder 20 and/or video decoder 30 may determine a partition mode for coding a block of video data, where the partition mode indicates a division of the block of video data for predictive coding. In addition, video encoder 20 and/or video decoder 30 may determine whether to code a weighting factor for an inter-view residual prediction process based on the partition mode, where, when the weighting factor is not coded, the inter-view residual prediction process is not applied to predict a residual for the current block. Video encoder 20 and/or video decoder 30 may then code the block of video data using the determined partition mode.

According to aspects of this disclosure, in some examples, the weighting factor for any inter-coded block with partition mode unequal to PART_2N×2N may not be signaled. In another example, additionally or alternatively, the weighting factor for any inter-coded block with coding mode unequal to skip mode and/or merge mode may not be signaled.

Techniques of this disclosure also relate to refining the manner in which weighting factors are signaled in the bitstream. For example, in general, video encoder 20 and/or video decoder 30 may select a weighting factor from a fixed set of three fixed weighting factors (e.g., 0, 0.5 and 1). However, in some instances, three static weighting factors may not provide enough flexibility to achieve sufficient prediction efficiency, due to quality differences between a current view and its reference view. Quality differences between the current view and the reference view may be dynamic, particular with respect to scalable video coding. Conversely, three weighting factors may exceed the needs of some slices or pictures. That is, some slices or pictures may not need to select from three weighting factors to achieve an optimal balance between the complexity and coding efficiency improvement.

According to aspects of this disclosure, a more flexible approach to weighting factors may be implemented. For example, the number of available weighting factors may be altered at the sequence level (e.g., in a parameter set, such as a sequence parameter set (SPS)). In an example for purposes of illustration, an indicator may be signaled in an SPS to disable one or more weighting factors, e.g., 0.5 and/or 1. In another example, such an indicator may be signaled in VPS and applicable for all non-base views. In still another example, such an indicator may be signaled in video parameter set (VPS) extension for each non-base view. In another example, such an indicator may be provided in a picture parameter set (PPS), a slice header or a view parameter set to disable one or more weighting factors. When a weighting factor has been disabled, fewer bits may be used to represent that remaining weighting factors, thereby providing a bit savings.

According to other aspects, an indicator may be provided to modify and/or replace one or more weighting factors. In an example, the video coder may replace the 0.5 weighting factor with a 0.75 weighting factor. This indicator may be signaled in a slice header, an SPS, a picture parameter set (PPS), or a VPS.

As noted above, a temporal-disparity reference block for determining the residual predictor is typically located by applying the temporal motion vector to the disparity reference block. That is, the video coder may combine the temporal motion vector and the disparity vector and locate the temporal-disparity reference block based on the combination, e.g., relative to the current block However, in some instances, the decoded picture buffer and/or reference picture lists for coding the current block may not contain the picture indicated by applying the temporal motion vector to the disparity reference block.

According to aspects of this disclosure, a video coder may enable or disable ARP based on the pictures of a decoded picture buffer and/or reference picture lists. For example, video encoder 20 and/or video decoder 30 may determine, for a first block of video data in a first layer of video data, a temporal motion vector and associated temporal reference picture for predicting the first block, where the temporal reference picture has a picture order count value. In addition, video encoder 20 and/or video decoder 30 may determine a disparity reference block in a picture of an access unit that includes a picture containing the first block. Video encoder 20 and/or video decoder 30 may determine whether a decoded picture buffer contains a temporal-disparity reference picture having the picture order count value of the temporal reference picture, where the temporal-disparity reference picture is located based on a combination of the temporal motion vector and the disparity vector, and when the decoded picture buffer does not contain a temporal-disparity reference picture having the picture order count value of the temporal reference picture, video encoder 20 and/or video decoder 30 may modify the inter-view residual prediction process for predicting residual data of the first block.

In some examples, video encoder 20 and/or video decoder 30 may modify the inter-view residual prediction process by disabling the inter-view residual prediction process, such that the current block is not coded using inter-view residual prediction. In other examples, video encoder 20 and/or video decoder 30 may modify the inter-view residual prediction process by scaling the temporal motion vector to identify another temporal-disparity reference picture. For example, video encoder 20 and/or video decoder 30 may scale the temporal motion vector such that, when applied to the disparity reference picture (e.g., or combined with the disparity vector), the scaled motion vector identifies a temporal-disparity reference picture that is included in the reference picture list and is in a location temporally nearest to the disparity reference picture. The techniques described above may prevent video encoder 20 and/or video decoder 30 from attempting to locate the disparity reference block in a picture that is not included in the reference picture list.

Figure 2:
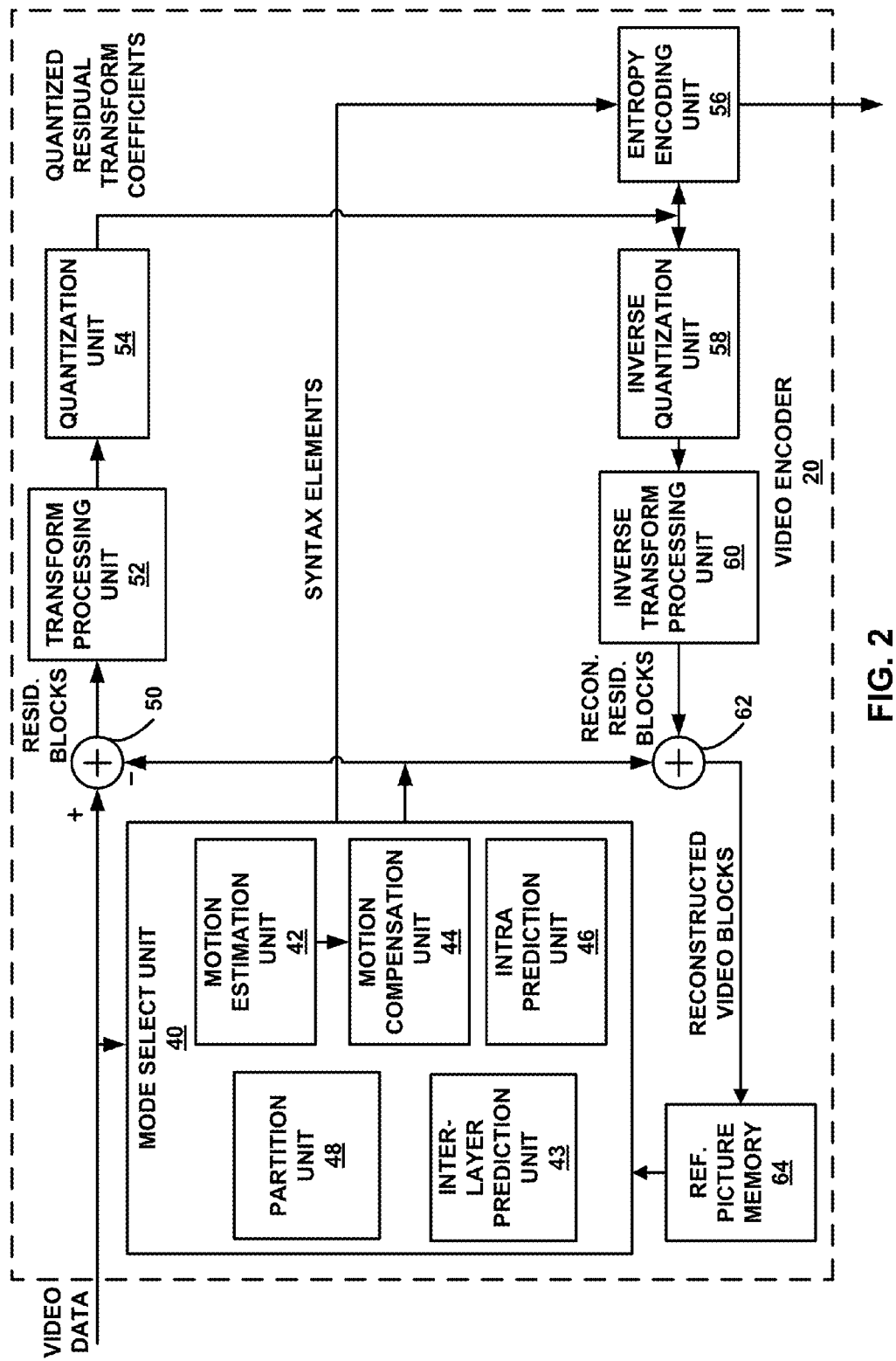
FIG. 2 is a block diagram illustrating an example video encoder that may implement the techniques described in this disclosure.

FIG. 2 is a block diagram illustrating an example video encoder 20 that may implement the techniques described in this disclosure for advanced residual prediction. Video encoder 20 may perform intra- and inter-coding of video blocks within video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As noted above, video encoder 20 may be adapted to perform multiview video coding. For example, video encoder 20 may be configured to encode multiple, scalable layers of video data in accordance with MVC, MV-HEC, 3D-HEVC, and/or HSVC video coding standard. Hence, video encoder 20 may be configured to code MV-HEVC, such that each view in a time instance may be processed by a decoder, such as video decoder 30. For HEVC-3D, in addition to encoding texture maps (i.e., luma and chroma values) for each view, video encoder 20 may further encode a depth map for each view.

In any case, as shown in FIG. 2, video encoder 20 receives video data to be encoded. In the example of FIG. 2, video encoder 20 includes a mode select unit 40, summer 50, transform processing unit 52, quantization unit 54, entropy encoding unit 56, and reference picture memory 64. Mode select unit 40, in turn, includes motion estimation unit 42, motion compensation unit 44, intra-prediction unit 46, and partition unit 48. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

During the encoding process, video encoder 20 receives a picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42, inter-layer prediction unit 43, and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64, which may also be referred to as a reference picture buffer. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. Accordingly, in general, data for a motion vector may include a reference picture list, an index into the reference picture list (ref_idx), a horizontal component, and a vertical component. The reference picture may be selected from a first reference picture list (List 0), a second reference picture list (List 1), or a combined reference picture list (List c), each of which identify one or more reference pictures stored in reference picture memory 64.

Motion estimation unit 42 may generate and send a motion vector that identifies the predictive block of the reference picture to entropy encoding unit 56 and motion compensation unit 44. That is, motion estimation unit 42 may generate and send motion vector data that identifies the reference picture list containing the predictive block, an index into the reference picture list identifying the picture of the predictive block, and a horizontal and vertical component to locate the predictive block within the identified picture.

In some examples, rather than sending the actual motion vector for a current PU, inter-layer prediction unit 43 may predict the motion vector to further reduce the amount of data needed to communicate the motion vector. In this case, rather than encoding and communicating the motion vector itself, inter-layer prediction unit 43 may generate a motion vector difference (MVD) relative to a known (or knowable) motion vector. The known motion vector, which may be used with the MVD to define the current motion vector, can be defined by a so-called motion vector predictor (MVP). In general, to be a valid MVP, the motion vector being used for prediction must point to the same reference picture as the motion vector currently being coded.

Inter-layer prediction unit 43 may identify a motion vector predictor, e.g., for generating an MVD or merging, in multi-view coding. For example, inter-layer prediction unit 43 may identify a disparity motion vector from a block in a different view component than a current block to predict the motion vector for the current block. In other examples, inter-layer prediction unit 43 may identify a temporal motion vector from a block in a different view component than a current block to predict the motion vector for the current block.

According to aspects of this disclosure, inter-layer prediction unit 43 may perform inter-layer residual prediction. For example, inter-layer prediction unit 43 may code residual data of one layer relative to residual data of a second, different layer. In some instances, inter-layer prediction unit 43 may first determine a predictive block for predicting a current block. The predictive block for the current block may be based on samples of a temporal reference picture that are associated with a location indicated by a motion vector of the current block. The temporal reference picture is associated with the same layer as the current picture but is associated with a different time instance than the current picture.

Inter-layer prediction unit 43 also determines a disparity reference block based on samples of a disparity reference picture that are at a location indicated by a disparity vector of the current block. The disparity reference picture is associated with a different layer (i.e., a reference layer) than the current picture, but is associated with the same time instance as the current picture. Inter-layer prediction unit 43 also determines a temporal-disparity reference block for the current block. The temporal-reference block is based on samples of a temporal-disparity reference picture that are associated with a location indicated by the motion vector of the current block and the disparity vector (e.g., by the combination of the motion vector and the disparity vector). Hence, the temporal-disparity reference picture is associated with the same view as the disparity reference picture and is associated with the same access unit as the temporal reference picture.

Inter-layer prediction unit 43 then determines a residual predictor for predicting residual associated with the current block, e.g., the difference between the current block and the temporal reference block. Each sample of the residual predictor for the current block indicates a difference between a sample of the disparity reference block and a corresponding sample of the temporal-disparity reference block. In some instances, inter-layer prediction unit 43 may apply a weighting factor (e.g., 0, 0.5, 1, or the like) to the residual predictor to increase the accuracy of the residual predictor.

Inter-layer prediction unit 43 may determine a final residual block for the current block. The final residual block comprises samples that indicate differences between samples of the current block, samples in the temporal predictive block, and samples in the residual predictor. Video encoder 20 may include, in a bitstream, data that represents the final residual block.

According to aspects of this disclosure, inter-layer prediction unit 43 may enable or disable inter-view residual prediction (including coding residual of one layer relative to residual of a second, different layer) based on the reference pictures in reference picture lists for the block currently being coded. In an example, inter-layer prediction unit 43 may enable or disable inter-view residual prediction based on whether the reference picture lists (e.g., RefPicList0 and/or RefPicList1) for the block currently being coded includes any temporal reference pictures. According to aspects of this disclosure, if the reference picture lists for an inter-predicted block include only inter-view reference pictures inter-layer prediction unit 43 may disable inter-layer prediction unit 43. In some examples, inter-layer prediction unit 43 may disable inter-layer prediction unit 43 for each block of a random access view component.

In another example, when the reference picture list(s) of the disparity reference block do not include a reference picture in the same view as the disparity reference picture having the same POC as the temporal reference picture, inter-layer prediction unit 43 may modify inter-view residual prediction. The determination of whether to modify inter-view residual prediction may be based on one or both of the reference picture lists (e.g., RefPicList0 and/or RefPicList1). That is, That is, given a current reference picture list index X (with X being 0 or 1), in one example, if the reference picture list with a list index equal to X of the disparity reference block does not include a reference picture in the same view as the disparity reference picture and having the same POC as the temporal reference picture of the current block, inter-layer prediction unit 43 may modify the ARP process. In another example, if neither of the reference picture lists (e.g., neither list 0 nor list 1) of the disparity reference block include a reference picture in the same view as the disparity reference picture and having the same POC as the temporal reference picture of the current block, inter-layer prediction unit 43 may modify the ARP process.

In some instances, inter-layer prediction unit 43 may modify inter-view residual prediction by disabling inter-view residual prediction. In other instances, inter-layer prediction unit 43 may modify the inter-view residual prediction process by scaling the temporal motion vector to identify another temporal-disparity reference picture. For example, inter-layer prediction unit 43 may scale the temporal motion vector(s) such that, when applied to the disparity reference picture, the scaled combination of the motion vector and the disparity vector identifies a temporal-disparity reference picture that is included in the reference picture list and is in a location temporally nearest to the disparity reference picture.

While described with respect to the reference picture list, inter-layer prediction unit 43 may additionally or alternatively modify and/or disable inter-view residual prediction if reference picture memory 64 (i.e., decoded picture buffer) does not contain a picture in the same view as the disparity reference picture having the same POC as the temporal reference picture.

In still another example, according to aspects of this disclosure, inter-layer prediction unit 43 may simplify the manner in which reference blocks are located, particularly when interpolating a sub-pel position. For example, inter-layer prediction unit 43 may use a low pass filter, such as a bi-linear filter, to interpolate the location of the disparity reference block. Additionally or alternatively, inter-layer prediction unit 43 may use a low pass filter, such as the bi-linear filter, to interpolate the location of the temporal-disparity reference block. In still another example, according to aspects of this disclosure, motion estimation unit 42 and/or motion compensation unit 44 may use a low pass filter, such as the bi-linear filter to interpolate the location of the temporal reference block.

In still another example, according to aspects of this disclosure, inter-layer prediction unit 43 may only apply inter-view residual prediction, and therefore may only signal a weighting factor, for particular coding modes and/or partition modes. For example, inter-layer prediction unit 43 may only signal a weighting factor for any inter-coded block with partition mode unequal to PART_2N×2N. In another example, additionally or alternatively, inter-layer prediction unit 43 may not signal a weighting factor for any inter-coded block with a coding mode unequal to skip mode and/or merge mode.

Motion compensation, performed by motion compensation unit 44, may involve fetching or generating the predictive block based on the motion vector determined by motion estimation unit 42 and/or the information from inter-layer prediction unit 43. Motion compensation unit 44 may, in some instances, apply interview prediction. Again, motion estimation unit 42, inter-layer prediction unit 43, and motion compensation unit 44 may be functionally integrated, in some examples. Upon receiving the motion vector for the PU of the current video block, motion compensation unit 44 may locate the predictive block to which the motion vector points in one of the reference picture lists.

Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as code-word mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients.

The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation.

Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent picture.

Figure 3:
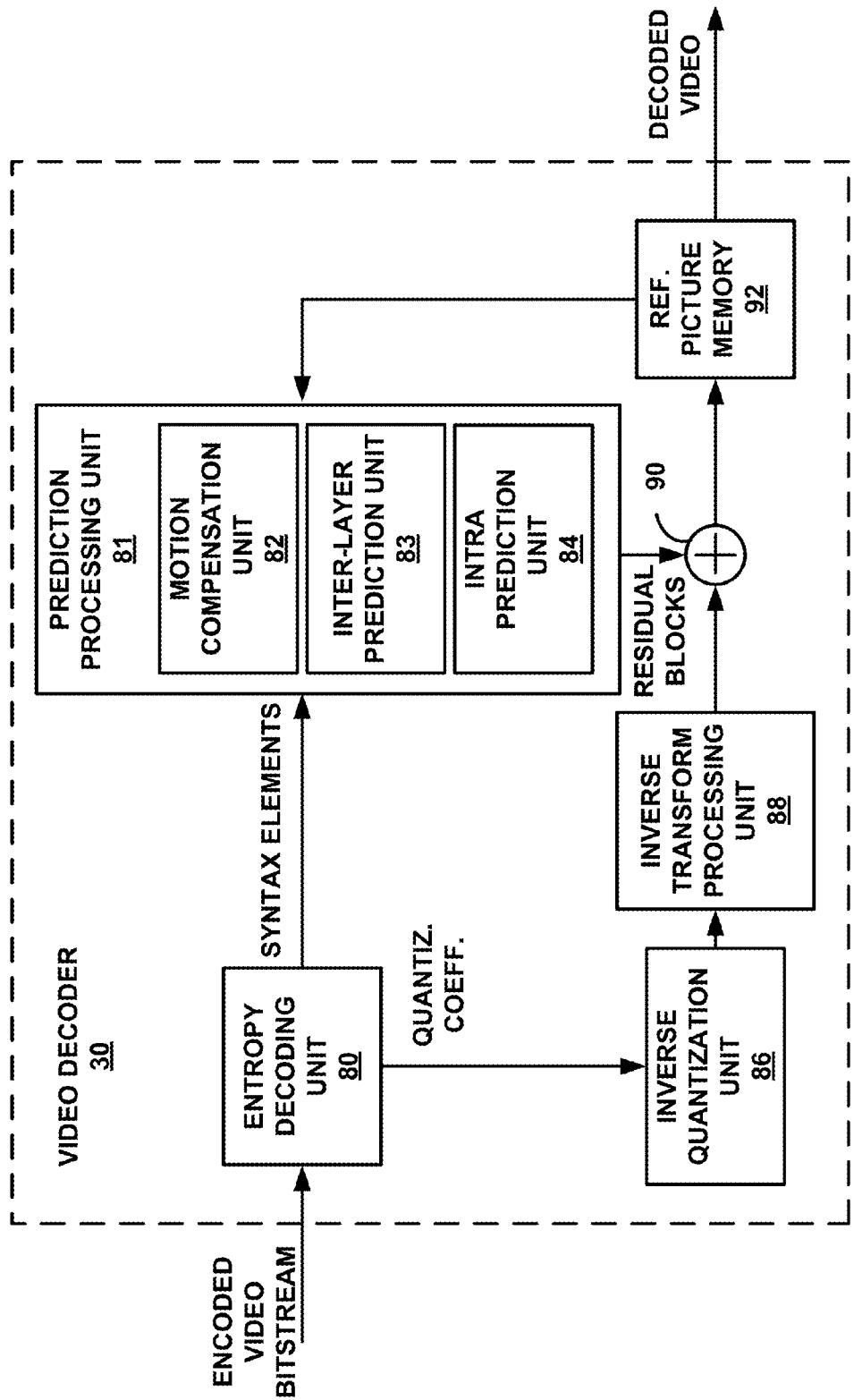
FIG. 3 is a block diagram illustrating an example video decoder that may implement the techniques described in this disclosure.

FIG. 3 is a block diagram illustrating an example video decoder 30 that may implement the techniques described in this disclosure for predicting motion vectors in multi-view coding. In the example of FIG. 3, video decoder 30 includes an entropy decoding unit 80, prediction processing unit 81, inverse quantization unit 86, inverse transform processing unit 88, summer 90, and reference picture memory 92. Prediction processing unit 81 includes motion compensation unit 82, inter-layer prediction unit 83, and intra prediction unit 84.

As noted above, video decoder 30 may be adapted to perform mutliview video coding. In some instances, video decoder 30 may be configured to decode multi-view HEVC. For HEVC-3D, in addition to decoding texture maps (i.e., luma and chroma values) for each view, video decoder 30 may further decode a depth map for each view.

In any case, during the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

For example, by way of background, video decoder 30 may receive compressed video data that has been compressed for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need for redundant transmissions for error resilience.

When the video slice is coded as an intra-coded (I) slice, intra prediction unit 84 of prediction processing unit 81 may generate prediction data for a video block of the current video slice based on a signaled intra prediction mode and data from previously decoded blocks of the current picture. When the picture is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference picture lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice. In some examples, motion compensation unit 82 may receive certain motion information from inter-layer prediction unit 83.

Inter-layer prediction unit 83 may receive prediction data indicating where to retrieve motion information for a current block. For example, inter-layer prediction unit 83 may receive motion vector prediction information such as an MVP index (mvp flag), MVD, merge flag (merge flag), and/or merge index (merge idx) and use such information to identify motion information used to predict a current block. That is, as noted above with respect to video encoder 20, according to aspects of this disclosure, inter-layer prediction unit 83 may receive an MVP index (mvp flag) and MVD, and use such information to determine a motion vector used to predict a current block. Inter-layer prediction unit 83 may generate a list of MVP or merge candidates. The MVP and/or merge candidates may include one or more video blocks located in a different view than a video block currently being decoded.

According to aspects of this disclosure, inter-layer prediction unit 83 may perform inter-layer residual prediction. For example, inter-layer prediction unit 83 may code residual data of one layer relative to residual data of a second, different layer. In some instances, inter-layer prediction unit 83 may first determine a predictive block for predicting a current block. The predictive block for the current block may be based on samples of a temporal reference picture that are associated with a location indicated by a motion vector of the current block. The temporal reference picture is associated with the same layer as the current picture but is associated with a different time instance than the current picture.

Inter-layer prediction unit 83 also determines a disparity reference block based on samples of a disparity reference picture that are at a location indicated by a disparity vector of the current block. The disparity reference picture is associated with a different layer (i.e., a reference layer) than the current picture, but is associated with the same time instance as the current picture. Inter-layer prediction unit 83 also determines a temporal-disparity reference block for the current block. The temporal-reference block is based on samples of a temporal-disparity reference picture that are associated with a location indicated by the motion vector of the current block and the disparity vector (e.g., by the combination of the motion vector and the disparity vector). Hence, the temporal-disparity reference picture is associated with the same view as the disparity reference picture and is associated with the same access unit as the temporal reference picture.

Inter-layer prediction unit 83 then determines a residual predictor for predicting residual associated with the current block, e.g., the difference between the current block and the temporal reference block. Each sample of the residual predictor for the current block indicates a difference between a sample of the disparity reference block and a corresponding sample of the temporal-disparity reference block. In some instances, inter-layer prediction unit 83 may apply a weighting factor (e.g., 0, 0.5, 1, or the like) to the residual predictor to increase the accuracy of the residual predictor.

Inter-layer prediction unit 83 may obtain, from the encoded bitstream, data indicating a final residual block for the current block. Inter-layer prediction unit 83 may reconstruct the current block by combining the final residual block, the temporal predictive block, and samples in the residual predictor.

According to aspects of this disclosure, inter-layer prediction unit 83 may enable or disable inter-view residual prediction (including coding residual of one layer relative to residual of a second, different layer) based on the reference pictures in reference picture lists for the block currently being coded. In an example, inter-layer prediction unit 83 may enable or disable inter-view residual prediction based on whether the reference picture list for the block currently being coded includes any temporal reference pictures. According to aspects of this disclosure, if the reference picture lists for an inter-predicted block include only inter-view reference pictures, inter-layer prediction unit 83 may disable inter-layer prediction unit 83. In some examples, inter-layer prediction unit 83 may disable inter-layer prediction unit 83 for each block of a random access view component.

In another example, when the reference picture list(s) of the disparity reference block do not include a reference picture in the same view as the disparity reference picture having the same POC as the temporal reference picture, inter-layer prediction unit 83 may modify inter-view residual prediction. The determination of whether to modify inter-view residual prediction may be based on one or both of the reference picture lists (e.g., RefPicList0 and/or RefPicList1). That is, That is, given a current reference picture list index X (with X being 0 or 1), in one example, if the reference picture list with a list index equal to X of the disparity reference block does not include a reference picture in the same view as the disparity reference picture and having the same POC as the temporal reference picture of the current block, inter-layer prediction unit 83 may modify the ARP process. In another example, if neither of the reference picture lists (e.g., neither list 0 nor list 1) of the disparity reference block include a reference picture in the same view as the disparity reference picture and having the same POC as the temporal reference picture of the current block, inter-layer prediction unit 83 may modify the ARP process.

In some instances, inter-layer prediction unit 83 may modify inter-view residual prediction by disabling inter-view residual prediction. In other instances, inter-layer prediction unit 83 may modify the inter-view residual prediction process by scaling the temporal motion vector to identify another temporal-disparity reference picture. For example, inter-layer prediction unit 83 may scale the temporal motion vector(s) such that, when applied to the disparity reference picture, the scaled combination of the motion vector and the disparity vector identifies a temporal-disparity reference picture that is included in the reference picture list and is in a location temporally nearest to the disparity reference picture.

In still another example, according to aspects of this disclosure, inter-layer prediction unit 83 may simplify the manner in which reference blocks are located, particularly when interpolating a sub-pel position. For example, inter-layer prediction unit 83 may use a low pass filter, such as a bi-linear filter, to interpolate the location of the disparity reference block. Additionally or alternatively, inter-layer prediction unit 83 may use a low pass filter, such as the bi-linear filter, to interpolate the location of the temporal-disparity reference block. In still another example, according to aspects of this disclosure, motion compensation unit 82 may use a low pass filter, such as the bi-linear filter, to interpolate the location of the temporal reference block.

In still another example, according to aspects of this disclosure, inter-layer prediction unit 83 may only apply inter-view residual prediction, and therefore may only signal a weighting factor, for particular coding modes and/or partition modes. For example, inter-layer prediction unit 83 may only signal a weighting factor for any inter-coded block with partition mode unequal to PART_2N×2N. In another example, additionally or alternatively, inter-layer prediction unit 83 may not signal a weighting factor for any inter-coded block with a coding mode unequal to skip mode and/or merge mode.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform processing unit 88 applies an inverse transform, e.g., an inverse DCT, an inverse integer transform, or a conceptually similar inverse transform process, to the transform coefficients in order to produce residual blocks in the pixel domain. According to the aspects of this disclosure, inverse transform processing unit 88 may determine the manner in which transforms were applied to residual data. That is, for example, inverse transform processing unit 88 may determine an RQT that represents the manner in which transforms (e.g., DCT, integer transform, wavelet transform, or one or more other transforms) were applied to the residual luma samples and the residual chroma samples associated with a block of received video data.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 92, which stores reference pictures used for subsequent motion compensation. Reference picture memory 92 also stores decoded video for later presentation on a display device, such as display device 32 of FIG. 1.

Figure 4:
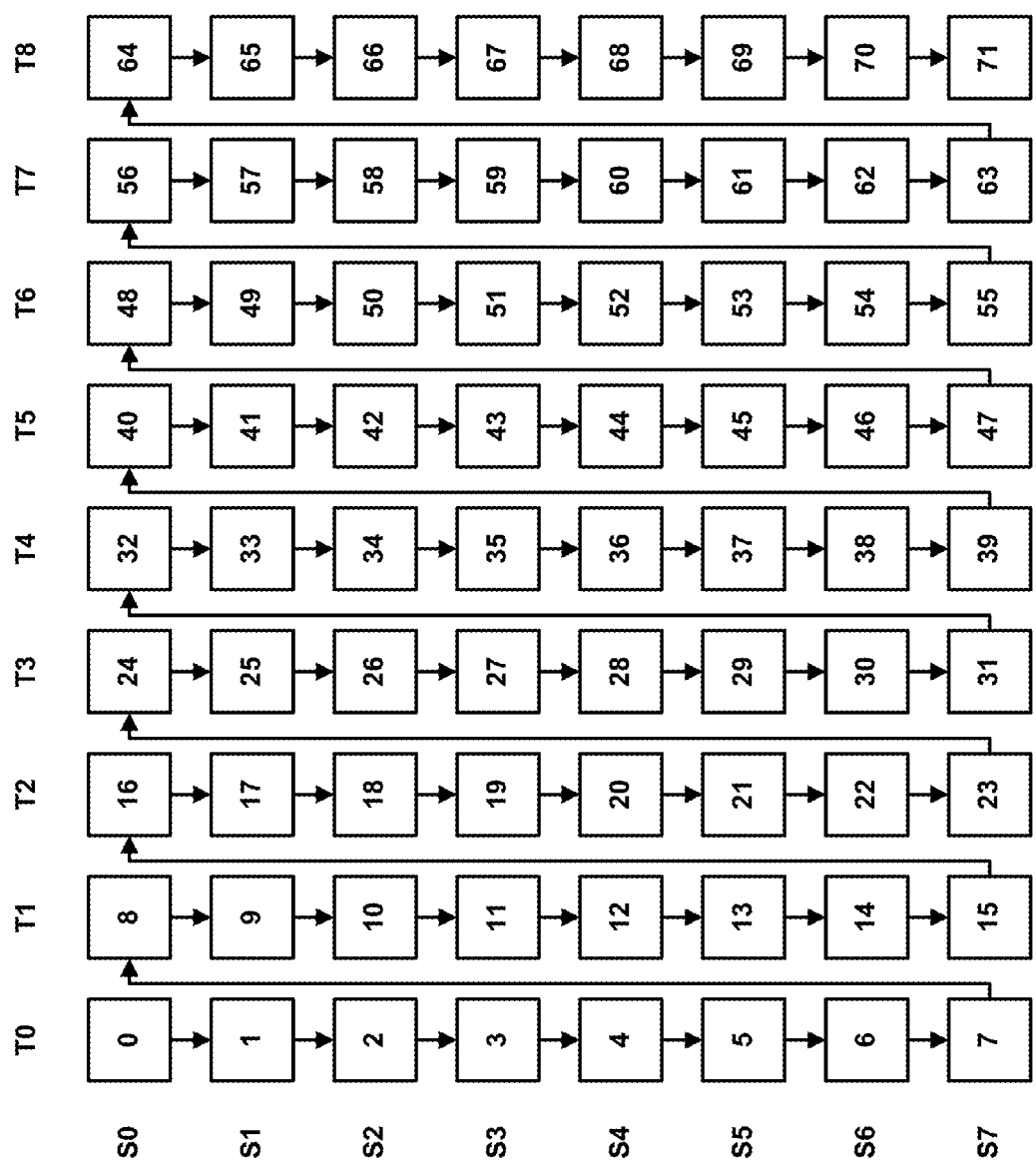
FIG. 4 is a conceptual diagram illustrating coding a multi-view sequence.

FIG. 4 is a conceptual diagram illustrating an example multi-view decoding order. The multi-view decoding order may be a bitstream order. In the example of FIG. 4, each square corresponds to a view component. Columns of squares correspond to access units. Each access unit may be defined to contain the coded pictures of all the views of a time instance. Rows of squares correspond to views. In the example of FIG. 4, the access units are labeled T0 . . . T11 and the views are labeled S0 . . . S7. Because each view component of an access unit is decoded before any view component of the next access unit, the decoding order of FIG. 4 may be referred to as time-first coding. The decoding order of access units may not be identical to the output or display order.

Multi-view coding may support inter-view prediction. Inter-view prediction is similar to the inter prediction used in H.264/AVC, HEVC, or other video coding specifications and may use the same syntax elements. However, when a video coder performs inter-view prediction on a current video unit (such as a macroblock or PU), the video coder may use, as a reference picture, a picture that is in the same access unit as the current video unit, but in a different view. In contrast, conventional inter prediction only uses pictures in different access units as reference pictures.

Figure 5:
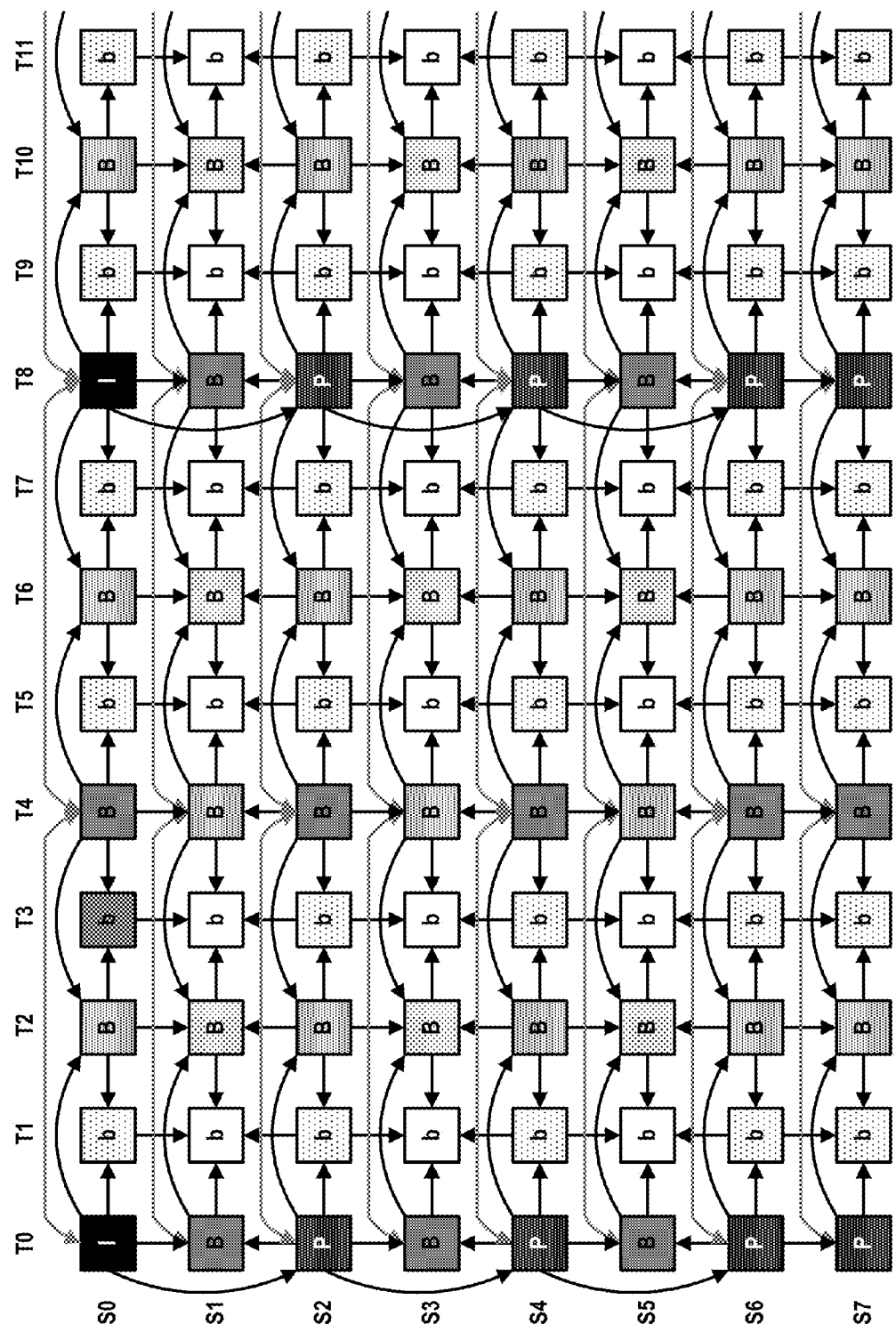
FIG. 5 is a conceptual diagram illustrating an example multi-view prediction pattern.

FIG. 5 is a conceptual diagram illustrating an example MVC prediction pattern that may be used with MVC, multi-view HEVC, and 3D-HEVC (multi-view plus depth). References to MVC below apply to MVC in general, and are not restricted to H.264/MVC.

In the example of FIG. 5, eight views (S0-S7) are illustrated, and twelve temporal locations (T0-T11) are illustrated for each view. In general, each row in FIG. 5 corresponds to a view, while each column indicates a temporal location. Each of the views may be identified using a view identifier ("view_id"), which may be used to indicate a relative camera location with respect to the other views. In the example shown in FIG. 5, the view IDs are indicated as "S0" through "S7", although numeric view IDs may also be used. In addition, each of the temporal locations may be identified using a picture order count (POC) value, which indicates a display order of the pictures. In the example shown in FIG. 5, the POC values are indicated as "T0" through "T11."

Although a multi-view coded bitstream may have a so-called base view which is decodable by particular decoders and a stereo view pair may be supported, some multi-view bitstreams may support more than two views as a 3D video input. Accordingly, a renderer of a client having a particular decoder may expect 3D video content with multiple views.

Pictures in FIG. 5 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0.

As with single view video encoding, pictures of a multi-view video sequence may be predicatively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multi-view video encoding, pictures may be inter-view predicted. That is, a view component can use the view components in other views for reference. For example, inter-view prediction may be realized as if the view component in another view is an inter-prediction reference. The potential inter-view references may be signaled in the Sequence Parameter Set (SPS) MVC extension and may be modified by the reference picture list construction process, which enables flexible ordering of the inter-prediction or inter-view prediction references.

FIG. 5 provides various examples of inter-view prediction. Pictures of view S1, in the example of FIG. 5, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 5, capital "B" and lowercase "b" are intended to indicate different hierarchical relationships between pictures, rather than different encoding methodologies. In general, capital "B" frames are relatively higher in the prediction hierarchy than lowercase "b" frames. FIG. 5 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 5 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS.

In this manner, pictures used as reference pictures may be decoded before decoding the pictures that are encoded with reference to the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes comprises a consecutively ordered set from zero to one less than the full number of views.

A subset of a whole bitstream can be extracted to form a conforming sub-bitstream. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require smooth viewing experience and might prefer views with view_id values S0, S1, and S2, while another client may require view scalability and prefer views with view_id values S0, S2, and S4. Note that both of these sub-bitstreams can be decoded as independent bitstreams and can be supported simultaneously.

With respect to inter-view prediction, inter-view prediction is allowed among pictures in the same access unit (i.e., with the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

Thus, in the context of multi-view video coding, there are two kinds of motion vectors. One kind of motion vector is a normal motion vector that points to a temporal reference picture. The type of inter prediction corresponding to a normal, temporal motion vector may be referred to as motion-compensated prediction (MCP). When an inter-view prediction reference picture is used for motion compensation, the corresponding motion vector is referred to as a "disparity motion vector." In other words, a disparity motion vector points to a picture in a different view (i.e., a disparity reference picture or an inter-view reference picture). The type of inter prediction corresponding to a disparity motion vector may be referred to as "disparity-compensated prediction" or "DCP."

As mentioned above, a multi-view extension of HEVC (i.e., MV-HEVC) and a 3DV extension of HEVC (i.e., 3D-HEVC) are under development. MV-HEVC and 3D-HEVC may improve coding efficiency using inter-view motion prediction and inter-view residual prediction. In inter-view motion prediction, a video coder may determine (i.e., predict) the motion information of a current PU based on the motion information of a PU in a different view than the current PU. In inter-view residual prediction, a video coder may determine residual blocks of a current CU based on residual data in a different view than the current CU using the prediction structure shown on FIG. 5.

To enable inter-view motion prediction and inter-view residual prediction, a video coder may determine disparity vectors for blocks (e.g., PUs, CUs, etc.). In general, a disparity vector is used as an estimator of the displacement between two views. A video coder, such as video encoder 20 or video decoder 30, may use a disparity vector for a block either to locate a reference block (which may be referred to herein as a disparity reference block) in another view for inter-view motion or residual prediction, or the video coder may convert the disparity vector to a disparity motion vector for inter-view motion prediction.

Figure 6:
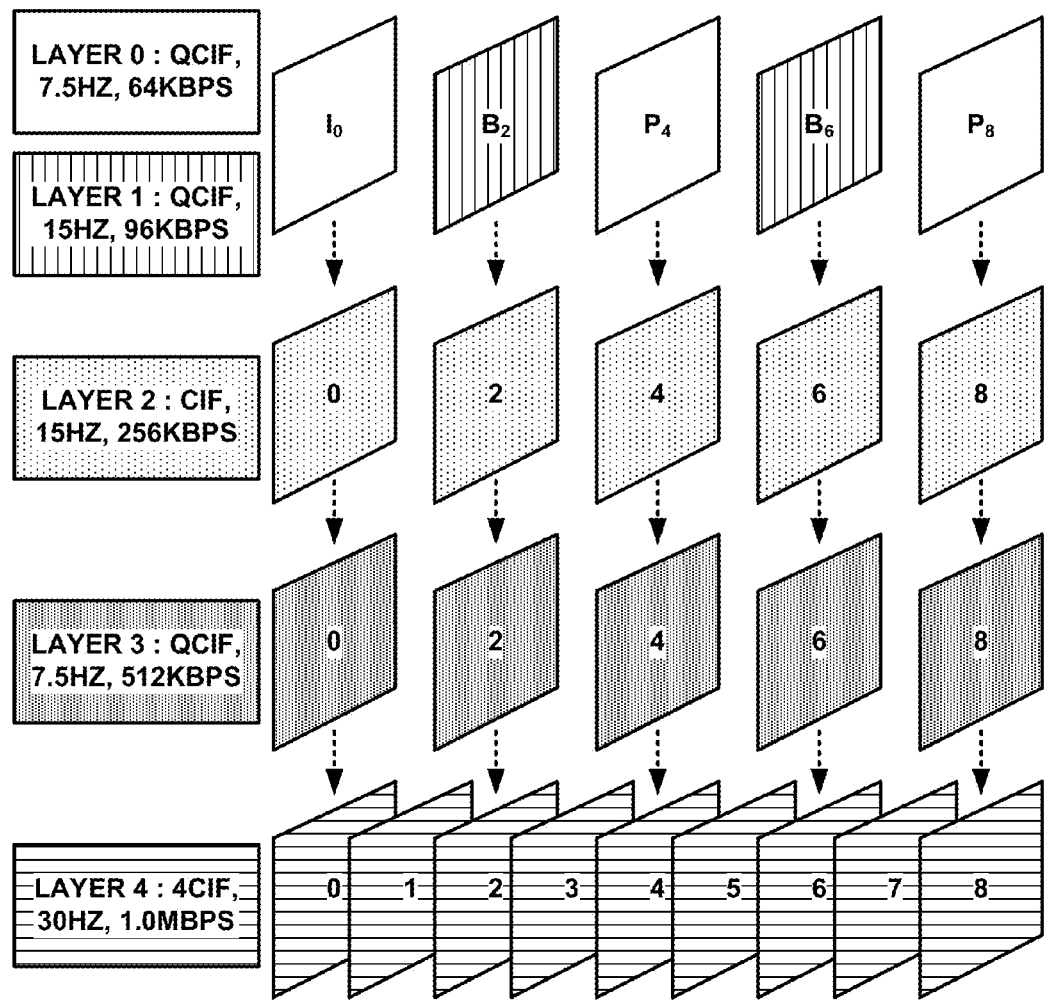
FIG. 6 is a conceptual diagram illustrating example scalable layers of video data.

FIG. 6 is a conceptual diagram illustrating scalable video coding. While FIG. 6 is described with respect to H.264/AVC and SVC, it should be understood that similar layers may be coded suing other multilayer video coding schemes, including HSVC. In another example, similar layers may be coded using a multi-standard codec. For example, a base layer may be coded using H.264/AVC, while an enhancement layer may be coded using a scalable, HLS-only extension to HEVC. Thus, references to SVC below may apply to scalable video coding in general, and are not restricted to H.264/SVC.

In SVC, scalabilities may be enabled in three dimensions including, for example, spatial, temporal, and quality (represented as a bit rate or signal to noise ratio (SNR)). In general, better representation can be normally achieved by adding to a representation in any dimension. For example, in the example of FIG. 6, layer 0 is coded at Quarter Common Intermediate Format (QCIF) having a frame rate of 7.5 Hz and a bit rate of 64 kilobytes per second (KBPS). In addition, layer 1 is coded at QCIF having a frame rate of 15 Hz and a bit rate of 64 KBPS, layer 2 is coded at CIF having a frame rate of 15 Hz and a bit rate of 256 KBPS, layer 3 is coded at QCIF having a frame rate of 7.5 Hz and a bit rate of 512 KBPS, and layer 4 is coded at 4CIF having a frame rate of 30 Hz and a bit rate of Megabyte per second (MBPS). It should be understood that the particular number, contents and arrangement of the layers shown in FIG. 5 are provided for purposes of example only.

In any case, once a video encoder (such as video encoder 20) has encoded content in such a scalable way, a video decoder (such as video decoder 30) may use an extractor tool to adapt the actual delivered content according to application requirements, which may be dependent e.g., on the client or the transmission channel.

In SVC, pictures having the lowest spatial and quality layer are typically compatible with H.264/AVC. In the example of FIG. 6, pictures with the lowest spatial and quality layer (pictures in layer 0 and layer 1, with QCIF resolution) may be compatible with H.264/AVC. Among them, those pictures of the lowest temporal level form the temporal base layer (layer 0). This temporal base layer (layer 0) may be enhanced with pictures of higher temporal levels (layer 1).

In addition to the H.264/AVC compatible layer, several spatial and/or quality enhancement layers may be added to provide spatial and/or quality scalabilities. Each spatial or quality enhancement layer itself may be temporally scalable, with the same temporal scalability structure as the H.264/AVC compatible layer.

While inter-view residual prediction may be described with respect to "views" of video data, it should be understood that similar techniques may be applied to multiple layers of data, such as layers of the scalable structure shown in FIG. 6. For example, a video coder (such as video encoder 20 and/or video decoder 30) may predict residual of one layer using another layer. In some instance, the techniques may be implemented with a scalable extension of HEVC, such as HSVC.

In particular, as described in greater detail below, video encoder 20 may signal weighting factors for CUs only for certain coding partition modes and/or for certain coding modes. When a weighting factor is not signaled, video decoder 30 may skip the decoding of a weighting factor and automatically determine (i.e., infer) that the weighting factor is zero.

In one example, the weighting factor for an inter-coded CU with partition mode unequal to PART_2N×2N may not be signaled. In an alternative example, the weighting factor for an inter-coded CU with partition mode unequal to PART_2N×2N, PART_2N×N and PART_N×2N may not be signaled. In still another example, additionally or alternatively, the weighting factor for any inter-coded CU with coding mode unequal to skip and/or merge may not be signaled.

According to other aspects, the video coder may modify the weighting factors. For example, an indicator may be signaled in a sequence level to disable one or more weighting factors (e.g., 0.5 and/or 1). In some examples, the indicator may be signaled in a VPS extension for each non-base view. In other examples, the indicator may be signaled in a VPS and may be applicable for all non-base views. In still other examples, the indicator may be signaled in a picture parameter set (PPS), slice header, or view parameter set.

In another example, an indicator may be signaled to modify one or more of the weighting factors. For example, the indicator may cause video decoder 30 to replace an initial weighting factor (e.g., 0.5) with a new weighting factor (e.g., 0.75). This modifying indicator may be signaled in a PPS, a slice header, or a VPS.

According to still other aspects, the video coder may enable or disable ARP based on the pictures of a decoded picture buffer and/or reference picture lists for coding a picture in the scalable structure shown in FIG. 6. For example, when a decoded picture buffer for coding a current PU does not include a picture in the same view as the disparity reference picture having the same POC as the temporal reference picture, a video coder may modify the ARP process for the PU.

In another example, additionally/alternatively, when one or both of the reference picture lists of the disparity reference block does not include a reference picture in the same view as the disparity reference picture having the same POC as the temporal reference picture, a video coder may modify the ARP process for the PU.

In some examples, the video coder may modify the ARP process by disabling the ARP process, such that the current PU is not coded using ARP. In other examples, the video coder may modify the ARP process by scaling the temporal motion vector to identify another available temporal-disparity reference picture.

Figure 7:
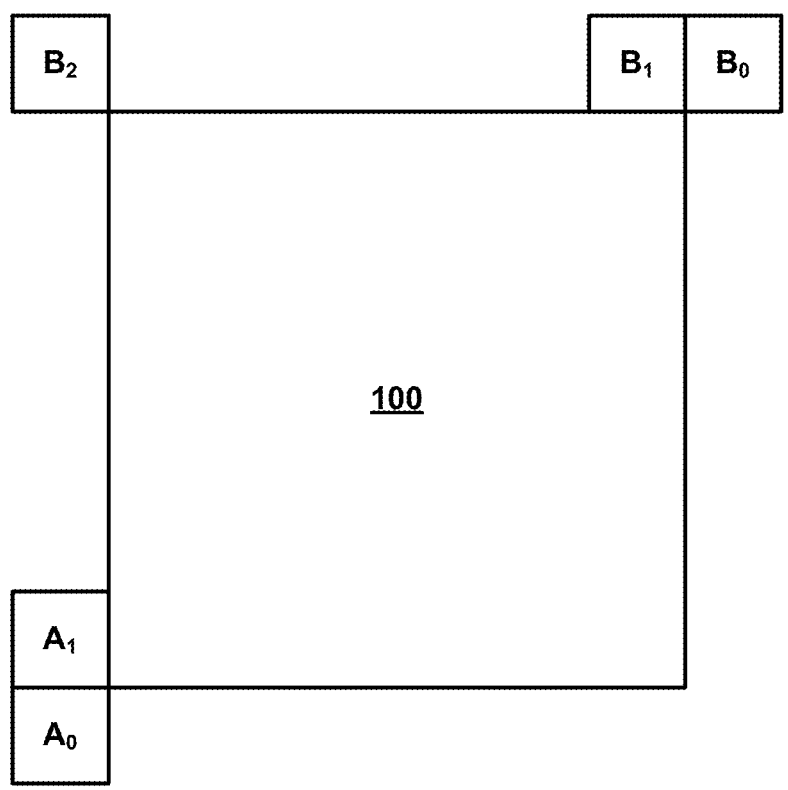
FIG. 7 is a conceptual diagram illustrating example spatially-neighboring prediction units (PUs) relative to a current PU.

FIG. 7 is a conceptual diagram illustrating example spatially-neighboring PUs relative to a current PU 100, which may be used to determine a disparity vector for the current PU 100. In the example of FIG. 7, the spatially-neighboring PUs may be PUs that cover the locations indicated as $A_0$, $A_1$, $B_0$, $B_1$, and $B_2$.

As noted above, a video coder (such as video encoder 20 or video decoder 30) may perform inter-view motion prediction and/or inter-view residual prediction. To enable these two coding tools, the first step is to derive a disparity vector.

In some examples, the video coder may use the method of Neighboring Blocks Based Disparity Vector (NBDV) to derive a disparity vector for a block. For instance, to derive a disparity vector for PU, a process called NBDV may be used in a test model for 3D-HEVC (i.e., 3D-HTM). The NBDV process uses disparity motion vectors from spatial and temporal neighboring blocks (such as neighboring PUs $A_0$, $A_1$, $B_0$, $B_1$, and $B_2$) to derive the disparity vector for a current block. Because neighboring blocks (e.g., blocks that spatially or temporally neighbor the current block) are likely to share almost the same motion and disparity information in video coding, the current block can use the motion vector information in the neighboring blocks as predictors of the disparity vector of the current block.

When a video coder performs the NBDV process, the video coder may check, in a fixed checking order, motion vectors of spatially-neighboring and temporally-neighboring blocks. When the video coder checks the motion vector(s) of a spatially-neighboring or temporally-neighboring block, the video coder may determine whether the motion vector(s) of the spatially-neighboring or temporally-neighboring block are disparity motion vectors. A disparity motion vector of a block of a picture is a motion vector pointing to a location within a disparity reference picture of the picture.

A disparity reference picture of a given picture may be a picture that is associated with the same access unit as the given picture, but is associated with a different view than the given picture. When the video coder identifies a disparity motion vector, the video coder may terminate the checking process. The video coder may convert the returned disparity motion vector to a disparity vector and may use the disparity vector for inter-view motion prediction and inter-view residual prediction. For example, the video coder may set a horizontal component of the disparity vector for the current block equal to a horizontal component of the disparity motion vector and may set the vertical component of the disparity vector to 0.

If the video coder is unable to derive a disparity vector for the current block (i.e., if no disparity vector is found) by performing the NBDV process, the video coder may use a zero disparity vector as the disparity vector for the current block. The zero disparity vector is a disparity vector having both horizontal and vertical components equal to 0. Thus, even when the NBDV process returns an unavailable result, other coding processes of the video coder that require a disparity vector may use a zero disparity vector for the current block.

In some examples, if the video coder is unable to derive a disparity vector for the current block by performing the NBDV process, the video coder may disable inter-view residual prediction for the current block. However, regardless of whether the video coder is able to derive a disparity vector for the current block by performing the NBDV process, the video coder may use inter-view motion prediction for the current PU. That is, if no disparity vector is found after checking all the pre-defined neighboring blocks, a zero disparity vector may be used for inter-view motion prediction while inter-view residual prediction may be disabled for the corresponding CU.

As noted above, five spatial neighboring blocks may be used for the disparity vector derivation, including, for example, the PUs denoted by $A_0$, $A_1$, $B_0$, $B_1$ or $B_2$. In addition, one or more temporal neighboring blocks may be used for disparity vector derivation. In this case, all the reference pictures from the current view are treated as candidate pictures. The number of candidate pictures may be further constrained to, e.g., four reference pictures. A co-located reference picture is first checked and the rest of candidate pictures are checked in the ascending order of reference index (refIdx). When both RefPicList0[refIdx] and RefPicList1 [refIdx] are available, RefPicListX[refIdx] precedes the other picture, where X is equal to collocated_from_l0_flag.

For each candidate picture, three candidate regions are determined for deriving the temporal neighboring blocks. When a region covers more than one 16×16 block, all 16×16 blocks in such a region are checked in raster scan order. The three candidate regions are defined as follows: CPU (the co-located region of the current PU or current CU), CLCU (the largest coding unit (LCU) covering the co-located region of the current PU), and BR (the bottom-right 4×4 block of the CPU).

The video coder may check the spatial and/or temporal neighboring blocks for a disparity vector in a particular order. In some instances, the video coder may check the spatial neighboring blocks ($A_0$, $A_1$, $B_0$, $B_1$, and $B_2$) first, followed by the temporal neighboring blocks. If one of the spatially-neighboring blocks has a disparity motion vector, the video coder may terminate the checking process and the video coder may use the disparity motion vector as the final disparity vector for the current PU.

The video coder may check each of the candidate regions of a candidate picture. In one example, if the candidate picture is in a first non-base view, the video coder may check the candidate regions in the order of CPU, CLCU, and BR. In this example, if the candidate picture is in a second non-base view, the video coder may check the candidate regions in the order of BR, CPU, CLCU.

In this example, decoding of pictures associated with the first non-base view may depend on decoding of pictures associated with a base view, but not pictures associated with other views. Furthermore, in this example, decoding of pictures associated with the second non-base view may also only depend on decoding of pictures associated with the base view. In other examples, decoding of pictures associated with the second non-base view may further depend on the first non-base view, but not pictures associated with other views, if present.

When a candidate region covers more than one 16×16 block, the video coder may check all 16×16 blocks in the candidate region according to a raster scan order. When the video coder checks a candidate region (or a 16×16 block within a candidate region), the video coder may determine whether a PU that covers the candidate region specifies a disparity motion vector. If the PU that covers the candidate region specifies a disparity motion vector, the video coder may determine the disparity vector of the current video unit based on the disparity motion vector of the PU.

Inter-view motion prediction may be applied to both AMVP and merge modes. For example, as noted above, AMVP mode has been extended in a way that an inter-view motion vector predictor is added to a candidate list. Based on the disparity vector derived from NBDV, the video coder determines a reference block in a reference view by adding the disparity vector and the position of the middle sample of current block. If the reference index for the current block refers to an inter-view reference picture, the video coder may set the inter-view motion vector predictor equal to the corresponding disparity vector. If the current reference index refers to a temporal reference picture and the reference block uses a motion hypothesis that refers to the same access unit as the current reference index, the video coder may use the motion vector that is associated with this motion hypothesis as an inter-view motion vector predictor. In other cases, the video coder may mark the inter-view motion vector predictor as invalid and the video coder may not include the motion vector in the list of motion vector predictor candidates.

With respect to merge/skip mode, the candidate list of motion parameters is extended by a motion parameter set that is obtained using inter-view motion prediction. For example, the video coder may derive a motion vector candidate of the reference block in the reference view in the same way as the AMVP mode noted above. If the derived motion vector is valid and its reference picture has a Picture Order Count (POC) value equal to that of one entry in the reference picture list of the current PU/CU, the motion information (prediction direction, reference pictures, and motion vectors) may be added to the merge candidate list after converting the reference index based on the POC. Such a candidate may be referred to as an inter-view predicted motion vector. Otherwise, the disparity vector is converted to an inter-view disparity motion vector, which the video coder may add into the merge candidate list, in the same position as an inter-view predicted motion vector when available.

In a similar manner as for inter-view motion prediction, inter-view residual prediction is based on a disparity vector for each CU, as described in greater detail with respect to FIGS. 8 and 9 below.

Figure 8:
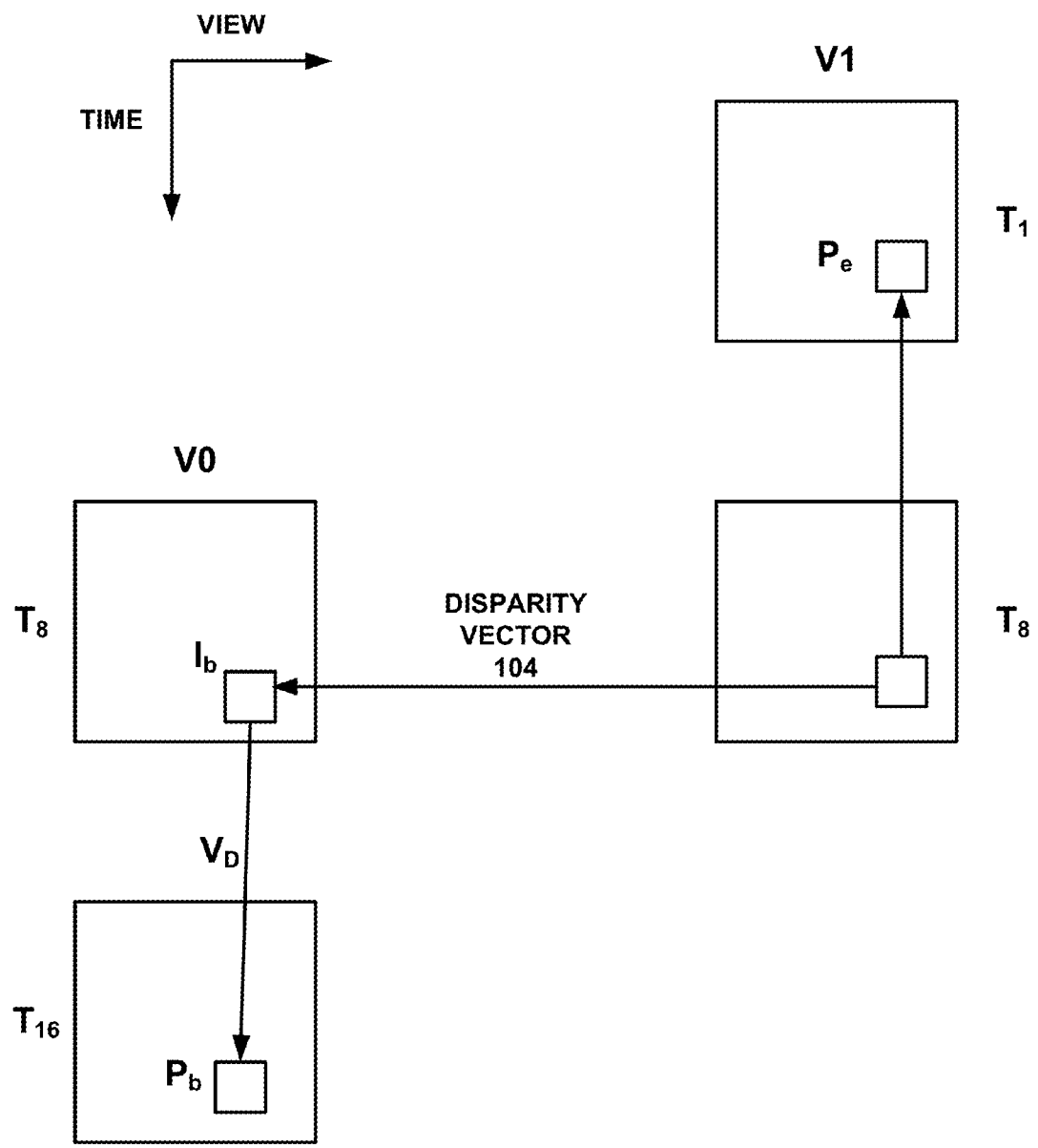
FIG. 8 is a block diagram illustrating inter-view residual prediction.

FIG. 8 is a conceptual diagram illustrating an example prediction structure of multi-view video coding. As an example, a video coder (such as video encoder 20 or video decoder 30) may code a block in view V1 at time $T_8$ by predicting the block using block $P_e$ in view V1 at time $T_0$. The video coder may subtract the original pixel values of the current block from $P_e$, thereby obtaining the residual samples of current block.

In addition, the video coder may locate a reference block at the reference view (view V0) by disparity vector 104. The differences of the original sample values of the reference block $I_b$ and its predicted samples $P_b$ are called the residual samples of the reference block, as denoted by $r_b$ in the equation below. In some examples, the video coder may subtract $r_b$ from the current residual and only transform code the resulting difference signal. Therefore, when inter-view residual prediction is used, the motion compensation loop can be expressed by the following equation:

$$\hat{I}_e = r_e + P_e + r_b$$

where the reconstruction of the current block $\hat{I}_e$ equals de-quantized coefficients $r_e$ plus prediction $P_e$ and quantization normalized residual coefficients $r_b$. Video coders may treat $r_b$ as the residual predictor. Thus, similar to motion compensation, $r_b$ may be subtracted from the current residual and only the resulting difference signal is transform coded.

The video coder may conditionally signal a flag to indicate the usage of inter-view residual prediction on a CU basis. For example, the video coder may traverse all transform units (TU) covered or partially covered by the residual reference region. If any of these TUs are inter-coded and contain a non-zero coded block flag (CBF) value (luma CBF or chroma CBF), the video coder may mark the related residual reference as available and the video coder may apply residual prediction. In this case, the video coder may signal a flag indicating the usage of inter-view residual prediction as part of the CU syntax. If this flag is equal to 1, the current residual signal is predicted using the potentially interpolated reference residual signal and only the difference is transmitted using transform coding. Otherwise, the residual of the current block is conventionally coded using the HEVC transform coding.

U.S. Provisional Application No. 61/670,075, filed Jul. 10, 2012, and U.S. Provisional Application No. 61/706,692, filed Sep. 27, 2012, propose a generalized residual prediction (GRP) for scalable video coding. Although these provisional patent applications focus on scalable video coding, the GRP techniques described in these provisional patent applications may be applicable to multi-view video coding (e.g., MV-HEVC and 3D-HEVC).

The general idea of GRP can be formulated, in the context of uni-prediction, as:

$$I_c = r_c + P_c + w^* r_r,$$

In the formula above, $I_c$ denotes the reconstruction of a current frame in a current layer (or view), $P_c$ represents a temporal prediction from the same layer (or view), $r_c$ indicates a signaled residual, $r_r$ indicates a residual prediction from a reference layer, and w is a weighting factor. In some examples, the weighting factor may need to be coded in a bitstream or derived based on previously-coded information. This framework for GRP can be applied in cases of both single-loop decoding and multi-loop decoding. Multiple-loop decoding involves an unrestricted version of prediction of a block using the reconstructed and up-sampled lower resolution signal. To decode one block in an enhancement layer, multiple blocks in previous layers need to be accessed.

For instance, when video decoder 30 uses multi-loop decoding, GRP can be further formulated as:

$$I_c = r_c + P_c + w^*(I_r - P_r),$$

In the formula above, $P_r$ indicates the temporal prediction for the current picture in the reference layer, $P_c$ represents a temporal prediction from the same layer (or view), $r_c$ indicates a signaled residual, w is a weighting factor, and $I_r$ denotes the full reconstruction of the current picture in the reference layer.

The formulas above include a weighting factor that may be signaled in a bitstream or derived based on previously-coded information. In some examples, video encoder 20 may signal, in a bitstream, on a CU-by-CU basis, weighting indices used in GRP. Each weighting index may correspond to one weighting factor which is greater than or equal to 0. When a weighting factor for a current CU is equal to 0, the residual block of the current CU is coded using conventional HEVC transform coding. Otherwise, when the weighting factor for the current CU is greater than 0, the current residual signal (i.e., the residual block for the current CU) may be predicted using a reference residual signal multiplied by the weighting factor and only the difference is transmitted using transform coding. In some examples, the reference residual signal is interpolated.

L. Zhang et al., "3D-CE5.h related: Advanced residual prediction for multiview coding," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0051 (hereinafter, "JCT3V-B0051"), proposed an advanced residual prediction (ARP) method to further improve the coding efficiency of inter-view residual prediction. In some instances, ARP may be performed at a PU level instead of a CU level. To distinguish the residual prediction scheme described above from ARP, the residual prediction scheme described above may be referred to as "CU-based inter-view residual prediction."

Figure 9:
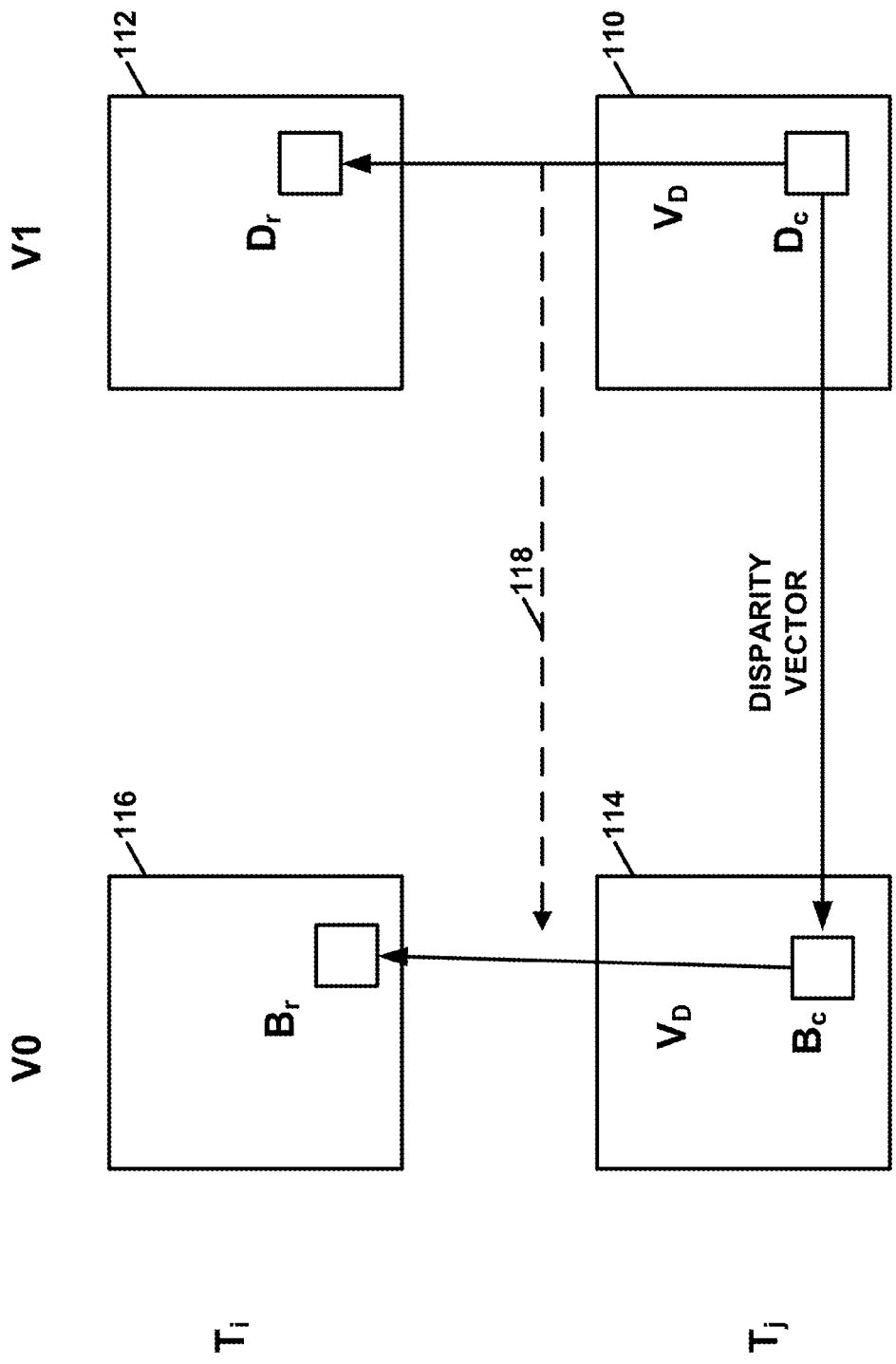
FIG. 9 is a conceptual diagram illustrating an example prediction structure of advanced residual prediction (ARP) in multi-view video coding.

FIG. 9 is a conceptual diagram illustrating an example prediction structure of ARP in multi-view video coding. FIG. 6 includes four pictures: a current picture 110, a temporal reference picture 112, a disparity reference picture 114, and a temporal-disparity reference picture 116. Current picture 110 is associated with view V1 and is associated with time instance $T_j$. Temporal reference picture 112 is associated with view V1 and is associated with time instance $T_i$. Disparity reference picture 114 is associated with view V0 and is associated with time instance $T_j$. Temporal-disparity reference picture 116 is associated with view V0 and is associated with time instance $T_i$.

Current picture 110 includes a current PU denoted as "$D_0$." In other words, $P_c$ represents a current block in a current view (view 1). $D_c$ has a temporal motion vector $V_D$ that indicates a location in temporal reference picture 112. Video encoder 20 may determine a temporal reference block $D_r$ based on samples in picture 112 that are associated with the location indicated by the temporal motion vector $V_D$. Thus, $D_r$ denotes $D_c$'s temporal prediction block from the same view (view 1) at time $T_i$ and $V_D$ denotes the motion from $D_c$ to $D_r$.

Furthermore, video encoder 20 may determine a disparity reference block $B_c$ based on samples in disparity reference picture 114 that are associated with a location indicated by a disparity vector of $D_c$. Thus, $B_c$ denotes a reference block (i.e., the representation of $D_c$ in the reference view (view 0) at time $T_a$). The top-left position of $B_c$ can be calculated with the derived disparity vector by adding the derived disparity vector to the top-left position of $D_c$. Since $D_c$ and $B_c$ may be projections of the same object in two different views, $D_c$ and $B_c$ should share the same motion information. Therefore, $B_c$'s temporal prediction block $B_r$ in view 0 at time $T_i$ can be located from $B_c$ by applying the motion information of $V_D$.

Video encoder 20 may determine a temporal-disparity reference block $B_r$ (the predictive block of $B_c$) in temporal-disparity picture 116. As indicated above, temporal-disparity picture 116 is associated with the same view (i.e., view V0) as $B_r$ and is associated with the same time instance as $D_r$ (i.e., time instance $T_i$). Video encoder 20 may determine $B_r$ based on samples at a location indicated by the motion vector $V_D$ of $D_c$. Thus, the top-left position of $B_r$ can be calculated with the re-used motion vector $V_D$ by adding the motion vector $V_D$ to the top-left position of $B_c$. The top-left position of $B_c$ can be equal to the sum of the top-left position of $D_c$ and the disparity vector. Thus, the top-left position of $B_r$ may be equal to the sum of the coordinates of the top-left position of $D_c$, the disparity vector, and the motion vector $V_D$. In this way, as shown in FIG. 9 by arrow 118, video encoder 20 may re-use the motion vector $V_D$ for determining $B_r$.

Furthermore, in ARP, each sample in a first residual block may indicate the difference between a sample in $D_c$ and a corresponding sample of $D_r$. The first residual block may be referred to as an original residual block for $D_c$. Each sample in a second residual block may indicate a difference between a sample in $B_c$ and a corresponding sample in $B_r$. The second residual block may be referred to as a "residual predictor." Because video encoder 20 uses the motion vector $V_D$ to determine $B_r$, the residual predictor may be different than the actual residual data of $B_c$.

After video encoder 20 determines the residual predictor, video encoder 20 may multiply the residual predictor by a weighting factor. In other words, the residual of $B_c$ with motion information of $V_D$ is multiplied by a weighting factor and used as the residual predictor for the current residual. The weighting factor may be equal to 0, 0.5, or 1. Thus, three weighting factors may be used in ARP (i.e., 0, 0.5, and 1).

After video encoder 20 multiplies the residual predictor by the weighting factor, the residual predictor may be referred to as a weighted residual predictor. Video encoder 20 may select, as a final weighting factor, the weighting factor that leads to a minimal rate-distortion cost for the current CU (i.e., the CU containing the current PU). Video encoder 20 may include, in the bitstream, at a CU level, data indicating a weighting index. The weighting index may indicate the final weighting factor (i.e., the weighting factor that was used to generate the weighted residual predictor) for the current CU. In some examples, weighting indexes of 0, 1, and 2 correspond to weighting factors of 0, 1, and 0.5, respectively. Selection of the weighting factor of 0 for the current CU is equivalent to not using ARP for any of the PUs of the current CU.

Video encoder 20 may then determine a final residual block for the current PU. Each sample in the final residual block for the current PU may indicate a difference between a sample in the original residual block and a corresponding sample in the weighted residual predictor. A residual block of a current CU (i.e., the CU containing the current PU) may include the final residual block for the current PU along with residual blocks, if any, for other PUs of the current CU. As described elsewhere in this disclosure, video encoder 20 may partition the residual block of the current CU among one or more transform blocks. Each of the transform blocks may be associated with a TU of the current CU. For each transform block, video encoder 20 may apply one or more transforms to the transform block to generate a transform coefficient block. Video encoder 20 may include, in a bitstream, data that represent quantized transform coefficients of the transform coefficient block.

Hence, in ARP, to ensure high correlation between residues of two views, video coder 20 may apply motion of a current PU to a corresponding block in a reference view picture to generate residual in the base view to be used for inter-view residual prediction. In this way, the motion is aligned for the current PU and the corresponding reference block in the reference view. Moreover, an adaptive weighting factor is applied to the residue signal so that the prediction error is further reduced.

If the current PU is bi-predicted, the current PU has a RefPicList0 motion vector, a RefPicList1 motion vector, a RefPicList0 reference index, and a RefPicList1 reference index. This disclosure may refer to the reference picture indicated by the current PU's RefPicList0 reference index as the current PU's RefPicList0 target reference picture. The current PU's RefPicList1 motion vector may indicate a reference location in the current PU's RefPicList1 target reference picture. This disclosure may refer to the reference picture indicated by the current PU's RefPicList1 reference index as the current PU's RefPicList1 target reference picture. The current PU's RefPicList1 motion vector may indicate a reference location in the current PU's RefPicList1 target reference picture.

Hence, when video encoder 20 performs ARP on a bi-predicted PU, video encoder 20 may determine, based on the current PU's RefPicList0 motion vector, a reference location in the current PU's RefPicList0 target reference picture. This disclosure may refer to this reference location as the current PU's RefPicList0 reference location. Video encoder 20 may then determine a reference block that includes actual or interpolated samples of the current PU's RefPicList0 target reference picture that are associated with the current PU's RefPicList0 reference location. This disclosure may refer to this reference block as the current PU's RefPicList0 reference block.

In addition, video encoder 20 may determine, based on the current PU's RefPicList1 motion vector, a reference location in the current PU's RefPicList1 target reference picture. This disclosure may refer to this reference location as the current PU's RefPicList1 reference location. Video encoder 20 may then determine a reference block that includes actual or interpolated samples of the current PU's RefPicList1 target reference picture that are associated with the current PU's RefPicList0 reference location. This disclosure may refer to this reference block as the current PU's RefPicList1 reference block.

Video encoder 20 may determine, based on the current PU's RefPicList0 reference block and the current PU's RefPicList1 reference block, a temporal predictive block for the current PU. For example, each sample in the current PU's temporal predictive block may indicate a weighted average of corresponding samples in the current PU's RefPicList0 reference block and the current PU's RefPicList1 reference block.

Furthermore, when video encoder 20 performs ARP on a bi-predicted PU, video encoder 20 may determine, based on the current PU's RefPicList0 motion vector and a location within a disparity reference frame of a disparity reference block, a temporal-disparity reference location in a temporal-disparity reference picture. This disclosure may refer to this temporal-disparity reference location and this temporal-disparity reference picture as the RefPicList0 temporal-disparity reference location and the RefPicList0 temporal-disparity reference picture, respectively. The RefPicList0 temporal-disparity reference picture may have the same POC value as the current PU's RefPicList0 target reference picture. Video encoder 20 may then determine a sample block that includes actual or interpolated samples of the RefPicList0 temporal-disparity reference picture that are associated with the RefPicList0 temporal-disparity reference location. This disclosure may refer to this sample block as the RefPicList0 temporal-disparity reference block.

In addition, video encoder 20 may determine, based on the current PU's RefPicList1 motion vector and the location within the disparity reference frame of the disparity reference block, a temporal-disparity reference location in a temporal-disparity reference picture. This disclosure may refer to this temporal-disparity reference location and this temporal-disparity reference picture as the RefPicList1 temporal-disparity reference location and the RefPicList1 temporal-disparity reference picture, respectively. The RefPicList1 temporal-disparity reference picture may have the same POC value as the current PU's RefPicList1 target reference picture. Because the current PU's RefPicList0 target reference picture and the current PU's RefPicList1 target reference picture may be different, the RefPicList1 temporal-disparity reference picture may be different than the RefPicList0 temporal-disparity reference picture. Video encoder 20 may then determine a sample block that includes actual or interpolated samples of the RefPicList1 temporal-disparity reference picture that are associated with the RefPicList1 temporal-disparity reference location. This disclosure may refer to this sample block as the RefPicList1 temporal-disparity reference block.

Next, video encoder 20 may determine, based on the RefPicList0 temporal-disparity reference block and the RefPicList1 temporal-disparity reference block, a disparity predictive block. In some examples, each sample in the disparity predictive block is a weighted average of corresponding samples in the RefPicList0 temporal-disparity reference block and the RefPicList1 temporal-disparity reference block. Video encoder 20 may then determine a residual predictor. The residual predictor may be a block of samples. Each sample in the residual predictor may indicate a difference between a sample in the disparity reference block and a corresponding sample in the disparity predictive block. Video encoder 20 may then generate a weighted residual predictor by applying a weighting factor to the residual predictor. Video encoder 20 may then determine a final residual block for the current PU. Each sample in the current PU's final residual block may indicate a difference between a sample in the original prediction block for the current PU and corresponding samples in the current PU's temporal predictive block and the weighted residual predictor. Video encoder 20 may signal the current PU's final residual block in the bitstream.

Video decoder 30 may perform a similar process when performing ARP on a PU and a bi-predicted PU. For instance, video decoder 30 may determine the current PU's temporal predictive block and the weighted residual predictor in the sample manner described above. Video decoder 30 may determine the current PU's final residual block based on data signaled in the bitstream. Video decoder 30 may then reconstruct the current PU's prediction block by adding the current PU's final residual block, the current PU's temporal predictive block, and the weighted residual predictor.

Figure 10:
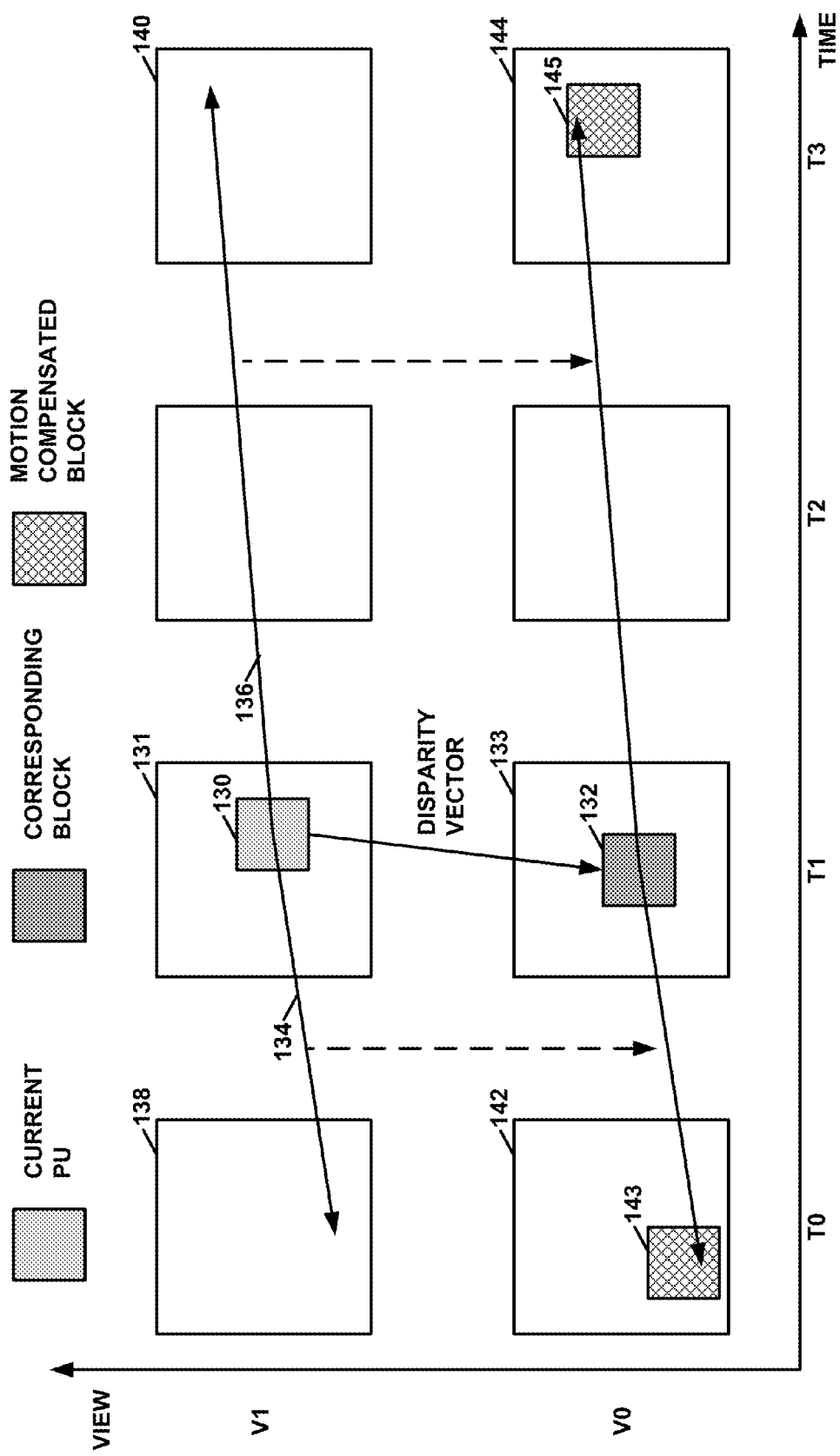
FIG. 10 is a conceptual diagram illustrating an example relationship among a current block, a reference block, and a motion compensated block in ARP.

FIG. 10 illustrates the relationship among current block, corresponding block, and motion compensated block described above. In other words, FIG. 10 is a conceptual diagram illustrating an example relationship among a current block, a reference block, and a motion compensated block in ARP. In the example of FIG. 10, a video coder is currently coding a current PU 130 in a current picture 131. Current picture 131 is associated with a view V1 and a time instance T1.

Furthermore, in the example of FIG. 10, the video coder may determine a reference block 132 (i.e., a corresponding block) that comprises actual or interpolated samples of a reference picture 133 that are associated with a location indicated by a disparity vector of current PU 130. For instance, a top-left corner of reference block 132 may be the location indicated by the disparity vector of current PU 130. Temporal-disparity reference block 145 may have the same size as the prediction block of current PU 130.

In the example of FIG. 10, current PU 130 has a first motion vector 134 and a second motion vector 136. Motion vector 134 indicates a location in temporal reference picture 138. Temporal reference picture 138 is associated with view V1 (i.e., the same view as current picture 131) and a time instance T0. Motion vector 136 indicates a location in temporal reference picture 140. Temporal reference picture 140 is associated with view V1 and a time instance T3.

In accordance with the ARP scheme described above, the video coder may determine a reference picture (i.e., reference picture 142) that is associated with the same view as reference picture 133 and is associated with the same time instance as temporal reference picture 138. In addition, the video coder may add motion vector 134 to coordinates of a top-left corner of reference block 132 to derive a temporal-disparity reference location. The video coder may determine a temporal-disparity reference block 143 (i.e., a motion compensated block). Samples in temporal-disparity reference block 143 may be actual or interpolated samples of reference picture 142 that are associated with the temporal-disparity reference location derived from motion vector 134.

Temporal-disparity reference block 143 may have the same size as the prediction block of current PU 130.

Similarly, the video coder may determine a reference picture (i.e., reference picture 144) that is associated with the same view as reference picture 134 and is associated with the same time instance as temporal reference picture 140. In addition, the video coder may add motion vector 136 to coordinates of the top-left corner of reference block 132 to derive a temporal-disparity reference location. The video coder may then determine a temporal-disparity reference block 145 (i.e., a motion compensated block). Samples in temporal-disparity reference block 145 may be actual or interpolated samples of reference picture 144 that are associated with the temporal-disparity reference location derived from motion vector 136. Temporal-disparity reference block 145 may have the same size as the prediction block of current PU 130.

Furthermore, in the example of FIG. 10, the video coder may determine, based on temporal-disparity reference block 143 and temporal-disparity reference block 145, a disparity predictive block. The video coder may then determine a residual predictor. Each sample in the residual predictor may indicate a difference between a sample in reference block 132 and a corresponding sample in the disparity predictive block.

According to aspects of this disclosure, a video coder (such as a video encoder or a video decoder) may enable or disable ARP (including coding residual of one layer relative to residual of a second, different layer) based on the reference pictures in reference picture lists for the block currently being coded. In an example, the video coder may enable or disable ARP based on whether the reference picture lists for the block currently being coded include any temporal reference pictures. According to aspects of this disclosure, if the reference picture lists for an inter-predicted block includes only inter-view reference pictures, the video coder may disable ARP. In such an example, when the video coder comprises a video encoder, the video encoder may not signal a weighting factor in the bitstream (skip the signaling of a weighting factor). Likewise, when the video coder comprises a video decoder, the video decoder may likewise skip the decoding of a weighting factor and infer that the weighting factor is equal to zero.

The techniques described above may be applied in the context of random access pictures. For example, according to aspects of this disclosure, the video coder may enable or disable ARP based on whether the view component currently being coded is a random access view component.

With respect to random access view components, in HEVC, in general, there are four picture types that can be identified by the NAL unit type. The four picture types include an instantaneous decoding refresh (IDR) picture, a CRA picture, a temporal layer access (TLA) picture and a coded picture that is not an IDR, CRA or TLA picture.

The IDR and the coded pictures are picture types inherited from the H.264/AVC specification. The CRA and the TLA picture types are new additions for the HEVC standard. A CRA picture is a picture type that facilitates decoding beginning from any random access point in the middle of a video sequence, and may be more efficient than inserting IDR pictures. A TLA picture is a picture type that can be used to indicate valid temporal layer switching points.

In video applications, such as broadcasting and streaming, switching may occur between different channels of video data and jumping may occur to specific parts of video data. In such instances, it may be beneficial to achieve minimum delay during switching and/or jumping. This feature is enabled by having random access pictures at regular intervals in the video bitstreams. The IDR picture, specified in both H.264/AVC and HEVC may be used for random access. However, an IDR picture starts a coded video sequence and removes pictures from a decoded picture buffer (DPB) (which may also be referred to as a reference picture memory, as described below with respect to FIGS. 2 and 3). Accordingly, pictures following the IDR picture in decoding order cannot use pictures decoded prior to the IDR picture as a reference. Consequently, bitstreams relying on IDR pictures for random access may have lower coding efficiency. To improve the coding efficiency, CRA pictures in HEVC allow pictures that follow a CRA picture in decoding order but precede the CRA picture in output order to use pictures decoded before the CRA picture as a reference.

In HEVC, a bitstream starting with a CRA picture is considered a conforming bitstream. When a bitstream starts with a CRA picture, the leading pictures of the CRA picture may refer to unavailable reference pictures and therefore may not be correctly decoded. However, HEVC specifies that the leading pictures of the starting CRA picture are not output, hence the name "clean random access." For establishment of bitstream conformance requirement, HEVC specifies a decoding process to generate unavailable reference pictures for decoding of the non-output leading pictures. However, conforming decoder implementations do not have to follow that decoding process, as long as these conforming decoders can generate identical output compared to when the decoding process is performed from the beginning of the bitstream. In HEVC, a conforming bitstream may contain no IDR pictures at all, and consequently may contain a subset of a coded video sequence or an incomplete coded video sequence.

Besides the IDR and CRA pictures, there are other types of random access point pictures, e.g., a broken link access (BLA) picture. For each of the major types of the random access point pictures, there may be sub-types, depending on how a random access point picture could be potentially treated by systems. Each sub-type of random access point picture has a different NAL unit type.

In general, with respect to extensions of HEVC (such as MV-HEVC, 3D-HEVC, or SHVC), whether a view component is a random access point may depend on the NAL unit type of the view component. If the type belongs to those defined in HEVC base specification for random access point pictures, the current view component is a random access point view component (or, for simplicity, random access point picture of the current view).

In some instances, the random access functionality only applies to temporal prediction in a way that certain predictions in the temporal dimension (thus inside a view) is either disabled or constrained similarly as in HEVC base specification. However, inter-view prediction for a random access point view component is still possible, and generally performed to improve coding efficiency, similar to the anchor picture in H.264/MVC. Thus, a random access point (RAP) view component, if using inter-view prediction, may be a P or B picture.

According to aspects of this disclosure, a video coder (such as video encoder 20 or video decoder 30) may disable inter-view residual prediction for each block of a random access view component. In such examples, video encoder 20 may not signal a weighting factor in the bitstream (skip the signaling of a weighting factor). Video decoder 30 may likewise skip the decoding of a weighting factor and automatically determine that the weighting factor is equal to zero.

In another example, according to aspects of this disclosure, the video coder may enable ARP if at least one reference picture is from the same view as the block currently being coded. Additionally or alternatively, the video coder may enable ARP only when both reference pictures (corresponding to a reference picture in RefPicList0 and a reference picture in RefPicList1), if available, are of the same view as the block currently being coded. Additionally or alternatively, the video coder may disable ARP for a block if the block is inter-view coded with an inter-view reference picture. As noted above, when ARP is disabled, the weighting factor is not signaled.

In some examples, when a decoded picture buffer for coding a current block does not include a picture in the same view as the disparity reference picture having the same POC as the temporal reference picture, the video coder may modify the ARP process.

In another example, additionally or alternatively, when one or both of the reference picture lists of the disparity reference block do not include a reference picture in the same view as the disparity reference picture having the same POC as the temporal reference picture, the video coder may modify the ARP process. For example, given a current reference picture list index X (with X being 0 or 1) for the slice containing the disparity reference block, in one example, if the reference picture list with a list index equal to X of the disparity reference block does not include a reference picture in the same view as the disparity reference picture and having the same POC as the temporal reference picture of the current block, the video coder may modify the ARP process. In another example, if neither of the reference picture lists (e.g., neither list 0 nor list 1) of the disparity reference block include a reference picture in the same view as the disparity reference picture and having the same POC as the temporal reference picture of the current block, the video coder may modify the ARP process.

In some examples, the video coder may modify the ARP process by disabling the ARP process, such that the current block is not coded using ARP. In other examples, the video coder may modify the ARP process by scaling the temporal motion vector to identify another temporal-disparity reference picture. For example, the video coder may scale the temporal motion vector such that, when combined with the disparity vector, the scaled combination a temporal-disparity reference picture that is included in the reference picture list and is in a location temporally nearest to the disparity reference picture. The techniques described above may prevent the video coder from attempting to locate the disparity reference block in a picture that is not included in the decoded picture buffer or one or both of the reference picture lists.

According to other aspects of this disclosure, ARP may be enabled or disabled based on a partition mode and/or coding mode of the block currently being coded. For example, weighting factors may only be signaled for only certain partition modes and/or certain coding modes. If a weighting factor is not included in a bitstream, a video decoder may skip the decoding of the weighting factor and infer that the weighting factor is zero valued (thereby disabling ARP). According to aspects of this disclosure, in some examples, the weighting factor for any inter-coded block with partition mode unequal to PART_2Nx2N may not be signaled. In another example, the weighting factor for an inter-coded block with a partition mode other than PART_2Nx2N, PART_2NxN and PART_Nx2N may not be signaled. In still another example, additionally or alternatively, the weighting factor for any inter-coded block with coding mode unequal to skip mode and/or merge mode may not be signaled.

According to still other aspects of this disclosure, a more flexible approach to weighting factors may be implemented. For example, the number of available weighting factors may be altered at the sequence level (e.g., in a parameter set, such as a sequence parameter set (SPS)). In an example for purposes of illustration, an indicator may be signaled in an SPS to disable one or more weighting factors, e.g., 0.5 and/or 1.

In another example, such an indicator may be signaled in VPS and applicable for all non-base views. In still another example, such an indicator may be signaled in video parameter set (VPS) extension for each non-base view. In another example, such an indicator may be provided in a picture parameter set (PPS), a slice header or a view parameter set to disable one or more weighting factors. When a weighting factor has been disabled, fewer bits may be used to represent that remaining weighting factors, thereby providing a bit savings.

According to other aspects, an indicator may be provided to modify and/or replace one or more weighting factors. In an example, the video coder may replace the 0.5 weighting factor with a 0.75 weighting factor. This indicator may be signaled in a slice header, an SPS, a picture parameter set (PPS), or a VPS.

According to aspects of this disclosure, in one example implementation, the video coder may use a modified inter-view residual prediction process as that described in 3D-HTM version 5.0 (noted above). For example, according to aspects of this disclosure, one or more syntax elements may be used to indicate that inter-view residual prediction is applied.

In an example, one or more syntax elements indicating an index of a weighting factor (e.g., a weighting factor index syntax element) may be signaled as part of the CU. In this example, the CU syntax may be modified (e.g., relative to 3D-HTM version 5.0) and the weighting factor syntax element may be signaled only when the following conditions are satisfied: the current view is a dependent texture view, the current CU is not intra-coded, and the current CU has a partition mode equal to PART_2Nx2N. When this syntax element is not present in the bitstream, the weighting factor is inferred to be equal to 0. One example CU syntax table is shown below:

| coding_unit( x0, y0, log2CbSize , ctDepth) { | Descriptor |
|---|---|
| if( transquant_bypass_enable_flag ) { | |
|    cu_transquant_bypass_flag | ae(v) |
| } | |
| ... | |
|   } else { /* PART_NxN */ | |
|     prediction_unit( x0, y0 , log2CUSize ) | |
|     prediction_unit( x1, y0 , log2CUSize ) | |
|     prediction_unit( x0, y1 , log2CUSize ) | |
|     prediction_unit( x1, y1 , log2CUSize ) | |
|   } | |
|   if ( !depth_flag && layer_id && PredMode != MODE_INTRA && PartMode = = PART_2Nx2N ) | |
|     weighting_factor_index | ae(v) |
| ... | |
|   if( !pcm_flag ) { | |
|     if( PredMode[ x0 ][ y0 ] != MODE_INTRA && !(PartMode = = PART_2Nx2N && merge_flag[x0][y0]) | |
| ) | |

-continued

| coding_unit( x0, y0, log2CbSize , ctDepth) { | Descriptor |
|---|---|
|                       no_residual_syntax_flag<br>                if( !no_residual_syntax_flag ) {<br>                      MaxTrafoDepth = ( PredMode[ x0 ][ y0 ] = =<br>MODE_INTRA ?<br>        max_transform_hierarchy_depth_intra + IntraSplitFlag :<br>        max_transform_hierarchy_depth_inter )<br>                      transform_tree( x0, y0 x0, y0, log2CbSize, 0,<br>                      0 )<br>                }<br>        }<br>} | ae(v) |

Another example CU syntax table is shown below:

| coding_unit( x0, y0, log2CbSize , ctDepth) { | Descriptor |
|---|---|
|   if( transquant_bypass_enable_flag ) {<br>    cu_transquant_bypass_flag<br>  }<br>...<br>  } else { /* PART_NxN */<br>    prediction_unit( x0, y0 , log2CUSize )<br>    prediction_unit( x1, y0 , log2CUSize )<br>    prediction_unit( x0, y1 , log2CUSize )<br>    prediction_unit( x1, y1 , log2CUSize )<br>  }<br>  if ( !depth_flag && layer_id && PredMode !=<br>MODE_INTRA && PartMode = =<br>    PART_2Nx2N && TempMVAvai &&<br>    DispVectAvai )<br>    weighting_factor_index<br>...<br>  if( !pcm_flag ) {<br>    if( PredMode[ x0 ][ y0 ] != MODE_INTRA &&<br>      !(PartMode = = PART_2Nx2N &&<br>merge_flag[x0][y0]) )<br>      no_residual_syntax_flag<br>    if( !no_residual_syntax_flag ) {<br>      MaxTrafoDepth = ( PredMode[ x0 ][ y0 ] = =<br>MODE_INTRA ?<br>  max_transform_hierarchy_depth_intra + IntraSplitFlag :<br>  max_transform_hierarchy_depth_inter )<br>      transform_tree( x0, y0 x0, y0, log2CbSize, 0,<br>        0 )<br>    }<br>  }<br>} | <br>ae(v)<br><br><br><br><br><br><br><br><br><br><br><br><br>ae(v)<br><br><br><br>ae(v) |

In the example above, TempMVAvai may be set equal to 1 when the current CU is predicted from at least one reference picture from the same view. Otherwise, it is set equal to 0. In addition, DispVectAvai may be set equal to 1 if a disparity vector could be found. Otherwise, it is equal to 0.

In another example, the weighting factor syntax element may be signaled only when the following conditions are satisfied: the current view is a dependent texture view, the current CU is not intra-coded, and the current CU has a partition mode equal to PART_2N×2N, the derived disparity vector is available, and at least one partition has a temporal motion vector, e.g., the reference picture is from the same view. When this syntax element is not present in the bitstream, the weighting factor is inferred to be equal to 0.

In still another example, the weighting factor syntax element may be signaled only when the following conditions are satisfied: the current view is a dependent texture view, the current CU is not intra-coded, and the current CU has a partition mode equal to PART_2N×2N, the derived disparity vector is available, and at least one partition in all PUs of current CU has a temporal motion vector, e.g., the reference picture is from the same view. When this syntax element is not present in the bitstream, the weighting factor is inferred to be equal to 0.

In still another example, the weighting factor syntax element may be signaled only when the following conditions are satisfied: the current view is a dependent texture view, and the derived disparity vector is available.

According to aspects of this disclosure, the weighting factor may be signaled in a variety of ways. For example, as noted above, the syntax element weighting factor index may indicate an index to a weighting factor used for advanced residual prediction. When not present, advanced residual prediction may be disabled for the current CU. For example, if the weighting factor is equal to 0, the residual of the current block is conventionally coded using the HEVC transform coding, and the specifications, such as in subclause 8.5.2.2, of the HEVC specification (e.g., such as WD9, as identified above) is invoked to get the prediction samples. If the weighting factor index is present, the current residual signal is predicted using the potentially interpolated reference residual signal multiplied by the weighting factor and only the difference is transmitted, and the process described below with respect to modified subclauses 8.5.2.2.1 and 8.5.2.2.2 of the HEVC specification (e.g., WD9) may be invoked for each prediction list where the temporal reference picture is utilized.

In some instances, a weighting factor index may be mapped to a weighting factor. In this way, the video coder may implement a more flexible approach to weighting factors in inter-view residual prediction. For example, assume for purposes of illustration that there are N different weighting factors that are to be signaled, with N equal to 2, 3, 4, or the like. Each of these weighting factors may initially be mapped to a unique weighting index, as shown in the example of Table 1 below, where $W_0, W_1, W_2, \ldots, W_{N-1}$ are the weighting factors in the ascending order of values.

TABLE 1

Mapping between weighting factor indices and weighting factors

| Value of weighting_factor_index | Value of Weighting factors |
|---|---|
| 0 | $W_0$ |
| 1 | $W_1$ |
| 2 | $W_2$ |
| 3 | ... |
| 4 | ... |
| 5 | ... |
| ... | ... |
| N-1 | $W_{N-1}$ |

In another example, $W_0, W_1, W_2, \ldots, W_{N-1}$ may represent the weighting factors in descending order of the probability of the weighting factor being used, which may be calculated during coding.

Another example mapping is shown in Table 2 below, where weighting factors equal to 0, 1, 0.5 are indexed by 0, 1, 2, respectively. All the remaining weighting factors may be indexed based on the ascending order of values or descending order of probabilities.

TABLE 2

Mapping between weighting factor indices and weighting factors

| Value of weighting_factor_index | Value of Weighting factors |
|---|---|
| 0 | 0 |
| 1 | 1 |
| 2 | 0.5 |
| 3 | ... |
| 4 | ... |
| 5 | ... |
| ... | ... |
| N-1 | ... |

Video decoder 30 may parse the weighting factor index from an encoded bitstream to determine the value of the index. In one example, each weighting factor may be identified by a weighting factor index, and the weighting factor indices may be signaled using truncated unary binarization, as described in section 9.3.2.2 of HEVC specification (e.g., WD9). In another example, weighting factors may be first mapped to a unique weighting index based on the descending order of the probabilities of the weighting factors and then coded with truncated unary binarization.

In still another example, the binarization process may be defined according to Table 3 below:

TABLE 3

Binarization of weighting factors (N is larger than 4)

| Value of Weighting_factor_index | Bin values | | | | | | |
|---|---|---|---|---|---|---|---|
| 0 | 0 | | | | | | |
| 1 | 1 | 0 | 0 | | | | |
| 2 | 1 | 0 | 1 | | | | |
| 3 | 1 | 1 | 0 | | | | |
| 4 | 1 | 1 | 1 | 0 | | | |
| 5 | 1 | 1 | 1 | 1 | 0 | | |
| ... | 1 | 1 | 1 | 1 | 1 | 0 | |
| N-1 | 1 | 1 | 1 | 1 | 1 | ... | 1 |
| binIdx | 0 | 1 | 2 | 3 | 4 | ... | N-3 |

Here, the bin string of weighting factor indices corresponding to values 3 to N-1 consists with a prefix of '11' and a suffix, indexed by subtracting 3 from the value of weighting_factor_index where truncated unary binarization is used.

When there are total four weighting factors, the binarization process may be defined by the following table:

TABLE 4

Binarization of weighting factors (N = 4)

| Value of Weighting_factor_index | Bin values | | |
|---|---|---|---|
| 0 | 0 | | |
| 1 | 1 | 0 | 0 |
| 2 | 1 | 0 | 1 |
| 3 | 1 | 1 | |
| binIdx | 0 | 1 | 2 |

When there are in total three weighting factors, for example, 0, 0.5 and 1, the binarization process may be defined by the following table:

TABLE 5

Binarization of weighting factors (N = 3)

| Value of Weighting_factor_index | Bin string | |
|---|---|---|
| 0 | 0 | |
| 1 | 1 | 0 |
| 2 | 1 | 1 |
| binIdx | 0 | 1 |

With respect to context initialization, one set of contexts may be used for coding the weighting factor indices. The advanced inter-view residual prediction mode may apply for both P slices and B slices. The initial probability for the context of weighting indices of P slices may be different from that of the B slices. Alternatively, all the context models are initialized with equal probability for different bin values, e.g., 0 and 1.

With respect to context selection, assume for purposes of illustration that the luma location (xC, yC) specifies the top-left luma sample of the current luma coding block relative to the top-left sample of the current picture. Assume further that the variable availableL, specifying the availability of the coding block located directly to the left of the current coding block, is derived by invoking the availability derivation process for a block in z-scan order as specified in subclause 6.4.1 of HEVC specification with the location (xCurr, yCurr) set equal to (xC, yC) and the neighbouring location (xN, yN) set equal to (xC−1, yC) as the input and the output is assigned to availableL.

In the example above, the variable availableA specifying the availability of the coding block located directly above the current coding block, may be derived by invoking the availability derivation process for a block in z-scan order as specified in subclause 6.4.1 of the HEVC specification (e.g., WD9) with the location (xCurr, yCurr) set equal to (xC, yC) and the neighbouring location (xN, yN) set equal to (xC, yC−1) as the input and the output is assigned to availableA.

According to aspects of this disclosure, condTermFlagN (N can be L or A) can be derived as follows:
  If mbPAddrN is available and weighting factor for the block mbPAddrN is unequal to 0, condTermFlagN is set equal to 1
  Otherwise (mbPAddrN is unavailable or weighting factor for the block mbPAddrN is equal to 0), condTermFlagN is set equal to 0.

In addition, assume the ctxIdx is the context index to be used to code the weighting factor indices. In this example, the ctxIdx increments (ctxIdxInc) for each bin to be coded is derived by ctxIdxInc=M*condTermFlagL+N*condTermFlagA. where M or N can be 1 or 2. Alternatively, ctxIdxInc may be derived by ctxIdxInc=condTermFlagA. Alternatively, ctxIdxInc may be derived by ctxIdxInc=condTermFlagL. Alternatively, ctxIdxInc may be fixed to be 0.

As noted above, in some examples, weighting factors may be modified. For example, the number of available weighting factors may be altered at the sequence level (e.g., in a parameter set, such as a sequence parameter set (SPS)). In an example for purposes of illustration, an indicator may be signaled in an SPS to disable one or more weighting factors, e.g., 0.5 and/or 1. In another example, such an indicator may be signaled in VPS and applicable for all non-base views. In still another example, such an indicator may be signaled in video parameter set (VPS) extension for each non-base view. In another example, such an indicator may be provided in a picture parameter set (PPS), a slice header or a view parameter set to disable one or more weighting factors.

According to other aspects, an indicator may be provided to modify and/or replace one or more weighting factors. In an example, the video coder may replace the 0.5 weighting factor with a 0.75 weighting factor. This indicator may be signaled in a slice header, an SPS, a picture parameter set (PPS), or a VPS.

In one example, a video parameter set may be modified as follows (e.g., relative to 3D-HTM version 5.0):
Video Parameter Set Extension

| | Descriptor |
|---|---|
| vps_extension( ) { | |
|   while( !byte_aligned( ) ) | |
|     vps_extension_byte_alignment_reserved_one_bit | u(1) |
|   } | |
|   ... | |
|   for( i = 0; i <= vps_max_layers_minus1; i++ ) { | |
|     if (i) { | |
|       multi_view_mv_pred_flag[ i ] | u(1) |
|       ~~multi_view_residual_pred_flag[i]~~ | ~~u(1)~~ |
|       advanced_residual_pred_flag[ i ] | u(1) |
|       if (advanced_residual_pred_flag[ i]) { | |
|         weight_factor_change_flag[ i ]) | u(1) |
|         if(weight_factor_change_flag[ i ]) | |
|           diff_weight[ i ] | se(v) |
|       } | |
|     } | |
|     if (i%1) { | |
|       enable_dmm_flag[ i ] | u(1) |
|       use_mvi_flag[ i ] | u(1) |
|     } | |
|   } | |
| } | |

In the example above, advanced_residual_pred_flag[i] equal to 1 may specify that advanced residual prediction (ARP) may be used for the current texture view with layer_id equal to i. advanced_residual_pred_flag[i] equal to 0 specifies that ARP is not used for the current texture view with layer_id equal to i. When not present, advanced_residual_pred_flag[i] may be inferred to be equal 0.

In another example, a flag, namely advanced_residual_pred_flag may be signaled once in VPS extension and may be applicable to all non-base texture views. In this example, weight_factor_change_flag[i] equal to 1 may specify that the weighting factor corresponding to weighting factor index equal to 2 is changed for the current layer. In addition, weight_factor_change_flag[i] equal to 0 may specify that the weighting factor corresponding to weighting factor index equal to 2 is unchanged for the current layer. In addition, diff_weight[i] may specify a difference (with possible scaling) between the new weighting factor and the original weighting factor for weighting factor index equal to 2. The range of diff_weight[i] may be from −2 to 4, inclusive.

In the example above, the video coder may derive the new weighting factor as follows:

$$W_2 = (W_2 * 4 + \text{diff\_weight}[i]) \div 4.$$

In the example above, when the weighting factor $W_2$ is equal to $W_0$ or $W_1$, the weighting factor index of any CU in the applicable view is always smaller than 2.

In still another example, the syntax elements described above may be signaled in sequence parameter set or sequence parameter set extension as advanced_residual_pred_flag, weight_factor_change_flag and diff_weight to achieve the same functionality for a non-base texture view referring to the sequence parameter set.

Figure 11:
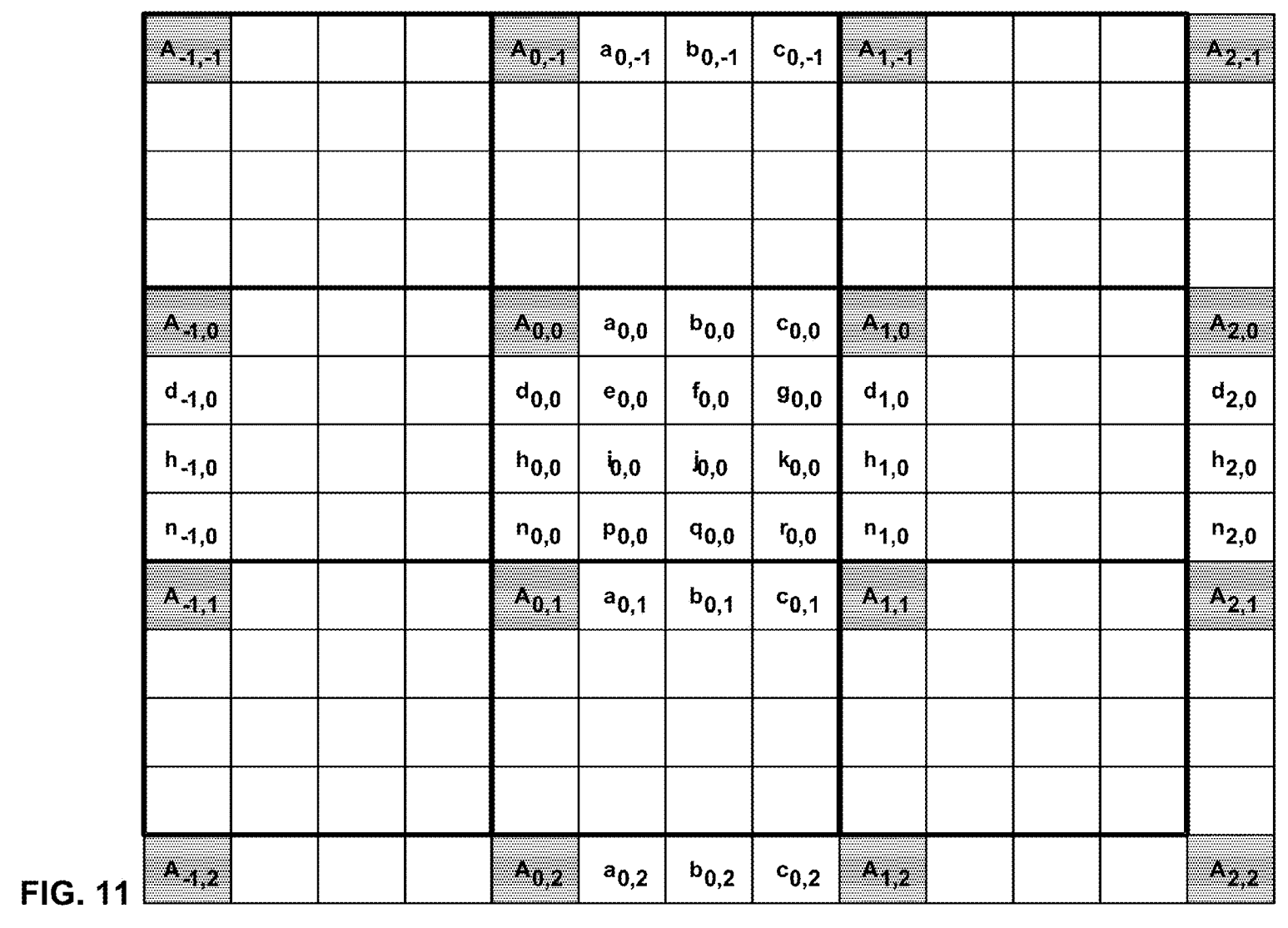

FIG. 11 illustrates sample locations in video data. In general, the sample locations may be identified by a motion vector or disparity vector in video coding. A video coder (such as video encoder 20 and/or video decoder 30) may use the samples associated with the identified location for purposes of predictive coding. In the example of FIG. 11, integer samples are indicated with upper-case letters, while fractional sample positions are indicated with lower case letters. While the example of FIG. 11 generally illustrates quarter-sample luma interpolation, similar interpolation may be applied for chroma components.

When a video coder (such as video encoder 20 or video decoder 30) performs ARP for a PU, the video coder may need to access three blocks (i.e., $B_r$, $B_c$, and $D_r$ in FIG. 9). As noted above, if a motion vector indicates a fractional-pel location, the video coder performs two fractional-pel interpolation processes, e.g., one interpolation process to locate the temporal reference block and another interpolation process to locate the disparity-temporal reference block. In addition, the video coder may apply yet another fractional-pel interpolation process when determining a disparity reference block. HEVC may use an 8/4-tap luma/chroma interpolation filter for a fractional sample interpolation process when determining motion compensated blocks.

According to aspects of this disclosure, the motion compensation process of ARP may be simplified, particularly with respect to sub-pel interpolation of reference blocks. In some instances, according to aspects of this disclosure, the video coder may use one or more types of interpolations for determining the locations of reference blocks in ARP. For example, the video coder may use a low pass filter, such as a bi-linear filter, to interpolate the location of reference blocks. In general, a bi-linear filter (i.e., bilinear interpolation) is an extension of linear interpolation for interpolating functions of two variables (e.g., x and y) on a regular 2-dimensional grid. Hence, a bi-linear filter may be a 2-tap filter.

In some examples, the video coder may use a bi-linear filter when generating the disparity reference block and the temporal-disparity reference block. Accordingly, the 8/4-tap luma/chroma interpolation filter used in HEVC for fractional sample interpolation process may be replaced by a bi-linear filter when generating the residual predictor, i.e., generating the $B_r$ and $B_c$ shown in FIG. 9.

In addition, in some examples, the video coder may use a bi-linear filter when generating a motion-compensated block of the current PU. That is, the 8/4-tap luma/chroma interpolation filter used in HEVC for fractional sample interpolation process may be replaced by a bi-linear filter when generating the motion-compensated block of the current PU, i.e., generating the $D_r$ shown in FIG. 9. Thus, when determining a predictive block for a current PU, the video coder may apply a bi-linear filter to luma and/or chroma components of the temporal reference picture.

In one alternative example, the video coder may apply the bi-linear filter described above only to the luma or only to the chroma component. In another example, the video coder may apply the bi-linear filter to both luma and chroma components.

In the example shown in FIG. 11, the inputs to the luma sample interpolation process may include a luma location in full-sample units ($xInt_L$, $yInt_L$), a luma location in fractional-sample units ($xFrac_L$, $yFrac_L$), and the luma reference sample array refPicLX$_L$. In addition, the output of the interpolation process is a predicted luma sample value predSampleLX$_L$[x$_L$, y$_L$]

The positions labelled with upper-case letters A$_{i,j}$ within the shaded blocks represent luma samples at full-sample locations inside the given two-dimensional array refPicLX$_L$ of luma samples. These samples may be used for generating the predicted luma sample value predSampleLX$_L$[x$_L$, y$_L$]. The locations (xA$_{i,j}$, yA$_{i,j}$) for each of the corresponding luma samples A$_{i,j}$ inside the given array refPicLX$_L$ of luma samples may be derived as follows:

$$xA_{i,j} = \text{Clip3}(0, \text{pic\_width\_in\_luma\_samples}-1, x\text{Int}_L+i) \quad (6\text{-}1)$$

$$yA_{i,j} = \text{Clip3}(0, \text{pic\_height\_in\_luma\_samples}-1, y\text{Int}_L+j) \quad (6\text{-}2)$$

The positions labelled with lower-case letters within un-shaded blocks represent luma samples at quarter pixel (quarter-pel) sample fractional locations. The luma location offset in fractional-sample units (xFrac$_L$, yFrac$_L$) specifies which of the generated luma samples at full-sample and fractional-sample locations is assigned to the predicted luma sample value predSampleLX$_L$[x$_L$, y$_L$]. This assignment may be performed according to the assignment specified in Table 6-1, shown below. The value of predSampleLX$_L$[x$_L$, y$_L$] is the output.

Variables shift1, shift2 and shift3 may be derived in the same way as HEVC subclause 8.5.2.2.2.2. Given the luma samples A$_{i,j}$ at full-sample locations xA$_{i,j}$, yA$_{i,j}$), the luma samples 'a$_{0,0}$' to 'r$_{0,0}$' at fractional sample positions may be derived by the following equations.

The samples labelled a$_{0,0}$, b$_{0,0}$, c$_{0,0}$, d$_{0,0}$, h$_{0,0}$, and n$_{0,0}$ may be derived by applying a 2-tap filter to the nearest integer position samples:

$$a_{0,0} = (48*A_{0,0} + 16*A_{1,0}) >> \text{shift1} \quad (6\text{-}3)$$

$$b_{0,0} = (32*A_{0,0} + 32*A_{1,0}) >> \text{shift1} \quad (6\text{-}4)$$

$$c_{0,0} = (16*A_{0,0} + 48*A_{1,0}) >> \text{shift1} \quad (6\text{-}5)$$

$$d_{0,0} = (48*A_{0,0} + 16*A_{0,1}) >> \text{shift1} \quad (6\text{-}6)$$

$$h_{0,0} = (32*A_{0,0} + 32*A_{0,1}) >> \text{shift1} \quad (6\text{-}7)$$

$$n_{0,0} = (16*A_{0,0} + 48*A_{0,1}) >> \text{shift1} \quad (6\text{-}8)$$

The samples labelled e$_{0,0}$, i$_{0,0}$, p$_{0,0}$, f$_{0,0}$, j$_{0,0}$, q$_{0,0}$, g$_{0,0}$, k$_{0,0}$ and r$_{0,0}$ may be derived by applying the 8-tap filter to the samples a$_0$, b$_0$ and c$_0$ where i=−3.4 in vertical direction:

$$e_{0,0} = (48*a_{0,0} + 16*a_{0,1}) >> \text{shift2} \quad (6\text{-}9)$$

$$i_{0,0} = (32*a_{0,0} + 32*a_{0,i}) >> \text{shift2} \quad (6\text{-}10)$$

$$p_{0,0} = (16*a_{0,0} + 48*a_{0,1}) >> \text{shift2} \quad (6\text{-}11)$$

$$f_{0,0} = (48*b_{0,0} + 16*b_{0,1}) >> \text{shift2} \quad (6\text{-}12)$$

$$j_{0,0} = (32*b_{0,0} + 32*b_{0,1}) >> \text{shift2} \quad (6\text{-}13)$$

$$q_{0,0} = (16*b_{0,0} + 48*b_{0,1}) >> \text{shift2} \quad (6\text{-}14)$$

$$g_{0,0} = (48*c_{0,0} + 16*c_{0,1}) >> \text{shift2} \quad (6\text{-}15)$$

$$k_{0,0} = (32*c_{0,0} + 32*c_{0,1}) >> \text{shift2} \quad (6\text{-}16)$$

$$r_{0,0} = (16*c_{0,0} + 48*c_{0,1}) >> \text{shift2} \quad (6\text{-}17)$$

TABLE 6-1

Assignment of the luma prediction sample predSampleLX$_L$[x$_L$, y$_L$]

| xFracL | 0 | | 0 | 0 | 0 | 1 | 1 | 1 | 1 | 2 | 2 | 2 | 2 | 3 | 3 | 3 | 3 |
|---|---|---|---|---|---|---|---|---|---|---|---|---|---|---|---|---|---|
| yFracL | 0 | | 1 | 2 | 3 | 0 | 1 | 2 | 3 | 0 | 1 | 2 | 3 | 0 | 1 | 2 | 3 |
| predSampleLX$_L$ [x$_L$, y$_L$] | A << shift3 | | d | h | n | a | e | i | p | b | f | j | q | c | g | k | r |

As noted above, while described with respect to a luma component, a video coder may locate samples in a chroma block in a similar manner.

In some examples, the locations of the disparity reference block and the temporal-disparity reference block may be determined after the motion compensation as specified in subclause 8.5.2.2.1 and 8.5.2.2.2 of HEVC specification have been applied. For example, for the current block, the predicted luma sample array may be identified as predSampleLX$_L$, and chroma sample arrays may be identified as predSampleLX$_{cb}$ and predSampleLX$_{cr}$. In this example, if the weighting factor is not equal to 0, the video coder may perform the following operations at the end of the process:

For each reference picture list X (X being 0 or 1), if the reference picture is not an inter-view reference picture, the following apply to further modify the predicted sample values:

1. Invoked the disparity vector derivation process to obtain a disparity vector, pointing to a target reference view.
2. Locate the reference block by the disparity vector in the picture target reference view within the same access unit. If the disparity vector points to a fractional position (i.e., the top-left position of the reference block (B$_c$ in FIG. 9) is a fractional one), bilinear filter is applied to interpolate the reference block.
3. Re-use the motion information of the current block to derive the motion information for the reference block. Apply motion compensation for the reference block based the derived motion vector of the reference block and derived reference picture in the reference view for the reference block, to derive a residue block. The relationship among current block, reference block and motion compensated block is shown in FIG. 9.
    Denote the reference index of the current block as ref_idx_lx
    Select in the decoded picture buffer a reference picture which has the same POC as refPicListX [ref_idx_lx] and within the target reference view. Derive the motion vector of the reference block to be the same as the motion vector of the current block.
    Bilinear interpolation is applied if the motion vector points to a fractional position, i.e., the top-left position of the reference block plus the motion vector is a fractional position (top-left position of B$_r$ in FIG. 9).
4. Apply the weighting factor to the residue block to get a weighted residue block, denoted as predARPSampleLX$_L$, predARPSampleLX$_{cb}$, and predARPSampleLX$_{cr}$,
5. Add the values of the weighted residue block to the predicted samples:
    predSampleLX$_L$=predSampleLX$_L$+predARPSampleLX$_L$
    predSampleLX$_{cb}$=predSampleLX$_{cb}$+predARPSampleLX$_{cb}$ predSampleLX$_{cr}$=predSampleLX$_{cr}$+predARPSampleLX$_{cr}$ Note that the above operation is a matrix/vector adding operation.

Regardless whether the advanced inter-view residual prediction is applied or not, weighted sample prediction process, such as specified in subclause 8.5.2.2.3 of the HEVC specification (e.g., WD9), applies for a bi-directional predicted PU.

As noted above, according to some aspects of this disclosure, when reference picture list(s) of the disparity reference block do not include a reference picture in the same view as the disparity reference picture having the same POC as the temporal reference picture, the video coder may modify the ARP process.

In some examples, the video coder may modify the ARP process by disabling the ARP process, such that the current block is not coded using ARP. In other examples, the video coder may modify the ARP process by scaling the temporal motion vector to identify another temporal-disparity reference picture. For example, the video coder may scale the temporal motion vector such that, when applied to the disparity reference picture, the scaled motion vector identifies a temporal-disparity reference picture that is included in the reference picture list and is in a location temporally nearest to the disparity reference picture.

Figure 12:
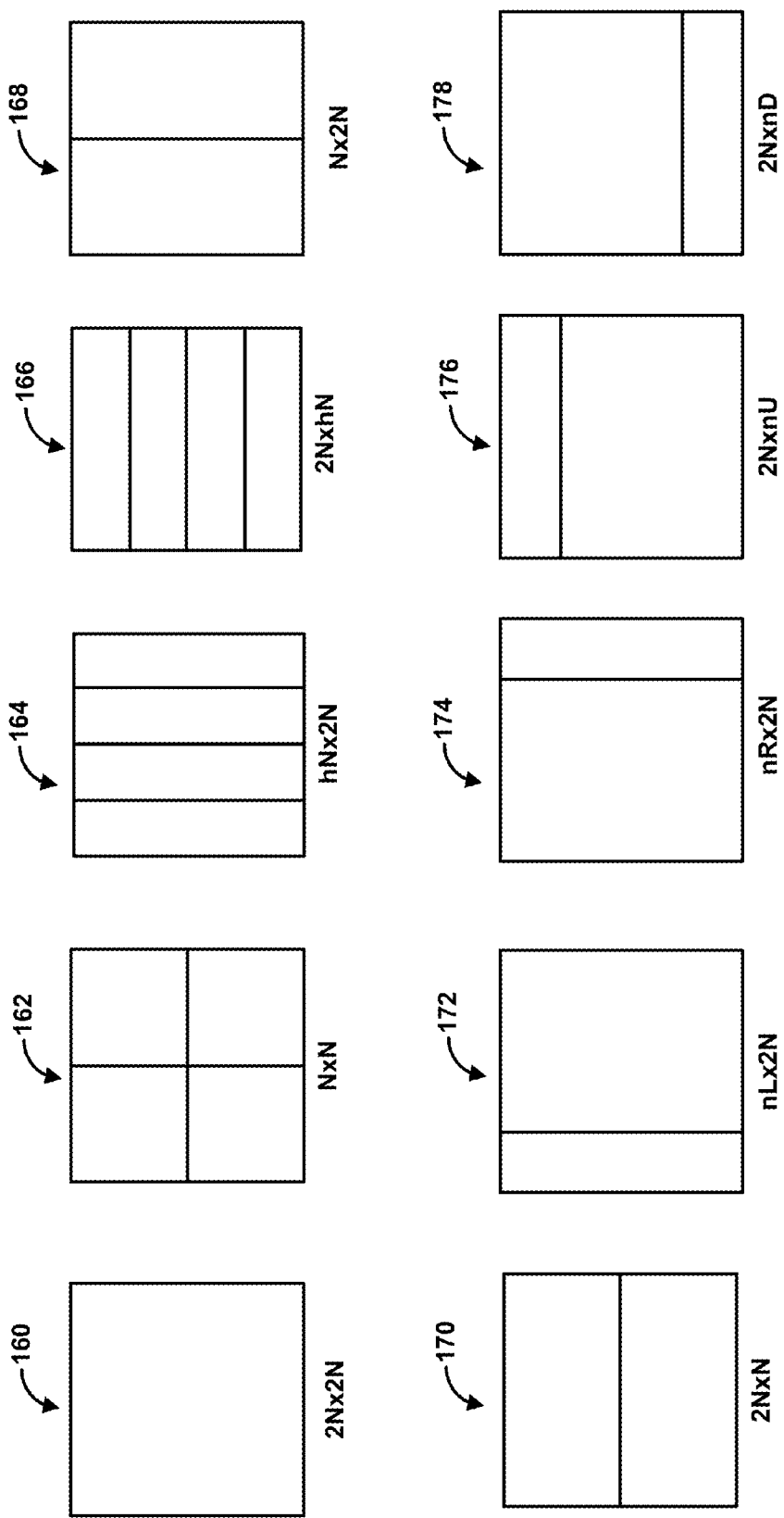
FIG. 12 is a conceptual diagram illustrating partition modes for coding a block of video data.

FIG. 12 generally illustrates partitioning modes (which may define PU sizes) that may be associated with prediction units. For example, assuming the size of a particular CU is 2N×2N, the CU may be predicted using partition modes 2N×2N (160), N×N (162), hN×2N (164), 2N×hN (166), N×2N (168), 2N×N (170), nL×2N (172), nR×2N (174), 2N×nU (176), and 2N×nD (178). The partition modes shown in the example of FIG. 12 are presented for purposes of illustration only, and other partition modes may be used to indicate the manner in which video data is predicted.

In some instances, a video coder (e.g., such as video encoder 20 and/or video decoder 30) may perform intra-prediction or inter-prediction using partition modes 160 and 162. For example, the video coder may predict a CU as a whole using the 2N×2N PU (partition mode 160). In another example, the video coder may predict the CU using four N×N sized PUs (partition mode 162), with each of the four sections having a potentially different prediction technique being applied.

In addition, with respect to intra-coding, the video coder may perform a technique referred to as short distance intra-prediction (SDIP). If SDIP is available, the CU may be predicted using parallel PUs (partition modes 164 and 166). That is, SDIP generally allows a CU to be divided into parallel PUs. By splitting a coding unit (CU) into non-square prediction units (PUs) the distances between the predicted and the reference pixels may be shortened.

With respect to inter-coding, in addition to the symmetric partition modes 160 and 162, the video coder may implement a side-by-side arrangement of PUs (partition modes 168 and 170), or a variety of AMP (asymmetric motion partition) modes. With respect to the AMP modes, the video coder may asymmetrically partition a CU using partition modes nL×2N (172), nR×2N (174), 2N×nU (176), and 2N×nD (178). In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right."

According to other aspects of this disclosure, ARP may be enabled or disabled based on a partition mode and/or coding mode of the block currently being coded. For example, weighting factors may only be signaled for only certain partition modes and/or certain coding modes. If a weighting factor is not included in a bitstream, a video decoder may skip the decoding of the weighting factor and infer that the weighting factor is zero valued (thereby disabling ARP).

In an example, as noted above with respect to the example coding unit syntax tables, according to some aspects of this disclosure, the weighting factor for any inter-coded block with partition mode unequal to PART_2N×2N (partition mode 160) may not be signaled. In another example, the weighting factor for an inter-coded block with a partition mode other than PART_2N×2N (partition mode 160), PART_2N×N (partition mode 170) and PART_N×2N (partition mode 168) may not be signaled. In still another example, additionally or alternatively, the weighting factor for any inter-coded block with coding mode unequal to skip mode and/or merge mode may not be signaled.

Figure 13:
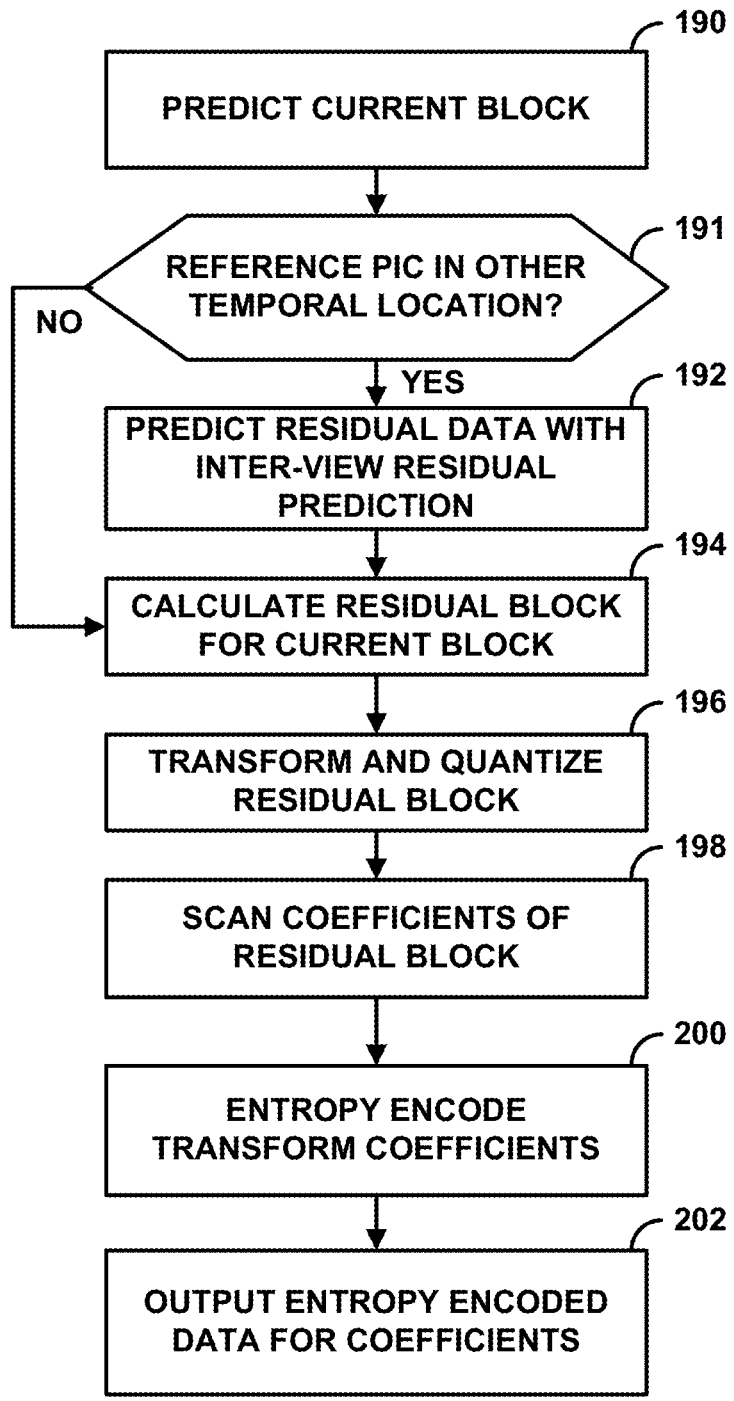
FIG. 13 is flowchart illustrating an example operation of a video encoder, in accordance with one or more techniques of this disclosure.

FIG. 13 is a flowchart illustrating an example method for encoding a current block in accordance with the techniques of this disclosure. The current block may comprise a current CU or a portion of the current CU, e.g., a current PU. Although described with respect to video encoder 20 (FIGS. 1 and 2), it should be understood that other devices may be configured to perform a method similar to that of FIG. 13.

In this example, video encoder 20 initially predicts the current block (190) using a motion vector. For example, video encoder 20 may calculate one or more prediction units (PUs) for the current block. In this example, it is assumed that video encoder 20 inter-predicts the current block. For example, motion estimation unit 42 may calculate a motion vector for the current block by performing a motion search of previously coded pictures, e.g., inter-view pictures and temporal pictures. Thus, motion estimation unit 42 may produce a temporal motion vector or a disparity motion vector to encode the current block.

Video encoder 20 may then determine whether the reference picture lists (e.g., RefPicList0 and RefPicList 1, when the current block is bi-predicted) for coding the current block includes one or more reference pictures at a temporal location other than the temporal location of the current block (191). In some examples, video encoder 20 may make such a determination by determining whether the current block is included in a random access picture, as described elsewhere in this disclosure.

If the reference picture lists do include a reference picture in a temporal location that is different than the temporal location of the current block (the yes branch of step 191) video encoder 20 may enable an inter-view residual prediction process, such as the ARP process described above. In this example, video encoder 20 may perform inter-residual prediction to predict the residual data of the current block (192). For example, as noted above, video encoder 20 may determine a disparity reference block indicated by a disparity vector of the first block, determine a temporal-disparity reference block by combining the temporal motion vector and the disparity motion vector, and determine a residual predictor based on a difference between the temporal-disparity reference block and the disparity reference block. Video encoder 20 may apply a weighting factor to the residual predictor. Video encoder 20 may then calculate a residual block for the current block (194).

If the reference picture lists do not include a reference picture in a temporal location that is different than the temporal location of the current block (the no branch of step 191) video encoder 20 may disable an inter-view residual prediction process, such as the ARP process described above, and may skip to calculating the residual block for the current block (194). In this example, video encoder 20 may not signal a weighting factor for the inter-view residual prediction process. That is, in an example for purposes of illustration, video encoder 20 may not signal a weighting factor index syntax element in the bitstream.

In either case, video encoder 20 calculates the residual block for the current block, e.g., to produce a transform unit (TU) (194). To calculate the residual block when inter-view residual prediction is not used, video encoder 20 may calculate a difference between the original, uncoded block and the predicted block for the current block to produce the residual. To calculate the residual block when inter-view residual prediction is used, video encoder 20 may calculate a difference between the original, uncoded block and the predicted block for the current block to generate a first residual. Video encoder 20 may then calculate a final residual based on the difference between the first residual and the residual predictor.

Video encoder 20 may then transform and quantize coefficients of the residual block (196). Next, video encoder 20 may scan the quantized transform coefficients of the residual block (198). During the scan, or following the scan, video encoder 20 may entropy encode the transform coefficients including, e.g., an inter-view residual prediction weighting value in instances in which inter-view residual prediction is enabled and applied (200). Video encoder 20 may then output the entropy coded data for coefficients of the block and the weighting value in instances in which inter-view residual prediction is enabled and applied (202).

Figure 14:
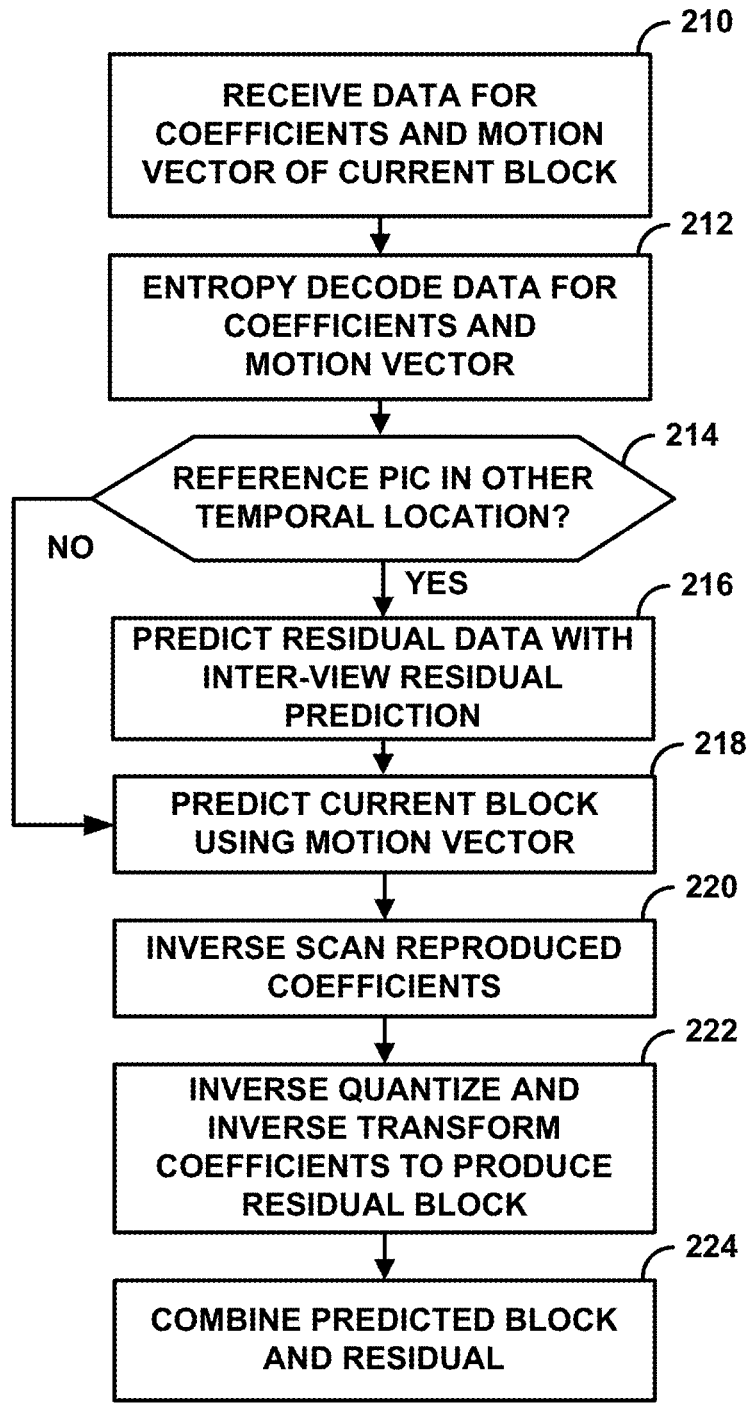
FIG. 14 is a flowchart illustrating an example operation of a video decoder, in accordance with one or more techniques of this disclosure.

FIG. 14 is a flowchart illustrating an example method for decoding a current block of video data in accordance with the techniques of this disclosure. The current block may comprise a current CU or a portion of the current CU (e.g., a PU). Although described with respect to video decoder 30 (FIGS. 1 and 3), it should be understood that other devices may be configured to perform a method similar to that of FIG. 14.

Initially, video decoder 30 receives data for transform coefficients and a motion vector for the current block (210). Again, this example assumes that the current block is inter-predicted. Entropy decoding unit 80 entropy decodes the data for the coefficients and the motion vector for the block (212).

Video decoder 30 may then determine whether reference picture lists (e.g., RefPicList0 and RefPicList1, when the current block is bi-predicted) for coding the current block include one or more reference pictures at a temporal location other than the temporal location of the current block (214). In some examples, video decoder 30 may make such a determination by determining whether the current block is included in a random access picture, as described elsewhere in this disclosure.

If the reference picture lists do include a reference picture in a temporal location that is different than the temporal location of the current block (the yes branch of step 214) video decoder 30 may enable an inter-view residual prediction process, such as the ARP process described above. In this example, video decoder 30 may perform inter-residual prediction to predict the residual data of the current block (216). For example, as noted above, video decoder 30 may determine a disparity reference block indicated by a disparity vector of the first block, determine a temporal-disparity reference block by combining the temporal motion vector and the disparity motion vector, and determine a residual predictor based on a difference between the temporal-disparity reference block and the disparity reference block. Video decoder 30 may also apply a weighting factor, as signaled in the bitstream, to the residual predictor.

If the reference picture lists do not include a reference picture in a temporal location that is different than the temporal location of the current block (the no branch of step 214), or after predicting residual data with inter-view residual prediction (216)) video decoder 30 may disable an inter-view residual prediction process, such as the ARP process described above, and may skip to predicting the current block using the motion vector (218).

In either case, video decoder 30 may then predict the current block using the decoded motion vector (218). Video decoder 30 may then inverse scan the reproduced coefficients (220), to create a block of quantized transform coefficients. Video decoder 30 may then inverse quantize and inverse transform the coefficients to produce a residual block (222). Video decoder 30 may ultimately decode the current block by combining the predicted block and the residual block(s) (224). For example, in instances in which inter-view residual prediction is not applied, video decoder 30 may simply combine the predicted block and the decoded residual. In instances in which inter-view residual prediction is applied, video decoder 30 may combine the predicted block, the decoded residual (representing a final residual), and the residual predictor.

Figure 15:
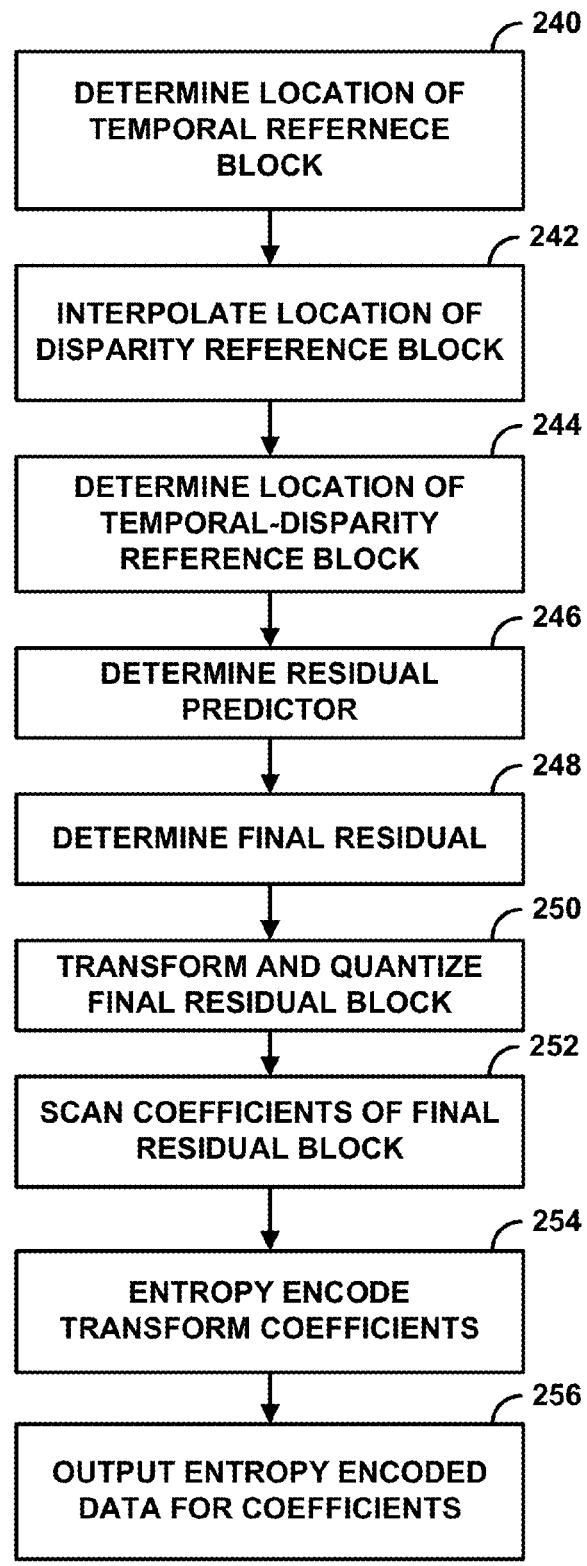
FIG. 15 is flowchart illustrating an example operation of a video encoder, in accordance with one or more techniques of this disclosure.

FIG. 15 is a flowchart illustrating an example method for encoding a current block in accordance with the techniques of this disclosure. The current block may comprise a current CU or a portion of the current CU, e.g., a current PU. Although described with respect to video encoder 20 (FIGS. 1 and 2), it should be understood that other devices may be configured to perform a method similar to that of FIG. 15.

In this example, video encoder 20 determines the location of a temporal reference block indicated by a temporal motion vector for the current block (240). For example, video encoder 20 may calculate one or more prediction units (PUs) for the current block. In this example, it is assumed that video encoder 20 inter-predicts the current block. For example, motion estimation unit 42 may calculate a motion vector for the current block by performing a motion search of previously coded pictures, e.g., inter-view pictures and temporal pictures. Thus, motion estimation unit 42 may produce a temporal motion vector or a disparity motion vector to encode the current block.

Video encoder 20 may also interpolate the location of a disparity reference block (242). For example, video encoder 20 may determine a disparity vector to locate a disparity reference block having the same POC value as the current block, but located in a second, different view. In some instances, according to aspects of this disclosure, if the disparity vector identifies a location for the disparity reference block that is not an integer location, video encoder 20 may apply a bi-linear filter to interpolate the location of the disparity reference block.

In addition, video encoder 20 may determine the location of a temporal-disparity reference block (244). For example, video encoder 20 may combine the temporal motion vector and the disparity motion vector to determine the location of the temporal-disparity reference block. Again, in some instances, according to aspects of this disclosure, if combination identifies a location for the temporal-disparity reference block that is not an integer location, video encoder 20 may apply a bi-linear filter to interpolate the location of the temporal-disparity reference block.

Video encoder 20 may then determine a residual predictor for the current block (246). Video encoder 20 may determine the residual predictor based on the difference between the disparity reference block and the temporal-disparity reference block. Video encoder 20 may apply a weighting factor to the resulting residual predictor.

Video encoder 20 may then determine a final residual for the block (248). For example, video encoder 20 may determine a first residual based on a difference between samples of the current block and the temporal reference block. Video encoder 20 may then determine the final residual based on a difference between the first residual and the residual predictor.

Video encoder 20 may then transform and quantize coefficients of the residual block (250). Next, video encoder 20 may scan the quantized transform coefficients of the residual block (252). During the scan, or following the scan, video encoder 20 may entropy encode the transform coefficients including, e.g., an inter-view residual prediction weighting value (254). Video encoder 20 may then output the entropy coded data for coefficients of the block and the weighting value (256).

Figure 16:
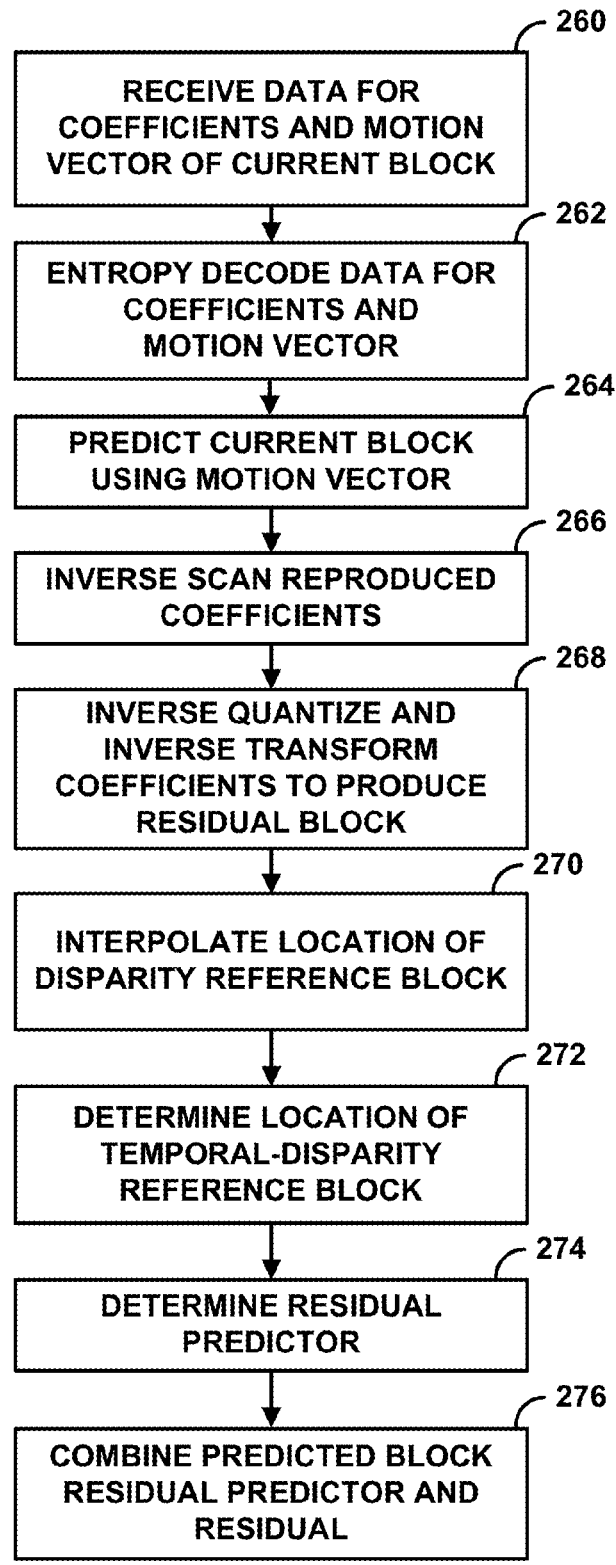
FIG. 16 is a flowchart illustrating an example operation of a video decoder, in accordance with one or more techniques of this disclosure.

FIG. 16 is a flowchart illustrating an example method for decoding a current block of video data in accordance with the techniques of this disclosure. The current block may comprise a current CU or a portion of the current CU (e.g., a PU). Although described with respect to video decoder 30 (FIGS. 1 and 3), it should be understood that other devices may be configured to perform a method similar to that of FIG. 14.

Initially, video decoder 30 receives data for transform coefficients and a motion vector for the current block (260). Again, this example assumes that the current block is inter-predicted. Entropy decoding unit 80 entropy decodes the data for the coefficients and the motion vector for the block (262).

Video decoder 30 may then predict the current block using the decoded motion vector (264). Video decoder 30 may also inverse scan the reproduced coefficients (266), to create a block of quantized transform coefficients. Video decoder 30 may also inverse quantize and inverse transform the coefficients to produce a residual block (268).

Video decoder 30 may also interpolate the location of a disparity reference block (270). For example, video decoder 30 may determine a disparity vector to locate a disparity reference block having the same POC value as the current block, but located in a second, different view. In some instances, according to aspects of this disclosure, if the disparity vector identifies a location for the disparity reference block that is not an integer location, video decoder 30 may apply a bi-linear filter to interpolate the location of the disparity reference block.

In addition, video decoder 30 may determine the location of a temporal-disparity reference block (272). For example, video decoder 30 may combine the temporal motion vector and the disparity motion vector to determine the location of the temporal-disparity reference block. Again, in some instances, according to aspects of this disclosure, if the combination identifies a location for the temporal-disparity reference block that is not an integer location, video decoder 30 may apply a bi-linear filter to interpolate the location of the temporal-disparity reference block.

Video decoder 30 may then determine a residual predictor for the current block (274). Video decoder 30 may determine the residual predictor based on the difference between the disparity reference block and the temporal-disparity reference block. Video decoder 30 may apply a weighting factor to the resulting residual predictor.

Video decoder 30 may ultimately decode the current block by combining the predicted block and the residual (276). For example, video decoder 30 may combine the predicted block, the decoded residual (representing a final residual), and the residual predictor.

Figure 17:
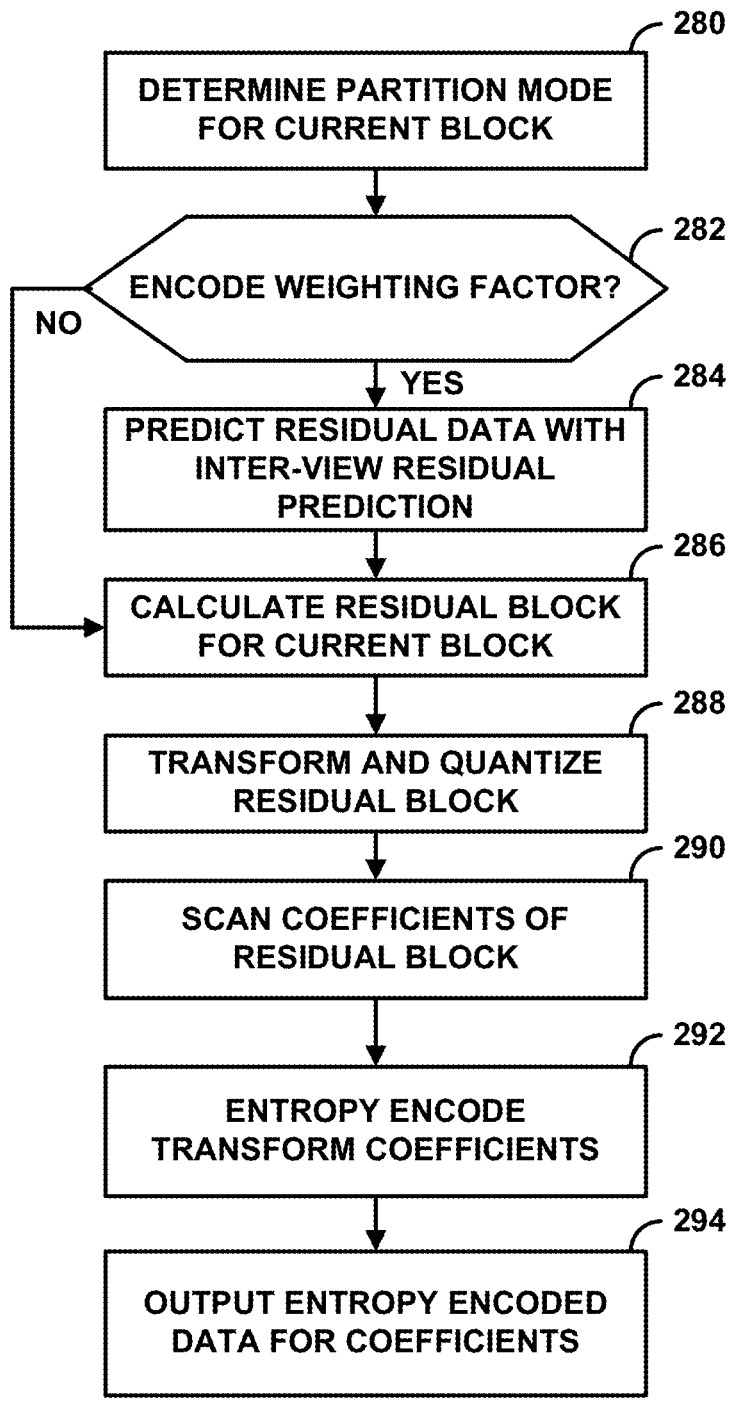
FIG. 17 is a flowchart illustrating an example operation of a video encoder, in accordance with one or more techniques of this disclosure.

FIG. 17 is a flowchart illustrating an example method for encoding a current block in accordance with the techniques of this disclosure. The current block may comprise a current CU or a portion of the current CU, e.g., a current PU. Although described with respect to video encoder 20 (FIGS. 1 and 2), it should be understood that other devices may be configured to perform a method similar to that of FIG. 17.

In this example, video encoder 20 initially determines a partition mode for predicting the current block (280). For example, video encoder 20 may determine whether to calculate one PU (e.g., a 2N×2N partition mode) or to calculate more than one PU for the current block. In this example, it is assumed that video encoder 20 inter-predicts the current block. For example, motion estimation unit 42 may calculate a motion vector for the current block by performing a motion search of previously coded pictures, e.g., inter-view pictures and temporal pictures. Thus, motion estimation unit 42 may produce a temporal motion vector or a disparity motion vector to encode the current block.

Video encoder 20 may then determine whether to encode data indicating a weighting factor (and perform inter-view residual prediction) based on determined partition mode (282). In some examples, video encoder 20 may disable inter-view residual prediction and skip encoding of a weighting factor if the partition mode is a mode other than 2N×2N partition mode.

If video encoder 20 does encode a weighting factor, video encoder 20 may perform inter-view residual prediction to predict the residual data of the current block (284). For example, as noted above, video encoder 20 may determine a disparity reference block indicated by a disparity vector of the first block, determine a temporal-disparity reference block by combining the temporal motion vector and the disparity motion vector, and determine a residual predictor based on a difference between the temporal-disparity reference block and the disparity reference block. Video encoder 20 may apply a weighting factor to the residual predictor. Video encoder 20 may then calculate a residual block for the current block (286).

If video encoder 20 does not encode a weighting factor, (the no branch of step 282) video encoder 20 may disable inter-view residual prediction and may skip to calculating the residual block for the current block (286). In this example, video encoder 20 may not signal a weighting factor for the inter-view residual prediction process. That is, in an example for purposes of illustration, video encoder 20 may not signal a weighting_factor_index syntax element in the bitstream.

In either case, video encoder 20 calculates the residual block for the current block, e.g., to produce a transform unit (TU) (286). To calculate the residual block when inter-view residual prediction is not used, video encoder 20 may calculate a difference between the original, uncoded block and the predicted block for the current block to produce the residual. To calculate the residual block when inter-view residual prediction is used, video encoder 20 may calculate a difference between the original, uncoded block and the predicted block for the current block to generate a first residual. Video encoder 20 may then calculate a final residual based on the difference between the first residual and the residual predictor.

Video encoder 20 may then transform and quantize coefficients of the residual block (288). Next, video encoder 20 may scan the quantized transform coefficients of the residual block (290). During the scan, or following the scan, video encoder 20 may entropy encode the transform coefficients including, e.g., an inter-view residual prediction weighting value in instances in which inter-view residual prediction is enabled and applied (292). Video encoder 20 may then output the entropy coded data for coefficients of the block and the weighting value in instances in which inter-view residual prediction is enabled and applied (294).

Figure 18:
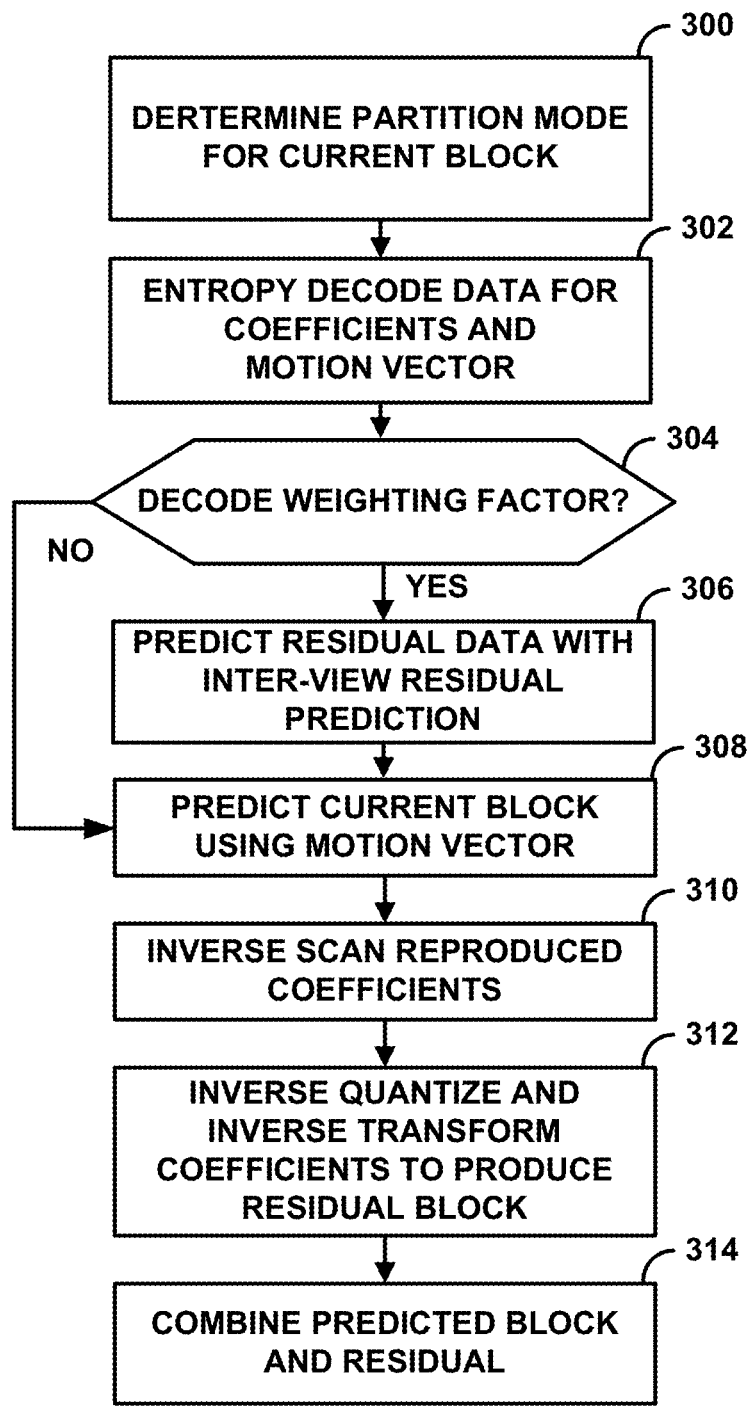
FIG. 18 is a flowchart illustrating an example operation of a video decoder, in accordance with one or more techniques of this disclosure.

FIG. 18 is a flowchart illustrating an example method for decoding a current block of video data in accordance with the techniques of this disclosure. The current block may comprise a current CU or a portion of the current CU (e.g., a PU). Although described with respect to video decoder 30 (FIGS. 1 and 3), it should be understood that other devices may be configured to perform a method similar to that of FIG. 14.

In this example, video decoder 30 initially determines a partition mode for predicting the current block (300). For example, video decoder 30 may determine whether to determine one PU (e.g., a 2N×2N partition mode) or to determine more than one PU for the current block. That partitioning structure for the block may be signaled in the encoded bitstream. Video decoder 30 also entropy decodes data for transform coefficients and a motion vector for the current block (302). Again, this example assumes that the current block is inter-predicted.

Video decoder 30 may then determine whether to decode (e.g., parse, from the encoded bitstream) a weighting factor (and perform inter-view residual prediction) based on determined partition mode (304). In some examples, video decoder 20 may disable inter-view residual prediction and skip decoding of a weighting factor if the partition mode is a mode other than 2N×2N partition mode. That is, for example, video decoder 30 may automatically determine (i.e., infer) that the weighting factor is zero when the partition mode is a mode other than 2N×2N partition mode.

If video decoder 30 does decode a weighting factor, video decoder 30 may perform inter-view residual prediction to predict the residual data of the current block (306). For example, as noted above, video decoder 30 may determine a disparity reference block indicated by a disparity vector of the first block, determine a temporal-disparity reference block by applying the motion vector of the current block to the disparity reference block, and determine a residual predictor based on a difference between the temporal-disparity reference block and the disparity reference block. Video decoder 30 may also apply a weighting factor, as signaled in the bitstream, to the residual predictor.

If video decoder 30 does not decode a weighting factor (the no branch of step 304) video decoder 30 may disable an inter-view residual prediction process. Video decoder 30 may skip to predicting the current block using the motion vector.

In either case, video decoder 30 may then predict the current block using the decoded motion vector (308). Video decoder 30 may then inverse scan the reproduced coefficients (310), to create a block of quantized transform coefficients. Video decoder 30 may then inverse quantize and inverse transform the coefficients to produce a residual block (312). Video decoder 30 may ultimately decode the current block by combining the predicted block and the residual block(s) (314). For example, in instances in which inter-view residual prediction is not applied, video decoder 30 may simply combine the predicted block and the decoded residual. In instances in which inter-view residual prediction is applied, video decoder 30 may combine the predicted block, the decoded residual (representing a final residual), and the residual predictor.

Figure 19:
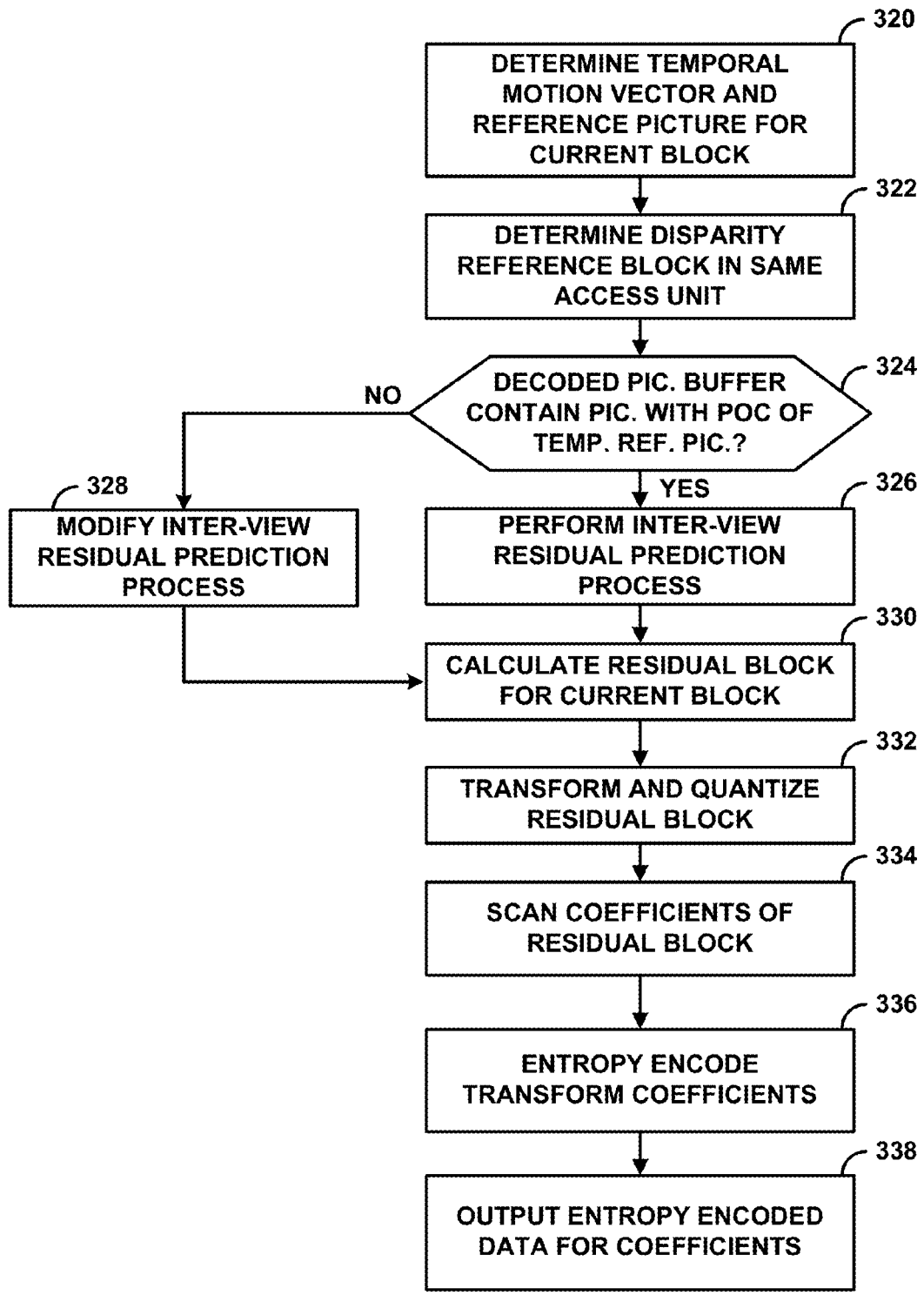
FIG. 19 is flowchart illustrating an example operation of a video encoder, in accordance with one or more techniques of this disclosure.

FIG. 19 is a flowchart illustrating an example method for encoding a current block in accordance with the techniques of this disclosure. The current block may comprise a current CU or a portion of the current CU, e.g., a current PU. Although described with respect to video encoder 20 (FIGS. 1 and 2), it should be understood that other devices may be configured to perform a method similar to that of FIG. 19.

In this example, video encoder 20 determines a temporal motion vector and reference picture for the current block (320). For example, video encoder 20 may calculate one or more prediction units (PUs) for the current block. In this example, it is assumed that video encoder 20 inter-predicts the current block. For example, motion estimation unit 42 may calculate a motion vector for the current block by performing a motion search of previously coded pictures, e.g., inter-view pictures and temporal pictures. Thus, motion estimation unit 42 may produce a temporal motion vector or a disparity motion vector to encode the current block.

Video encoder 20 may then determine a disparity reference block in the same access unit as the current block (322). For example, video encoder 20 may determine a disparity vector to locate a disparity reference block having the same POC value as the current block, but located in a second, different view.

Video encoder 20 may determine whether a decoded picture buffer (also referred to herein as a reference picture memory) contains a picture having a POC value that is equal to the POC value of the temporal reference picture (324). For example, video encoder 20 may determine whether the picture indicated by a combination of the temporal motion vector and the disparity motion vector is included in the decoded picture buffer. In some instances, even if the potential temporal-disparity reference picture is included in the decoded picture buffer, video encoder 20 may further determine whether the picture is included in one or both reference picture lists for the disparity reference block.

If the potential temporal-disparity reference picture is included in the decoded picture buffer (and/or one or both reference picture lists of the disparity reference block) (324) video encoder 20 may perform an inter-view residual prediction process to predict the residual data of the current block (326). For example, as noted above, video encoder 20 may determine a disparity reference block indicated by a disparity vector of the first block, determine a temporal-disparity reference block by applying the motion vector of the current block to the disparity reference block, and determine a residual predictor based on a difference between the temporal-disparity reference block and the disparity reference block. Video encoder 20 may apply a weighting factor to the residual predictor. Video encoder 20 may then calculate a residual block for the current block (330).

If the potential temporal-disparity reference picture is not included in the decoded picture buffer (or is not included in one or both reference picture lists of the disparity reference block) (the no branch of step 324) video encoder 20 may modify the inter-view residual prediction process (328). In some examples, video encoder 20 may modify the process by disabling the process. In other examples, video encoder 20 may select an available reference picture (a reference picture that is included in the decoded picture buffer and/or reference picture list) and scale the temporal motion vector accordingly.

In either case, video encoder 20 calculates the residual block for the current block, e.g., to produce a transform unit (TU) (330). To calculate the residual block when inter-view residual prediction is not used, video encoder 20 may calculate a difference between the original, uncoded block and the predicted block for the current block to produce the residual. To calculate the residual block when inter-view residual prediction is used, video encoder 20 may calculate a difference between the original, uncoded block and the predicted block for the current block to generate a first residual. Video encoder 20 may then calculate a final residual based on the difference between the first residual and the residual predictor.

Video encoder 20 may then transform and quantize coefficients of the residual block (332). Next, video encoder 20 may scan the quantized transform coefficients of the residual block (334). During the scan, or following the scan, video encoder 20 may entropy encode the transform coefficients including, e.g., an inter-view residual prediction weighting value in instances in which inter-view residual prediction is enabled and applied (336). Video encoder 20 may then output the entropy coded data for coefficients of the block and the weighting value in instances in which inter-view residual prediction is enabled and applied (338).

Figure 20:
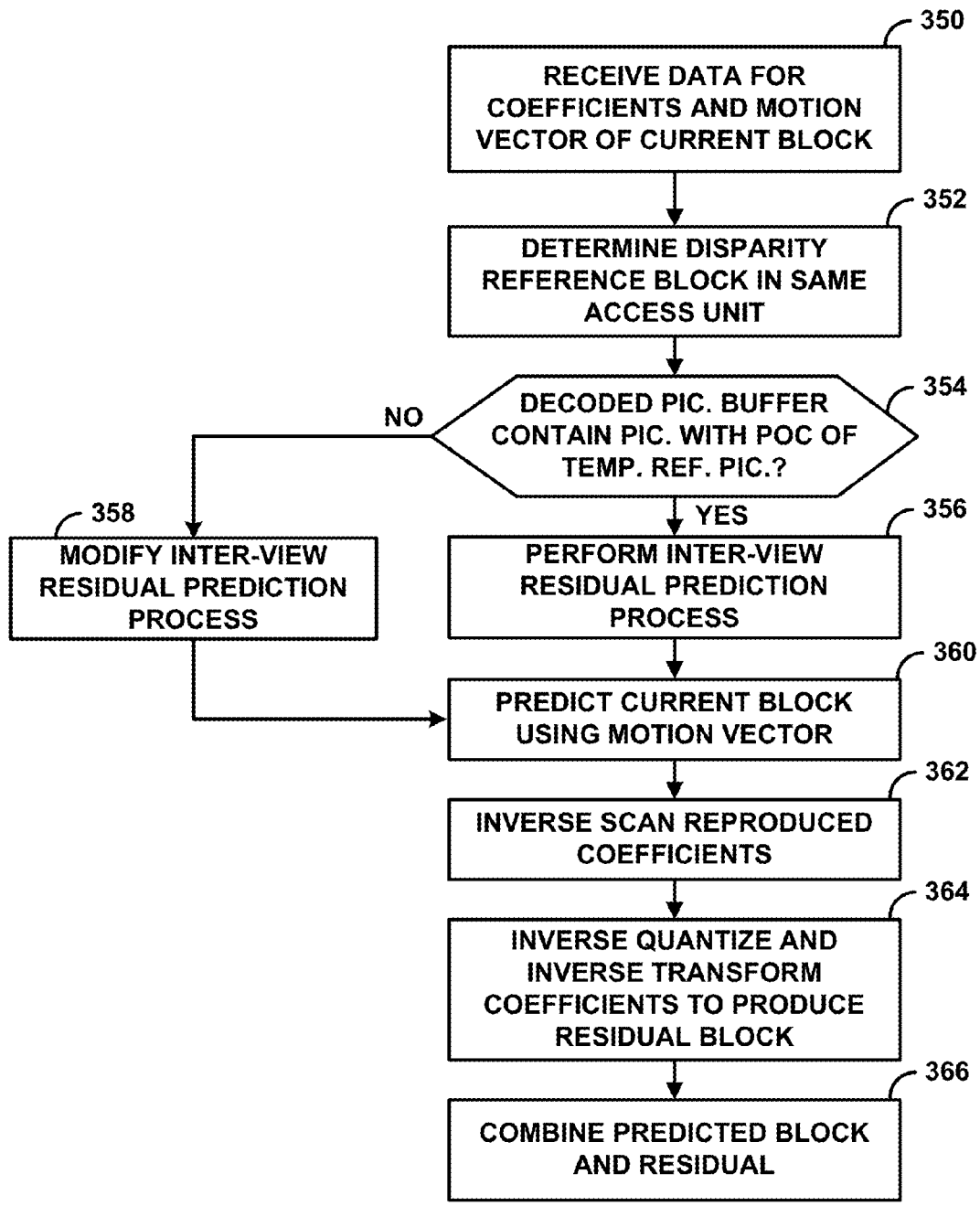
FIG. 20 is a flowchart illustrating an example operation of a video decoder, in accordance with one or more techniques of this disclosure.

FIG. 20 is a flowchart illustrating an example method for decoding a current block of video data in accordance with the techniques of this disclosure. The current block may comprise a current CU or a portion of the current CU (e.g., a PU). Although described with respect to video decoder 30 (FIGS. 1 and 3), it should be understood that other devices may be configured to perform a method similar to that of FIG. 14.

Initially, video decoder 30 receives data for transform coefficients and a motion vector for the current block (350). Again, this example assumes that the current block is inter-predicted. Video decoder 30 may locate a temporal reference picture using the received motion vector.

Video decoder 30 may then determine a disparity reference block in the same access unit as the current block (352). For example, video decoder 30 may determine a disparity vector to locate a disparity reference block having the same POC value as the current block, but located in a second, different view. In some instances, video decoder 30 may determine the disparity vector based on data included in the bitstream. In other instances, video decoder 30 may apply the same process as video encoder 20 to determine the disparity vector.

Video decoder 30 may determine whether a decoded picture buffer (also referred to herein as a reference picture memory) contains a picture having a POC value that is equal to the POC value of the temporal reference picture (354). For example, video decoder 30 may determine whether the picture indicated by a combination of the temporal motion vector and the disparity motion vector is included in the decoded picture buffer. In some instances, even if the potential temporal-disparity reference picture is included in the decoded picture buffer, video decoder 30 may further determine whether the picture is included in one or more reference picture lists for the disparity reference block.

If the potential temporal-disparity reference picture is included in the decoded picture buffer (and/or reference picture lists of the disparity reference block) video decoder 30 may perform an inter-view residual prediction process to predict the residual data of the current block (356). For example, as noted above, video decoder 30 may determine a disparity reference block indicated by a disparity vector of the first block, determine a temporal-disparity reference block by applying the motion vector of the current block to the disparity reference block, and determine a residual predictor based on a difference between the temporal-disparity reference block and the disparity reference block. Video decoder 30 may also apply a weighting factor, as signaled in the bitstream, to the residual predictor.

If the potential temporal-disparity reference picture is not included in the decoded picture buffer (and/or reference picture lists of the disparity reference block) (the no branch of step 354) video decoder 30 may modify the inter-view residual prediction process (358). In some examples, video decoder 30 may modify the process by disabling the process. In other examples, video decoder 30 may select an available reference picture (a reference picture that is included in the decoded picture buffer and/or reference picture list) and scale the temporal motion vector accordingly.

In either case, video decoder 30 may then predict the current block using the decoded motion vector (360). Video decoder 30 may then inverse scan the reproduced coefficients (362), to create a block of quantized transform coefficients. Video decoder 30 may then inverse quantize and inverse transform the coefficients to produce a residual block (364). Video decoder 30 may ultimately decode the current block by combining the predicted block and the residual block(s) (366). For example, in instances in which inter-view residual prediction is not applied, video decoder 30 may simply combine the predicted block and the decoded residual. In instances in which inter-view residual prediction is applied, video decoder 30 may combine the predicted block, the decoded residual (representing a final residual), and the residual predictor.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of coding video data, the method comprising:
   determining, as part of an inter-view residual prediction process for predicting residual of a current block of video data, a location of a temporal reference block indicated by a temporal motion vector of the current block of video data, wherein the current block and the temporal reference block are located in a first layer of video data;
   interpolating, with a first type of interpolation of the inter-view residual prediction process, a location of a disparity reference block of reconstructed video data indicated by a disparity vector of the current block, wherein the disparity reference block is located in a second, different layer, wherein the first type of interpolation comprises a bi-linear filter, and wherein interpolating the location of the disparity reference block comprises:
   determining a disparity reference picture; and
   applying the bi-linear filter to one or more samples of the determined disparity reference picture to interpolate the location of the disparity reference block;
   determining, as part of the inter-view residual prediction process, a temporal-disparity reference block of the disparity reference block indicated by a combination of the temporal motion vector and the disparity vector;
   determining, as part of the inter-view residual prediction process, a residual predictor based on a difference between the disparity reference block and the temporal-disparity reference block; and
   coding the current block based on the temporal reference block and the residual predictor.

2. The method of claim 1, wherein the disparity reference block is associated with a luma component and two chroma components, and wherein interpolating the location of the disparity reference block with the first type of interpolation comprises interpolating the location of each of the luma block and the two chroma components.

3. The method of claim 1, wherein the disparity reference block is associated with a luma component and two chroma components, and wherein interpolating the location of the disparity reference block with the first type of interpolation comprises interpolating the location of the luma component, and further comprising interpolating the location of the two chroma components with a second type of interpolation.

4. The method of claim 1, wherein determining the location of the temporal reference block comprises interpolating, with a second type of interpolation, the location of the temporal reference block, wherein the first type of interpolation is different than the second type of interpolation, and wherein interpolating with the second type of interpolation comprises applying an 8 tap filter for a luma component of the temporal reference block and a 4 tap filter for chroma components of the temporal reference block.

5. The method of claim 1, wherein the first layer of data comprises a first view of video data and wherein the second layer of video data comprises a second view of video data.

6. The method of claim 1, wherein determining the temporal-disparity reference block further comprises interpolating, with the first type of interpolation, a location of the temporal-disparity reference block indicated by the temporal motion vector relative to the disparity reference block.

7. The method of claim 6, wherein the temporal-disparity reference block is associated with a luma component and two chroma components, and wherein interpolating the location of the disparity reference block with the first type of interpolation comprises interpolating the location of each of the luma block and the two chroma components.

8. The method of claim 6, wherein the temporal-disparity reference block is associated with a luma component and two chroma components, and wherein interpolating the location of the temporal-disparity reference block with the first type of interpolation comprises interpolating the location of the luma component, and further comprising interpolating the location of the two chroma components with a second type of interpolation.

9. The method of claim 1, wherein determining the location of the temporal reference block comprises interpolating the location of the temporal reference block with the first type of interpolation.

10. An apparatus for coding video data, the apparatus comprising:
a memory configured to store video data; and
one or more processors configured to:
determine, as part of an inter-view residual prediction process for predicting residual of a current block of video data, a location of a temporal reference block indicated by a temporal motion vector of the current block of the video data, wherein the current block and the temporal reference block are located in a first layer;
interpolate, with a first type of interpolation of the inter-view residual prediction process, a location of a disparity reference block of reconstructed video data indicated by a disparity vector of the current block, wherein the disparity reference block is located in a second, different layer, wherein the first type of interpolation comprises a bi-linear filter, and wherein to interpolate the location of the disparity reference block, the one or more processors are configured to:
determine a disparity reference block; and
apply the bi-linear filter to one or more samples of the determined disparity reference picture to interpolate the location of the disparity reference block;
determine, as part of the inter-view residual prediction process, a temporal-disparity reference block of the disparity reference block indicated by a combination of the temporal motion vector and the disparity vector;
determine, as part of the inter-view residual prediction process, a residual predictor based on a difference between the disparity reference block and the temporal-disparity reference block; and
code the current block based on the temporal reference block and the residual predictor.

11. The apparatus of claim 10, wherein the disparity reference block is associated with a luma component and two chroma components, and wherein to interpolate the location of the disparity reference block with the first type of interpolation, the one or more processors are configured to interpolate the location of each of the luma block and the two chroma components.

12. The apparatus of claim 10, wherein the disparity reference block is associated with a luma component and two chroma components, and wherein to interpolate the location of the disparity reference block with the first type of interpolation, the one or more processors are configured to interpolate the location of the luma component, and wherein the one or more processors are further configured to interpolate the location of the two chroma components with a second type of interpolation.

13. The apparatus of claim 10, wherein to determine the location of the temporal reference block, the one or more processors are configured to interpolate, with a second type of interpolation, the location of the temporal reference block, wherein the first type of interpolation is different than the second type of interpolation, and wherein to interpolate with the second type of interpolation, the one or more processors are configured to apply an 8 tap filter for a luma component of the temporal reference block and a 4 tap filter for chroma components of the temporal reference block.

14. The apparatus of claim 10, wherein the first layer of data comprises a first view of video data and wherein the second layer of video data comprises a second view of video data.

15. The apparatus of claim 10, wherein to determine the temporal-disparity reference block further, the one or more processors are configured to interpolate, with the first type of interpolation, a location of the temporal-disparity reference block indicated by the temporal motion vector relative to the disparity reference block.

16. The apparatus of claim 15, wherein the temporal-disparity reference block is associated with a luma component and two chroma components, and wherein to interpolate the location of the disparity reference block with the first type of interpolation, the one or more processors are configured to interpolate the location of each of the luma block and the two chroma components.

17. The apparatus of claim 15, wherein the temporal-disparity reference block is associated with a luma component and two chroma components, and wherein to interpolate the location of the temporal-disparity reference block with the first type of interpolation, the one or more processors are configured to interpolate the location of the luma component, and wherein the one or more processors are further configured to interpolate the location of the two chroma components with a second type of interpolation.

18. The apparatus of claim 10, wherein to determine the location of the temporal reference block, the one or more processors are configured to interpolate the location of the temporal reference block with the first type of interpolation.

19. The apparatus of claim 10, wherein to code the first block, the one or more processors are configured to decode the first block, and wherein to decode the first block, the one or more processors are configured to:
obtain, from an encoded bitstream, data indicative of a final residual for the first block;
reconstruct the first block based on a combination of the final residual, the residual predictor, and the temporal reference block.

20. The apparatus of claim 10, wherein to code the first block, the one or more processors are configured to encode the first block, and wherein to encode the first block, the one or more processors are configured to:
determine a first residual comprising a difference between the first block and the temporal reference block;

determine a final residual based on a difference between the first residual and the residual predictor;

encode data indicating the final residual in a bitstream.

21. An apparatus for coding video data, the apparatus comprises:

means for determining, as part of an inter-view residual prediction process for predicting residual of a current block of video data, a location of a temporal reference block indicated by a temporal motion vector of the current block of video data, wherein the current block and the temporal reference block are located in a first layer of video data;

means for interpolating, with a first type of interpolation of the inter-view residual prediction process, a location of a disparity reference block of reconstructed video data indicated by a disparity vector of the current block, wherein the disparity reference block is located in a second, different layer, wherein the first type of interpolation comprises a bi-linear filter and wherein the means for interpolating the location of the disparity reference block comprises:

means for determining a disparity reference picture; and means for applying the bi-linear filter to one or more samples of the determined disparity reference picture to interpolate the location of the disparity reference block;

means for determining, as part of the inter-view residual prediction process, a temporal-disparity reference block of the disparity reference block indicated by a combination of the temporal motion vector and the disparity vector;

means for determining, as part of the inter-view residual prediction process, a residual predictor based on a difference between the disparity reference block and the temporal-disparity reference block; and means for coding the current block based on the temporal reference block and the residual predictor.

22. The apparatus of claim 21, wherein the means for determining the temporal-disparity reference block further comprises means for interpolating, with the first type of interpolation, a location of the temporal-disparity reference block indicated by the temporal motion vector relative to the disparity reference block.

23. The apparatus of claim 21, wherein the means for determining the location of the temporal reference block comprises means for interpolating the location of the temporal reference block with the first type of interpolation.

24. A non-transitory computer-readable medium having instructions store thereon that, when executed, cause one or more processors to:

determine, as part of an inter-view residual prediction process for predicting residual of a current block of video data, a location of a temporal reference block indicated by a temporal motion vector of the current block of video data, wherein the current block and the temporal reference block are located in a first layer of video data;

interpolate, with a first type of interpolation of the inter-view residual prediction process, a location of a disparity reference block of reconstructed video data indicated by a disparity vector of the current block, wherein the disparity reference block is located in a second, different layer, wherein the first type of interpolation comprises a bi-linear filter, and wherein the instructions that cause the one or more processors to interpolate the location of the disparity reference block comprise instructions that cause the one or more processors to:

determine a disparity reference picture; and apply the bi-linear filter to one or more samples of the determined disparity reference picture to interpolate the location of the disparity reference block;

determine, as part of the inter-view residual prediction process, a temporal-disparity reference block of the disparity reference block indicated by a combination of the temporal motion vector and the disparity vector;

determine, as part of the inter-view residual prediction process, a residual predictor based on a difference between the disparity reference block and the temporal-disparity reference block; and code the current block based on the temporal reference block and the residual predictor.

25. The non-transitory computer-readable medium of claim 24, wherein to determine the temporal-disparity reference block, the instructions cause the one or more processors to interpolate, with the first type of interpolation, a location of the temporal-disparity reference block indicated by the temporal motion vector relative to the disparity reference block.

26. The non-transitory computer-readable medium of claim 24, wherein to determine the location of the temporal reference block, the instructions cause the one or more processors to interpolate the location of the temporal reference block with the first type of interpolation.

* * * * *